United States Patent
Kokubu et al.

(10) Patent No.: US 10,648,560 B2
(45) Date of Patent: May 12, 2020

(54) PARKING DEVICE

(71) Applicant: AISIN AW CO., LTD., Anjo-shi, Aichi-ken (JP)

(72) Inventors: Takahiro Kokubu, Nishio (JP); Masaya Nakai, Tokoname (JP); Tomonari Okamoto, Anjo (JP); Eikichi Kidokoro, Anjo (JP); Kenichi Naka, Anjo (JP); Tadamasa Takei, Nagoya (JP); Junichi Terai, Toyota (JP)

(73) Assignee: AISIN AW CO., LTD., Anjo-shi, Aichi (JP)

( * ) Notice: Subject to any disclaimer, the term of this patent is extended or adjusted under 35 U.S.C. 154(b) by 655 days.

(21) Appl. No.: 15/025,340

(22) PCT Filed: Oct. 23, 2014

(86) PCT No.: PCT/JP2014/078278
§ 371 (c)(1),
(2) Date: Mar. 28, 2016

(87) PCT Pub. No.: WO2015/060412
PCT Pub. Date: Apr. 30, 2015

(65) Prior Publication Data
US 2016/0208916 A1    Jul. 21, 2016

(30) Foreign Application Priority Data

Oct. 23, 2013  (JP) ................................ 2013-220443
Aug. 29, 2014  (JP) ................................ 2014-176393

(51) Int. Cl.
*F16H 63/34*    (2006.01)
*B60T 1/06*    (2006.01)
*B60T 1/00*    (2006.01)

(52) U.S. Cl.
CPC .......... *F16H 63/3433* (2013.01); *B60T 1/005* (2013.01); *B60T 1/062* (2013.01); *F16H 63/3483* (2013.01)

(58) Field of Classification Search
CPC ............. F16H 63/3433; F16H 63/3416; F16H 63/3475; F16H 63/3483; F16H 63/3491;
(Continued)

(56) References Cited

U.S. PATENT DOCUMENTS 3,207,252 A    9/1965    Cripe et al.
3,610,004 A    10/1971    Neese
(Continued)

FOREIGN PATENT DOCUMENTS

DE    10 2008 011 898 A1    9/2009
DE    10 2009 018 975 A1    10/2010
(Continued)

OTHER PUBLICATIONS

Murase Shinko. Machine translation of JPH10136627 Electromagnetic Solenoid. 1998. ESPACENET. (Year: 1998).*
(Continued)

*Primary Examiner* — Jacob S. Scott
*Assistant Examiner* — Lori Wu
(74) *Attorney, Agent, or Firm* — Sughrue Mion, PLLC

(57) ABSTRACT

A lock shaft and a shaft member (a plunger and a permanent magnet) of a magnetic locking device are arranged such that a moving direction thereof is orthogonal to a moving direction of a piston rod of a hydraulic actuator. In a parking lock released state, when the coil is not energized, the lock shaft and the shaft member are locked by an attracting force between the permanent magnet and a flange of a yoke so as not to move back from the piston rod, and, when the coil is energized, the attracting force between the permanent mag-
(Continued)

net and the flange is canceled, so that the lock shaft and the shaft member are allowed to move back from the piston rod.

28 Claims, 21 Drawing Sheets

(58) Field of Classification Search
CPC ...... F16H 63/32; F16H 2306/32; B60T 1/005; B60T 1/062; F16D 2127/06; F16D 2127/002
See application file for complete search history.

(56) References Cited

U.S. PATENT DOCUMENTS

| | | | |
|---|---|---|---|
| 3,831,486 A | 8/1974 | Yost | |
| 5,671,638 A | 9/1997 | Hattori et al. | |
| 8,667,859 B2 | 3/2014 | Engel et al. | |
| 9,267,599 B2 | 2/2016 | Pollack | |
| 2003/0066719 A1* | 4/2003 | Watanabe | B60T 1/005 188/72.7 |
| 2004/0011609 A1* | 1/2004 | Schmid | B60T 1/005 188/265 |
| 2004/0212249 A1* | 10/2004 | Yamaguchi | B60T 13/02 303/122.04 |
| 2005/0098400 A1* | 5/2005 | Kleinert | F16H 63/3433 188/300 |
| 2005/0217952 A1* | 10/2005 | Usui | F16D 65/18 188/265 |
| 2005/0236251 A1* | 10/2005 | Yamamoto | B60T 1/062 192/219.4 |
| 2007/0193838 A1 | 8/2007 | Inagaki et al. | |
| 2007/0283735 A1 | 12/2007 | Schweiher et al. | |
| 2008/0236967 A1 | 10/2008 | Mayr | |
| 2009/0140189 A1 | 6/2009 | Kokubu et al. | |
| 2011/0023647 A1 | 2/2011 | Engel et al. | |
| 2014/0110216 A1 | 4/2014 | Pollack | |
| 2014/0123799 A1 | 5/2014 | Landino et al. | |
| 2015/0041261 A1* | 2/2015 | Masuda | B60T 13/741 188/163 |
| 2016/0082933 A1 | 3/2016 | Iwata et al. | |
| 2016/0091037 A1 | 3/2016 | Iwata et al. | |
| 2016/0208916 A1 | 7/2016 | Kokubu et al. | |

FOREIGN PATENT DOCUMENTS

| | | |
|---|---|---|
| DE | 10 2010 032 733 A1 | 4/2011 |
| DE | 10 2011 105 068 A1 | 7/2012 |
| DE | 10 2011 051 517 A1 | 1/2013 |
| EP | 1408260 A1 | 4/2004 |
| JP | 49102019 A | 9/1974 |
| JP | 8-216722 A | 8/1996 |
| JP | 10-47523 A | 2/1998 |
| JP | 10-136627 A | 5/1998 |
| JP | 2002-246226 A | 8/2002 |
| JP | 2005291376 A | 10/2005 |
| JP | 2007132394 A | 5/2007 |
| JP | 2007-303680 A | 11/2007 |
| JP | 2008-128444 A | 6/2008 |
| JP | 2009-520163 A | 5/2009 |
| JP | 2009-127692 A | 6/2009 |
| JP | 2009-236308 A | 10/2009 |
| JP | 2014148199 A | 8/2014 |
| JP | 2015000689 A | 1/2015 |
| WO | 0063593 A1 | 10/2000 |
| WO | 2014/203898 A1 | 12/2014 |
| WO | 2014/203899 A1 | 12/2014 |
| WO | 2014/203900 A1 | 12/2014 |

OTHER PUBLICATIONS

Kato Akihiko, Machine translation of JP2008128444 Parking Device for Automatic Transmission. 2008. ESPACENET. (Year: 2008).*
International Search Report of PCT/JP2014/078278 dated Jan. 20, 2015.
Communication dated Apr. 25, 2016 from the European Patent Office issued in corresponding Application No. 14814454.6.
Communication dated Sep. 28, 2016 from the U.S. Patent and Trademark Office in counterpart U.S. Appl. No. 14/891,766.
An Office Action dated Feb. 14, 2017, which issued during the prosecution of U.S. Appl. No. 14/891,858.

* cited by examiner

PARKING DEVICE

CROSS REFERENCE TO RELATED APPLICATIONS

This application is a National Stage of International Application No. PCT/JP2014/078278 filed Oct. 23, 2014, claiming priority based on Japanese Patent Application Nos. 2013-220443, filed Oct. 23, 2013, and 2014-176393, filed Aug. 29, 2014, the contents of which are incorporated herein by reference in their entirety.

TECHNICAL FIELD

The present disclosure relates to a parking device, and more in detail, relates to a parking device that is mounted on a vehicle and establishes a parking lock state and a parking lock released state.

BACKGROUND ART

Parking devices for use in transmission devices have heretofore been developed, each including: a piston unit that is placed so as to be movable in the axial direction thereof in a housing and is operated, according to a fluid pressure, in the direction of releasing a parking lock against a spring device acting in the direction of applying the parking lock; a latch mechanism that includes three spring arms and is capable of holding the piston unit in a predetermined position in the axial direction thereof; a tripping member that is movable together with a piston rod in the housing and is urged toward the piston unit by a spring; and an electromagnetic operating device that is arrange coaxially with the piston unit and operates the tripping member (refer to Patent Document 1, for example).

In such a parking device, when the piston unit is being hydraulically moved toward the tripping member, the tripping member pressed by the piston unit moves toward the electromagnetic operating device against an elastic force (urging force) of the spring, and the piston unit engages with the latch mechanism. In this state, the parking lock is released, and the parking lock released state can be maintained by energizing the electromagnetic operating device to fix the position of the tripping member. When the electromagnetic operating device stops being energized while the hydraulic pressure is not supplied to the piston unit, the elastic force of the spring moves the tripping member toward the piston unit to push to expand the three spring arms, and releases the engagement between the latch mechanism and the piston unit. When the piston unit is being moved by an elastic force of the spring device or a hydraulic pressure so as to be away from the electromagnetic operating device, the parking lock is applied.

Moreover, locking units for use in parking brakes of automobiles have been proposed, each including: a piston that is placed in a housing and is hydraulically movable in the direction of releasing a parking lock; a shock-absorbing spring placed in an opening on a distal end side of the piston; an operating element that is capable of holding the piston by engaging with a catching element provided at the distal end of the piston; a bolt fixed to an iron core bar connected to an iron core; a spring for urging the bolt toward the piston; and a coil, a yoke, and a case for holding the position in the axial direction of the iron core (refer to Patent Document 2, for example).

In such a locking unit, when the piston is being hydraulically moved toward the bolt, the shock-absorbing spring in the opening of the piston abuts on the iron core bar, and the catching element of the piston engages with the operating element. At this time, the parking lock is released. The parking lock released state can be maintained by energizing the coil to attract the bolt toward the coil side at this time. When the coil stops being energized while no hydraulic pressure is applied to the piston, the urging force of the spring moves the bolt toward the piston to push to expand the operating element, and releases the engagement between the catching element of the piston and the operating element. The piston moves away from the bolt to apply the parking lock.

RELATED-ART DOCUMENTS

Patent Documents

[Patent Document 1] Japanese Translation of PCT International Application Publication No. 2009-520163 (JP-T-2009-520163)

Patent Document 2: United States Patent Application Publication No. 2005/0098400 (US 2005/0098400 A)

SUMMARY

Power consumption increases when the parking device described above needs to continue energizing the electromagnetic operating device in order to maintain the parking lock state or the parking lock released state in case the hydraulic pressure applied to the piston unit drops. The locking unit described above has the same problem.

It is a primary object of the present disclosure to provide a parking device that can reduce the power consumption.

The parking device of the present disclosure employs the following means to achieve the primary object described above.

A first parking device of the present disclosure is a parking device that is mounted on a vehicle and includes: a parking pawl that meshes with a parking gear provided on an output shaft of a transmission; a cam that engages and disengages the parking pawl to and from the parking gear; a piston that drives the cam and is operated by hydraulic pressure; and a movement restraining member that holds the piston on a side to which the piston has been operated by the hydraulic pressure. The first parking device is characterized by comprising a locking member that is capable of maintaining the holding state of the piston by the movement restraining member, and is characterized in that the locking member includes: a coil that is energized to generate a magnetic flux; a plunger that is formed of a magnetic material that abuts on the movement restraining member on an inner circumferential side of the coil; a core that is formed of a magnetic material facing the plunger on the inner circumferential side of the coil; a yoke that is placed on an outer circumferential side of the coil, the plunger, and the core; and a permanent magnet that forms a magnetic path in conjunction with the plunger, the core, and the yoke, and also in that the magnetic path of the permanent magnet is at least partially in common with a magnetic path through which the magnetic flux of the coil passes.

In the first parking device of the present disclosure, the locking member that is capable of maintaining the holding state of the piston by the movement restraining member includes: the coil that is energized to generate the magnetic flux; the plunger that is formed of a magnetic material abutting on the movement restraining member on the inner circumferential side of the coil; the core that is formed of a magnetic material facing the plunger on the inner circumferential side of the coil; the yoke that is placed on the outer circumferential side of the coil, the plunger, and the core; and the permanent magnet that forms the magnetic path in conjunction with the plunger, the core, and the yoke. The magnetic path of the permanent magnet is at least partially in common with the magnetic path through which the magnetic flux of the coil passes. With this structure, when the coil is not being energized, the magnetic flux in the magnetic path caused by the magnetic flux of the permanent magnet restrains the plunger from moving so as to restrain the movement restraining member from moving. As a result, the movement restraining member can hold the piston on the side to which the piston has been operated by the hydraulic pressure. When the coil is being energized, the magnetic flux caused by the energization cancels the magnetic flux caused by the magnetic flux of the permanent magnet to release the restraint on the movement of the plunger, and thus releases the restraint on the movement of the movement restraining member, and, as a result, releases the holding on the side to which the piston has been operated by the hydraulic pressure. As a result of the above, the coil need not be energized to cause the movement restraining member to hold the piston on the side to which the piston has been operated by the hydraulic pressure. Consequently, the power consumption can be reduced.

A second parking device of the present disclosure is a parking device that is mounted on a vehicle and includes: a parking pawl that meshes with a parking gear provided on an output shaft of a transmission; a cam that engages and disengages the parking pawl to and from the parking gear; a piston that drives the cam and is operated by hydraulic pressure; and a movement restraining member that holds the piston on a side to which the piston has been operated by the hydraulic pressure. The second parking device is characterized by comprising a solenoid that switches a mode of movement of the movement restraining member between a restrained mode and an allowed mode, and is characterized in that the solenoid includes a permanent magnet that restrains the movement of the movement restraining member with a magnetic force, and also includes a restraint releasing unit that releases the restraint caused by the permanent magnet on the movement of the movement restraining member when the coil is being energized.

In the second parking device of the present disclosure, the solenoid that switches the mode of movement of the movement restraining member between the restrained mode and the allowed mode includes the permanent magnet that restrains the movement of the movement restraining member with a magnetic force, and also includes the restraint releasing unit that releases the restraint caused by the permanent magnet on the movement of the movement restraining member when the coil is being energized. Accordingly, when the coil is not being energized, the magnetic flux of the permanent magnet can restrain the movement restraining member from moving to hold the piston on the side to which the piston has been operated by the hydraulic pressure. When the coil is being energized, the magnetic flux caused by the energization cancels the magnetic flux caused by the magnetic flux of the permanent magnet to release the restraint on the movement of the movement restraining member, and thus releases the holding on the side to which the piston has been operated by the hydraulic pressure. As a result of the above, the coil need not be energized to cause the movement restraining member to hold the piston on the side to which the piston has been operated by the hydraulic pressure. Consequently, the power consumption can be reduced.

DETAILED DESCRIPTION OF THE PREFERRED EMBODIMENT

Figure 1:
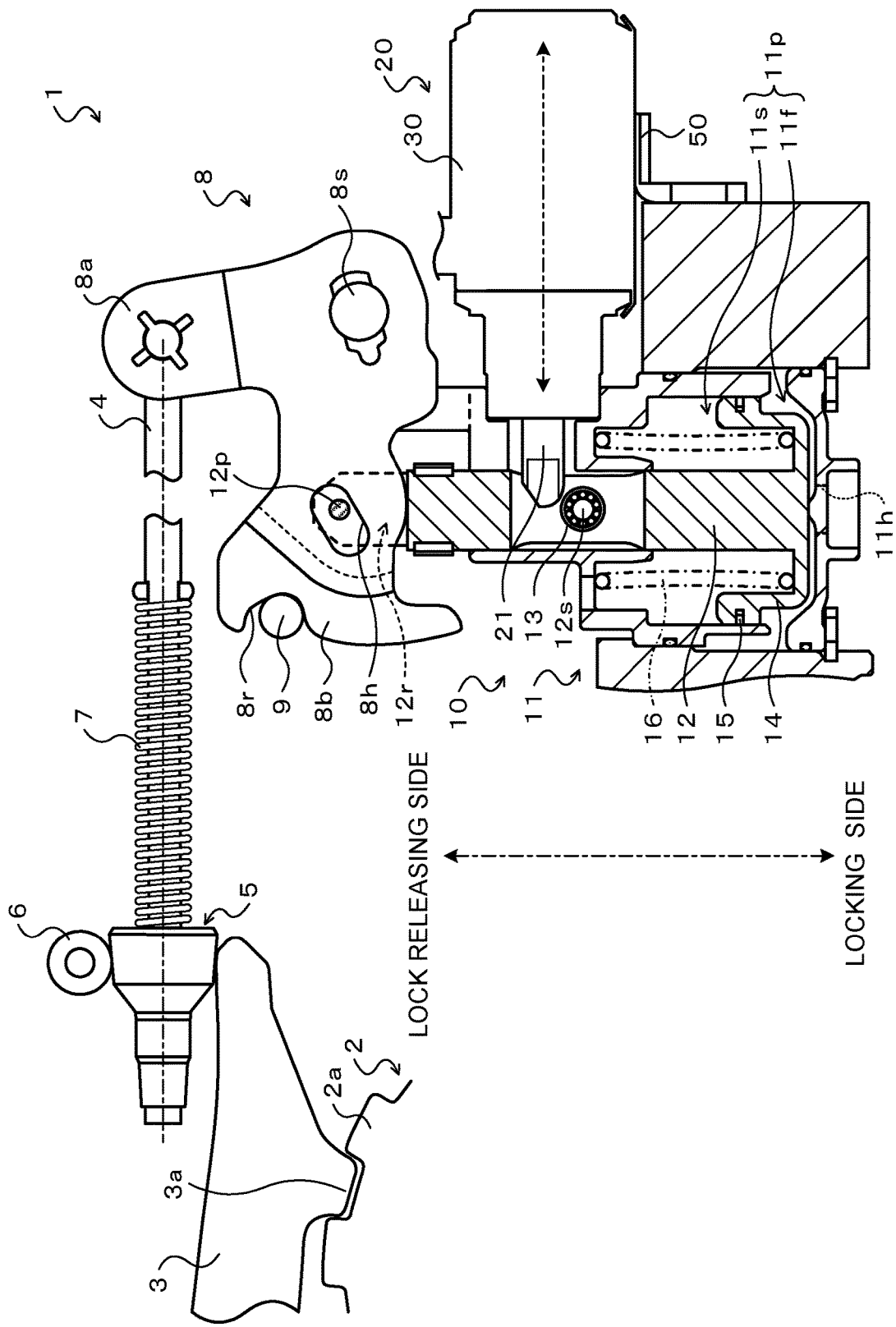
FIG. 1 is a structural diagram showing a schematic structure of a parking device 1 as a first embodiment.
Figure 2:
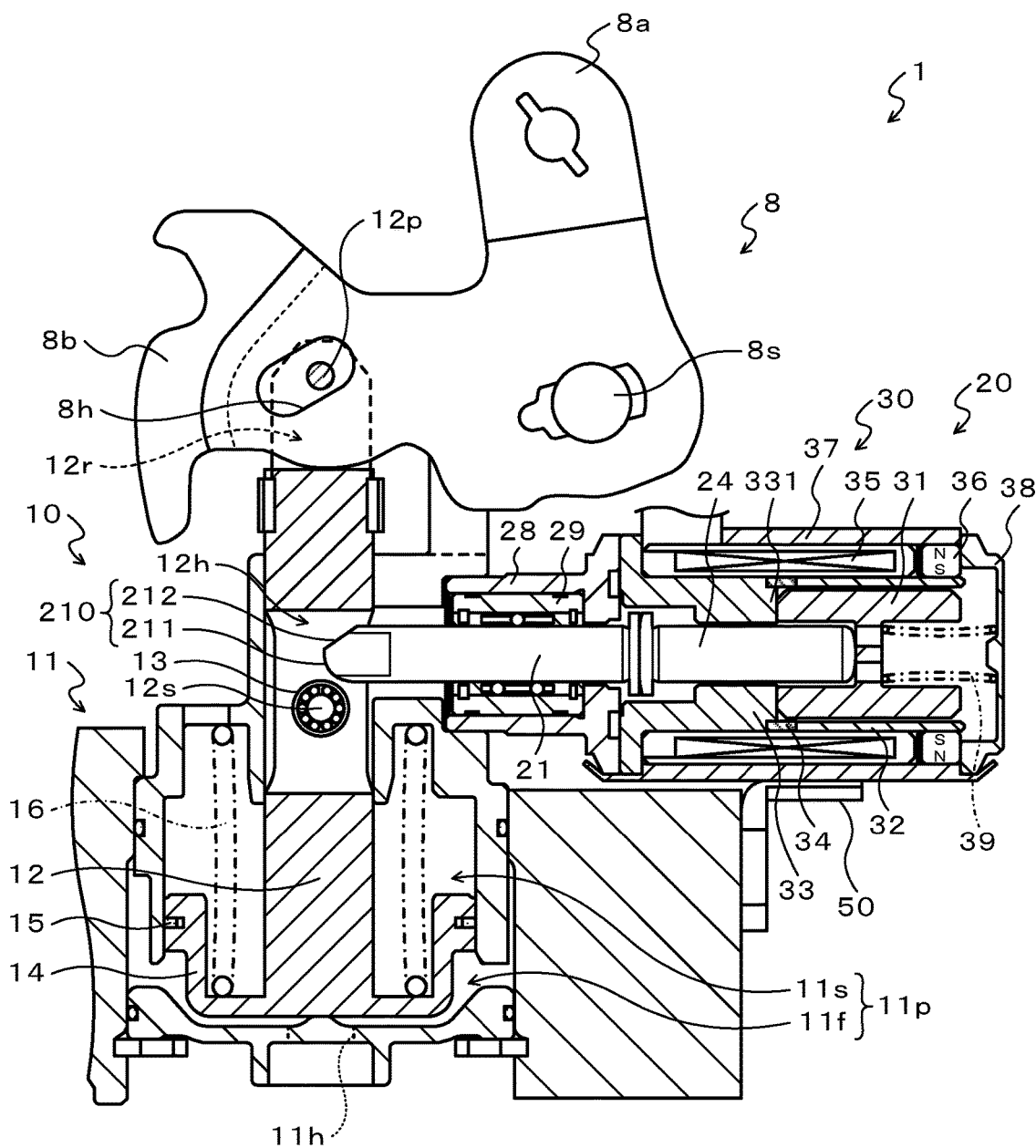
FIG. 2 is a structural diagram showing a schematic structure of a main part of the parking device 1.
Figure 3:
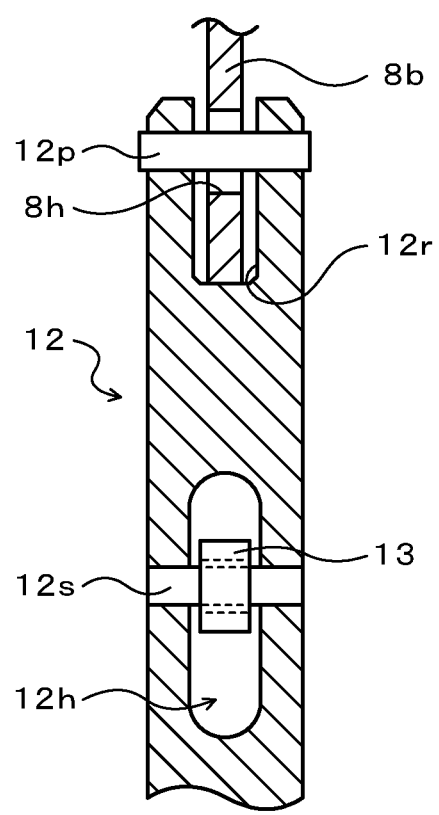
FIG. 3 is a structural diagram showing a schematic structure of a part of a hydraulic actuator 10.
Figure 4:
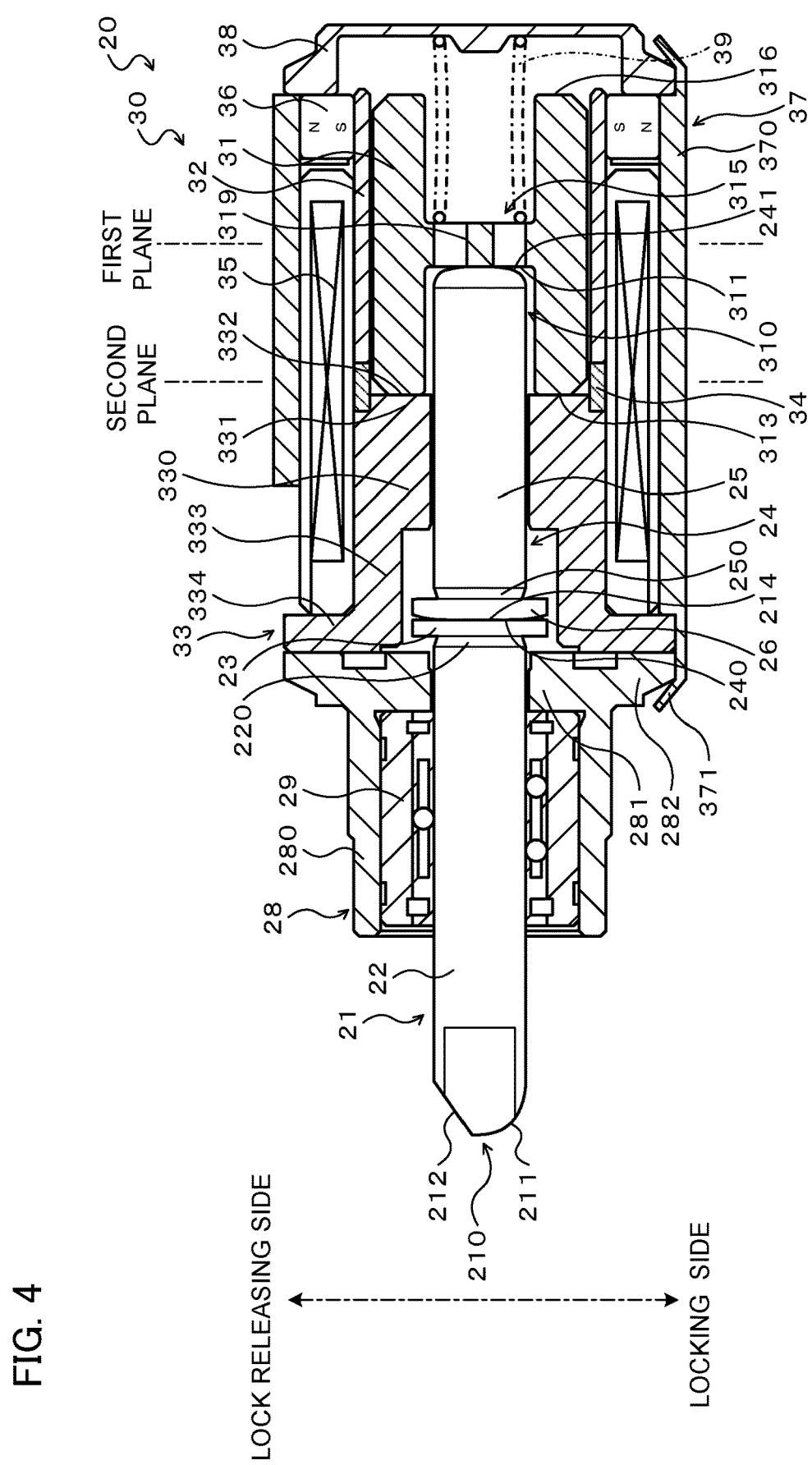
FIG. 4 is a structural diagram showing a schematic structure of a magnetic locking device 20.

An exemplary embodiment will be described below.
FIG. 1 is a structural diagram showing a schematic structure of a parking device 1 as a first embodiment. FIG. 2 is a structural diagram showing a schematic structure of a main part of the parking device 1. FIG. 3 is a structural diagram showing a schematic structure of a part of a hydraulic actuator 10. FIG. 4 is a structural diagram showing a schematic structure of a magnetic locking device 20.
The parking device 1 of the first embodiment is mounted on a vehicle, and placed inside or outside a transmission case of a transmission (not shown). The parking device 1 is structured as what is called a shift-by-wire parking device that locks any one of rotational shafts of the transmission and releases the lock of the rotational shaft based on an electrical signal that is output according to an operational position (shift range) of a shift lever.

As shown in FIG. 1, the parking device 1 includes the following: a parking gear 2 that has a plurality of teeth 2a and is attached to any one of the rotational shafts of the transmission; a parking pawl 3 that has a projecting portion 3a engageable with the parking gear 2 and is urged by a spring (not shown) so as to move away from the parking gear 2; a parking rod 4 that is reciprocatable; a cylindrical cam member 5 that is movable in the axial direction of the parking rod 4; a supporting roller 6 that is rotatably supported by, for example, the transmission case and pinches the cam member 5 in cooperation with the parking pawl 3; a cam spring 7 that is supported at one end thereof by the parking rod 4 and urges the cam member 5 so as to press the parking pawl 3 to the parking gear 2; a detent lever 8 that is connected to the parking rod 4; the hydraulic actuator 10 that reciprocates the parking rod 4 via the detent lever 8 through reciprocation of a piston rod 12; and a magnetic locking device 20 that restrains the reciprocation of the parking rod 4 by restraining the reciprocation of the piston rod 12. In the parking device 1, the projecting portion 3a of the parking pawl 3 engages with a recess between adjacent two of the teeth 2a of the parking gear 2 to lock the rotational shaft of the transmission (to apply the parking lock), as shown in FIG. 1.

Each of the parking gear 2, the parking pawl 3, the parking rod 4, the cam member 5, the supporting roller 6, and the cam spring 7 has a known structure. The detent lever 8 is formed substantially in an L-shape, and has a first free end 8a and a second free end 8b. The first free end 8a is rotatably connected to the proximal end (the right end in FIG. 1) of the parking rod 4. An engagement recess 8r is formed at the second free end 8b, and is engageable with an engagement member 9 attached to a detent spring (not shown) supported by, for example, the transmission case. A corner portion (at proximal ends of the first and second free ends 8a and 8b) of the detent lever 8 is rotatably supported by a spindle 8s that is supported by, for example, the transmission case.

The hydraulic actuator 10 is structured to be operated by a hydraulic pressure from a hydraulic control device of the transmission that is controlled by an electronic control device based on the electrical signal that is output according to the operational position (shift range) of the shift lever. As shown in FIG. 2, the hydraulic actuator 10 includes a case 11 constituted by a plurality of members, the piston rod 12 that is connected to the second free end 8b of the detent lever 8 and is supported by the case 11 so as to be movable in the axial direction of the piston rod 12 (in the up-down direction in FIG. 2 (first direction)), and a piston 14 that is integrally formed with the piston rod 12 and is placed in a piston chamber 11p formed in the case 11.

The piston rod 12 is supported by the case 11 such that the distal end (the upper end in FIG. 2) of the piston rod 12 projects outward (upward in FIG. 2) from the case 11. As shown in FIG. 3, the piston rod 12 has, at the distal end thereof, a connection recess 12r formed so as to extend from the distal end toward the proximal end of the piston rod 12. The second free end 8b of the detent lever 8 is inserted in the connection recess 12r. An elongated hole 8h is formed in the detent lever 8 so as to be located in the connection recess 12r. A connection pin 12p supported by the distal end of the piston rod 12 is inserted in the elongated hole 8h. The elongated hole 8h is formed such that a space is defined between the inner circumference thereof and an outer circumferential surface of the connection pin 12p. Thus, the piston rod 12 and the detent lever 8 are connected so as to allow a certain amount of relative movement between each other.

The piston rod 12 is provided with, near the central part in the axial direction thereof (in the up-down direction in FIG. 2), a hole 12h that penetrates through the piston rod 12 in a direction orthogonal to the axial direction thereof (in the right-left direction in FIG. 2) and extends in the axial direction of the piston rod 12. A roller 13 serving as an abutment target is placed in the hole 12h. The roller 13 is structured as a roller bearing, and has an outside diameter smaller than a length in the longitudinal direction (in the up-down direction in FIGS. 2 and 3) of the hole 12h. The roller 13 is supported so as to be rotatable in the hole 12h by a supporting shaft 12s that is supported by the piston rod 12 so as to extend in parallel with the connection pin 12p. The hole 12h may not penetrate through the piston rod 12 in the right-left direction in FIG. 2.

The piston 14 is integrally formed with the piston rod 12 at the proximal end (the lower end in FIG. 2) thereof, and is supported by an inner wall surface of the piston chamber 11p via a seal member 15 so as to be movable in the axial direction of the piston rod 12. The piston 14 partitions the inside of the piston chamber 11p into an oil chamber 11f and a spring chamber 11s. The oil chamber 11f is defined on the lower side in FIG. 2 of the piston 14 in the piston chamber 11p, and communicates with an oil hole 11h formed in the case 11. The oil chamber 11f is supplied with the hydraulic pressure (hydraulic oil) from the hydraulic control device through an oil passage (not shown) and the oil hole 11h. The spring chamber 11s is defined on the upper side in FIG. 2 of the piston 14 in the piston chamber 11p. A return spring 16 serving as an elastic member is placed in the spring chamber 11s between the case 11 and the piston 14. The return spring 16 urges the piston 14 from the spring chamber 11s side toward the oil chamber 11f side (downward in FIG. 2).

When the hydraulic actuator 10 thus structured is in the assembled state (in the state when the assembly is completed), the piston 14 is urged downward in FIG. 1 by the return spring 16 to be closest to or in contact with the bottom of the oil chamber 11f, so that the piston rod 12 projects from the case 11 by the minimum length. This state causes the parking rod 4 connected to the piston rod 12 via the detent lever 8 to be closest to the proximal end of the parking pawl 3, so that the cam member 5 urged by the cam spring 7 presses the parking pawl 3 such that the parking pawl 3 engages with the parking gear 2, and thus the rotational shaft of the transmission is locked (the parking lock is applied).

When the hydraulic pressure is supplied from the hydraulic control device to the oil chamber 11f of the hydraulic actuator 10 in the state in which the rotational shaft of the transmission is locked (hereinafter, referred to as a "parking lock state" where appropriate) as shown in FIG. 1, the hydraulic pressure in the oil chamber 11f moves the piston rod 12 upward in FIG. 1 (hereinafter, expressed as toward a "lock releasing side" where appropriate) in the moving direction of the piston rod 12 (first direction) against an elastic force (urging force) of the return spring 16. This operation rotates the detent lever 8 clockwise in FIG. 1 about the spindle 8s and moves the parking rod 4 rightward in FIG. 1. The movement of the parking rod 4 rightward in FIG. 1 releases the pressure applied from the cam member 5 onto the parking pawl 3, and releases the engagement between the parking gear 2 and the parking pawl 3, that is, the locking of the rotational shaft of the transmission (releases the parking lock). Accordingly, the rotational shaft of the transmission is not locked (the parking lock is not applied) when the hydraulic pressure is supplied from the hydraulic control device to the oil chamber 11*f* of the hydraulic actuator 10 while the vehicle is running.

When the hydraulic pressure stops being supplied from the hydraulic control device to the oil hole 11*h* and the hydraulic oil starts flowing out of the oil chamber 11*f* through the oil hole 11*h* in the state in which the parking lock is released (hereinafter, referred to as a "parking lock released state" where appropriate), the elastic force (urging force) of the return spring 16 moves the piston rod 12 and the piston 14 downward in FIG. 1 (hereinafter, expressed as toward a "locking side" where appropriate) in the moving direction of the piston rod 12. This operation rotates the detent lever 8 counterclockwise in FIG. 1 about the spindle 8*s* and moves the parking rod 4 leftward in FIG. 1. The movement of the parking rod 4 leftward in FIG. 1 causes the cam member 5 urged by the cam spring 7 to press the parking pawl 3 such that the parking pawl 3 engages with the parking gear 2, and thus the rotational shaft of the transmission is locked (the parking lock is applied). The engagement recess 8*r* at the second free end 8*b* of the detent lever 8 engages with the engagement member 9. Thus, the rotation of the detent lever 8 about the spindle 8*s* is restrained to some extent by the detent spring (not shown), and thereby restraining the movement of the parking rod 4 to some extent.

The magnetic locking device 20 is used to restrain the piston rod 12 and the piston 14 from moving by the elastic force (urging force) of the return spring 16 toward the locking side (downward in FIG. 1) and thus to prevent the parking lock released state from being switched to the parking lock state when the hydraulic pressure supplied to the oil chamber 11*f* of the hydraulic actuator 10 drops, for example, as an engine of the vehicle and an oil pump driven by the engine are stopped by an idling stop operation or the like.

As shown in FIG. 4, the magnetic locking device 20 includes: a lock shaft 21 that includes an abutting portion 210 capable of abutting on the roller 13 serving as the abutment target provided in the piston rod 12 (refer to FIG. 2); a transmission shaft 24 that is arranged on the right side in FIG. 4 of the lock shaft 21 and abuts on the lock shaft 21; a shaft holder 28 that supports the lock shaft 21 such that the lock shaft 21 is movable in the axial direction thereof (in the right-left direction in FIG. 4 (second direction)); and a magnetic unit 30 that holds the shaft holder 28 and locks (restrains movement in the right-left direction in FIG. 4 of) the lock shaft 21 and the transmission shaft 24 with a magnetic force.

The lock shaft 21 is formed of a nonmagnetic material, such as stainless steel, or a magnetic material, such as iron, and by applying thereto surface hardening treatment (such as quenching treatment) for hardening at least the surface of the material. As shown in FIG. 4, the lock shaft 21 is provided at one end (distal end) thereof with the abutting portion 210, and includes a small diameter portion 22 that is cylindrical except in the vicinity of the abutting portion 210 and a large diameter portion 23 that extends from the small diameter portion 22 toward a side opposite to the abutting portion 210 and that has a diameter larger than that of the small diameter portion 22 and has a cylindrical shape. In general, a non-magnetic material such as stainless steel and a magnetic material such as iron become a magnetic material after being subjected to the quenching treatment. An end face 214 on the transmission shaft 24 side (on the right side in FIG. 4) of the lock shaft 21 has a flat surface extending in a direction orthogonal to the axial direction of the lock shaft 21. A tapered portion 220 is provided on an outer circumferential surface of the small diameter portion 22 near the boundary between the small diameter portion 22 and the large diameter portion 23. The tapered portion 220 is formed so as to taper down (smaller in outside diameter) as the outer circumferential surface of the small diameter portion 22 extends from the abutting portion 210 side to the large diameter portion 23 side.

The abutting portion 210 provided at the distal end of the small diameter portion 22 is formed so as to have a shape with two parallel flat planes. The abutting portion 210 includes a first abutting surface 211 located on the locking side (on the lower side in FIG. 4) in the moving direction of the piston rod 12 (in the up-down direction in FIG. 4) and a second abutting surface 212 located on the lock releasing side (on the upper side in FIG. 4) in the moving direction of the piston rod 12. The first abutting surface 211 is formed so as to slope toward the locking side as the surface extends from the abutting portion 210 side toward the large diameter portion 23, and is specifically formed as a curved surface with a circular arc-shaped section that has a radius of curvature smaller than the radius (radius of curvature) of the outer circumferential surface of the roller 13 and that is convex toward the locking side. The second abutting surface 212 is formed so as to slope toward the lock releasing side as the surface extends from the abutting portion 210 side toward the large diameter portion 23, and specifically, is formed as a (flat) sloped surface sloped at a constant angle toward the lock releasing side.

The transmission shaft 24 is formed of a nonmagnetic material, such as stainless steel, and includes a cylindrical small diameter portion 25 and a large diameter portion 26 that extends from the small diameter portion 25 toward the lock shaft 21 and that has a diameter larger than that of the small diameter portion 25 and has a cylindrical shape, as shown in FIG. 4. An end face 240 on the lock shaft 21 side (on the left side in FIG. 4) of the transmission shaft 24 is formed in a spherical shape that is convex toward the lock shaft 21 side. An end face 241 on a side of the transmission shaft 24 opposite to the lock shaft 21 (on the right side in FIG. 4) is formed in a spherical shape that is convex rightward in FIG. 4. A tapered portion 250 is provided on an outer circumferential surface of the small diameter portion 25 near the boundary between the small diameter portion 25 and the large diameter portion 26. The tapered portion 250 is formed so as to taper down (smaller in outside diameter) as the outer circumferential surface of the small diameter portion 25 extends from the end face 241 side to the large diameter portion 26 side.

The shaft holder 28 is formed of a nonmagnetic material, such as aluminum, and includes: a cylindrical portion 280 having a hollow cylindrical shape; an annular inner flange 281 that extends radially inward from an end on the magnetic unit 30 side (on the right side in FIG. 4) of the cylindrical portion 280; and an annular outer flange 282 that extends outward in the radial direction from the end on the magnetic unit 30 side of the cylindrical portion 280, as shown in FIG. 4. The length in the axial direction of the cylindrical portion 280 is set to a value smaller than the length in the axial direction of the small diameter portion 22 of the lock shaft 21. The inside diameter of the inner flange 281 is set to a value larger than the outside diameter of the small diameter portion 22 of the lock shaft 21 and smaller than the outside diameter of the large diameter portion 23 of the lock shaft 21. A linear-motion bearing 29 is fixed to the inside of the shaft holder 28, and slidably supports the outer circumferential surface of the small diameter portion 22. The linear-motion bearing 29 is structured as a known linear-motion bearing that includes a hollow cylindrical outer cylinder, a cylindrical ball cage that is accommodated in the outer cylinder and has a plurality of ball circulation paths, and a plurality of balls arranged in each of the ball circulation paths of the ball cage. The lock shaft 21 is inserted from the magnetic unit 30 side (on the right side in FIG. 4) into the inner flange 281 of the shaft holder 28 and the linear-motion bearing 29, and the vicinity of the abutting portion 210 projects leftward in FIG. 4 from the shaft holder 28 and the linear-motion bearing 29. In the first embodiment, the linear-motion bearing 29 supports the small diameter portion 22 of the lock shaft 21, so that the lock shaft 21 can smoothly move in the axial direction thereof (in the right-left direction in FIG. 4) while being restrained from rattling. The outside diameter of the large diameter portion 23 of the lock shaft 21 is larger than the inside diameter of the inner flange 281 of the shaft holder 28, so that the lock shaft 21 and the transmission shaft 24 are restrained from coming leftward in FIG. 4 out of the shaft holder 28.

As shown in FIG. 4, the magnetic unit 30 includes the following: a plunger 31 movable in the axial direction thereof (in the right-left direction in FIG. 4); a first core 32 that is placed so as to surround the outer circumference of the plunger 31; a second core 33 that is placed so as to be located on the shaft holder 28 side (on the left side in FIG. 4) of the plunger 31 and the first core 32 and so as to surround the outer circumference of the transmission shaft 24; a gap member 34 placed between the first core 32 and the second core 33 so as to be in contact with both the cores 32 and 33; a coil 35 that is placed so as to surround most of the outer circumferences of the first core 32, the gap member 34, and the second core 33; an annular permanent magnet 36 that is placed so as to be located on a side of the coil 35 opposite to the shaft holder 28 (on the right side in FIG. 4) and so as to surround the outer circumference of the right end in FIG. 4 of the first core 32; a yoke 37 that functions as a case for accommodating, for example, the transmission shaft 24, the plunger 31, the first core 32, the second core 33, the gap member 34, the coil 35, and the permanent magnet 36, and holds the shaft holder 28; a rear cap 38 attached so as to hold the right ends in FIG. 4 of the permanent magnet 36 and the yoke 37; and a spring 39 serving as an elastic member that is placed between the plunger 31 and the rear cap 38, and urges the plunger 31 toward the shaft holder 28.

The plunger 31 is formed into a cylindrical shape by a nonmagnetic layer provided on a surface of a magnetic material, such as iron, and includes: a recess 310 formed on the shaft holder 28 side in the axial direction (on the left side in FIG. 4) thereof; an end face 313 that is a flat surface (specifically, a flat surface extending in a direction orthogonal to the axial direction of the plunger 31) surrounding the recess 310 and that has an annular shape; a recess 315 formed on a side opposite to the recess 310 in the axial direction; and a flat annular end face 316 surrounding the recess 315, as shown in FIG. 4. An air hole 319 is formed in the plunger 31 so as to communicate the recess 310 with the recess 315.

The recess 310 is formed as a circular hole having a bottom face 311 and an inner circumferential surface. The transmission shaft 24 is inserted into the recess 310 such that the end face 241 on the plunger 31 side (on the right side in FIG. 4) of the transmission shaft 24 abuts on the bottom face 311. The bottom face 311 of the recess 310 has a flat surface extending in a direction orthogonal to the axial direction of the plunger 31. The depth of the recess 310 is set to a value smaller than the length in the axial direction of the small diameter portion 25 of the transmission shaft 24. The inside diameter of the recess 310 is set to a value slightly larger than the outside diameter of the small diameter portion 25 of the transmission shaft 24 and larger than the inside diameter of an attracting portion 331 (to be described later) of the second core 33.

The plunger 31 is formed such that the recesses 310 and 315 have the same shape, and is formed so as to be symmetrical as a whole between the transmission shaft 24 side and the opposite side thereof with respect to a first plane (refer to FIG. 4) that passes through the center in the axial direction of the plunger 31 and is orthogonal to the axial direction thereof. Thus, when the plunger 31 is placed in the position shown in FIG. 4, either of the end faces 313 and 316 may face the transmission shaft 24 side, so that the workability can be improved.

The first core 32 is formed of a magnetic material, such as iron, and is formed into a hollow cylindrical shape having an inside diameter slightly larger than the outside diameter of the plunger 31. Most of the shaft holder 28 side of the first core 32 overlaps the coil 35 in the radial direction (direction orthogonal to the axial direction) thereof.

The gap member 34 is formed of a nonmagnetic material, such as a copper brazing filler metal, to provide a predetermined gap (magnetic gap in a magnetic circuit) between the first core 32 and second core 33 and also to fix the first core 32 to the second core 33. The gap member 34 is formed into an annular shape having inside and outside diameters equal to the inside and outside diameters of the first core 32. The gap member 34 is placed so as to include a second plane (refer to FIG. 4) that passes through the center in the axial direction of the coil 35 and is orthogonal to the axial direction thereof.

The second core 33 is formed of a magnetic material, such as iron, and includes: a hollow cylindrical first inside diameter portion 330 that has an inside diameter slightly larger than the outside diameter of the small diameter portion 25 of the transmission shaft 24 and slightly smaller than the inside diameter of the recess 310 of the plunger 31, and has an outside diameter equal to those of the first core 32 and the gap member 34; a hollow cylindrical second inside diameter portion 333 that extends from the first inside diameter portion 330 toward the shaft holder 28 (leftward in FIG. 4), and has an inside diameter larger than the inside diameter of the inner circumferential surface of the first inside diameter portion 330 and an outside diameter equal to that of the first inside diameter portion 330; and an annular flange 334 that extends outward in the radial direction from an end on the shaft holder 28 side of the second inside diameter portion 333. The coil 35 overlaps, in the radial direction thereof, the first inside diameter portion 330 and a portion of the second inside diameter portion 333 extending from the flange 334 toward the first inside diameter portion 330. An end face on the shaft holder 28 side (on the left side in FIG. 4) of the second core 33 abuts on an end face on the second core 33 side (on the right side in FIG. 4) of the shaft holder 28.

An end on the plunger 31 side (on the right side in FIG. 4) of the first inside diameter portion 330 extends radially inside the gap member 34 toward the plunger 31, and overlaps the gap member 34 in the radial direction thereof. The end on the plunger 31 side of the first inside diameter portion 330 serves as a portion that attracts the plunger 31 toward the second core 33 with a magnetic flux (hereinafter, referred to as a "magnet-induced magnetic flux" where appropriate) passing through a magnetic path constituted by the permanent magnet 36, the yoke 37, the second core 33 (the flange 334, the second inside diameter portion 333, and the first inside diameter portion 330), the plunger 31, the first core 32, and the permanent magnet 36. Hence, this portion is referred to as the attracting portion 331 hereinafter. As described above, the gap member 34 is placed so as to include the second plane. Therefore, the attracting portion 331 overlapping the gap member 34 in the radial direction can be said to be placed radially inside the coil 35 and at the center in the axial direction of the coil 35. An end face 332 on the plunger 31 side of the attracting portion 331 is formed as a flat surface extending in a direction orthogonal to the axial direction of the second core 33.

The coil 35 includes a terminal connected to a connector (not shown) attached to the yoke 37 serving as a case. The coil 35 is supplied with a current from an auxiliary battery of a vehicle (not shown) via a power supply circuit controlled by, for example, the electronic control device for controlling the hydraulic control device, and via the connector. The permanent magnet 36 is formed into an annular shape, and is magnetized so as to have the north pole outside in the radial direction and the south pole inside in the radial direction. The permanent magnet 36 may be magnetized so as to have the north pole and the south pole on the reverse sides of the above. The yoke 37 is formed of a magnetic material, such as iron, and includes a cylindrical portion 370 having a hollow cylindrical shape and a holder supporting portion 371 that extends from the cylindrical portion 370 toward the shaft holder 28 and holds the shaft holder 28 in cooperation with the end face on the shaft holder 28 side (on the left side in FIG. 4) of the second core 33. The holder supporting portion 371 is formed so as to cover the outer circumference and an end face on the left side in FIG. 4 of the outer flange 282 of the shaft holder 28. The spring 39, as shown in FIG. 4, has a spring constant (stiffness) smaller than that of the return spring 16 of the hydraulic actuator 10. The spring 39 urges the lock shaft 21, the transmission shaft 24, and the plunger 31 that are not fixed to one another, in an integrated manner toward the shaft holder 28 (leftward in FIG. 4).

In the magnetic unit 30 thus structured, when the coil 35 is not energized, the lock shaft 21, the transmission shaft 24, and the plunger 31 are urged toward the shaft holder 28 by the elastic force of the spring 39 and an attracting force applied to the plunger 31 by the attracting portion 331 based on the magnet-induced magnetic flux. When the coil 35 is energized, the energization generates a magnetic flux for canceling the magnet-induced magnetic flux (hereinafter, referred to as a "canceling magnetic flux" where appropriate), which, in turn, cancels the attraction of the plunger 31 applied by the attracting portion 331, so that the lock shaft 21, the transmission shaft 24, and the plunger 31 are urged toward the shaft holder 28 only by the elastic force of the spring 39. Hereinafter, where appropriate, a "return spring force component" refers to a force component in the axial direction of the lock shaft 21 and the like that is applied from the roller 13 to the second abutting surface 212 by the elastic force (downward force in FIGS. 2 and 4) of the return spring 16 when the roller 13 of the piston rod 12 is in contact with the second abutting surface 212 of the abutting portion 210 of the lock shaft 21. In the first embodiment, specifications of the magnetic unit 30 are set such that the sum of the attracting force applied to the plunger 31 by the attracting portion 331 and the elastic force of the spring 39 is larger than the return spring force component, and such that the elastic force of the spring 39 is smaller than the return spring force component. As a result, the lock shaft 21, the transmission shaft 24, and the plunger 31 are not moved toward the rear cap 38 by the return spring force component when the coil 35 is not energized, but are moved in an integrated manner toward the rear cap 38 by the return spring force component when the coil 35 is energized.

In the first embodiment, the maximum stroke amount in the axial direction (in the right-left direction in FIG. 4) of the lock shaft 21, the transmission shaft 24, and the plunger 31 (in the example of FIG. 4, the distance between the end face 316 of the plunger 31 and the inner bottom face of the rear cap 38) is set to a value smaller than the length in the axial direction of the second inside diameter portion 333 of the second core 33. As shown in FIG. 4, when the end face 313 of the plunger 31 abuts on the end face 332 of the attracting portion 331, the large diameter portion 23 of the lock shaft 21 does not abut on an end face on the magnetic unit 30 side of the shaft holder 28. Accordingly, when the lock shaft 21, the transmission shaft 24, and the plunger 31 move in the axial direction thereof, the large diameter portion 23 of the lock shaft 21 can be restrained from abutting on the end face on the magnetic unit 30 side of the shaft holder 28, and the large diameter portion 26 of the transmission shaft 24 can be restrained from abutting on the end face on the shaft holder 28 side of the first inside diameter portion 330 of the second core 33.

When the magnetic locking device 20 thus structured is in the assembled state (in the state when the assembly is completed), the lock shaft 21, the transmission shaft 24, and the plunger 31 are urged in an integrated manner toward the shaft holder 28 (leftward in FIG. 4) by the elastic force of the spring 39 and the attracting force applied to the plunger 31 by the attracting portion 331 based on the magnet-induced magnetic flux such that the end face 313 of the plunger 31 abuts on the end face 332 of the attracting portion 331.

In the first embodiment, the transmission shaft 24 is formed of a nonmagnetic material. This can result in a smaller leakage of the magnet-induced magnetic flux and the canceling magnetic flux caused by the transmission shaft 24, and thus can provide a higher magnetic efficiency than in the case of the transmission shaft 24 formed of a magnetic material. Moreover, the shaft holder 28 also is formed of a nonmagnetic material. This can also result in a smaller leakage of the magnet-induced magnetic flux and the canceling magnetic flux caused by the shaft holder 28. The recess 310 is formed on the transmission shaft 24 side of the plunger 31. This results in a smaller difference in magnetic path area between the attracting portion 331 and a portion near the end face 313 of the plunger 31 than in the case of not forming the recess 310. Hence, the magnetic fluxes leakage between the attracting portion 331 and the plunger 31 (near the end face 313 in particular) can be restrained. Moreover, the inside diameter of the recess 310 of the plunger 31 is set to a value larger than the inside diameter of the attracting portion 331. This can further restrain the magnetic flux leakage between the attracting portion 331 and the plunger 31 (near the end face 313 in particular).

In the first embodiment, the permanent magnet 36 of the magnetic unit 30 is placed so as to surround the outer circumference of the right end in FIG. 4 of the first core 32. Accordingly, compared with a case of placing the permanent magnet 36 in a position facing the plunger 31 in the right-left direction in FIG. 4 (in the position of the attracting portion 331, for example), the plunger 31 can move without abutting on the permanent magnet 36, so that the permanent magnet 36 can be protected. Moreover, the permanent magnet 36 is placed on a side of the coil 35 opposite to the shaft holder 28, and is magnetized in the radial direction. This can provide a smaller length, particularly a smaller length in the right-left direction in FIG. 4, of the magnetic path of the magnetic circuit (the permanent magnet 36, the yoke 37, the second core 33, the plunger 31, the first core 32, and the permanent magnet 36) that generates the magnet-induced magnetic flux than in the case of placing the permanent magnet 36 in this position and magnetizing it in the axial direction.

The magnetic locking device 20 is attached (fixed) to the case 11 of the hydraulic actuator 10 such that the axial direction (up-down direction in FIGS. 1 and 2) of the piston rod 12 of the hydraulic actuator 10 is orthogonal to the axial direction (right-left direction in FIGS. 1 and 2) of the lock shaft 21, the transmission shaft 24, and the plunger 31 of the magnetic locking device 20, and such that the abutting portion 210 of the lock shaft 21 is capable of abutting on the roller 13 in the hole 12h of the piston rod 12. The magnetic locking device 20 is attached to the hydraulic actuator 10 in this manner such that the axial direction of the piston rod 12 is orthogonal to the axial direction of the lock shaft 21 and the like. As a result, the hydraulic actuator 10 and the magnetic locking device 20 can be arranged in a limited space inside or outside the transmission case more easily than in the case of arranging the hydraulic actuator 10 and the magnetic locking device 20 on the same axis line. In this case, the abutting portion 210 of the lock shaft 21 overlaps at least a part of the outer circumferential surface of the roller 13 when viewed from the axial direction of the piston rod 12 (from the up-down direction in FIG. 2), and a first predetermined gap is formed between the lock shaft 21 and the roller 13. This structure allows the magnetic locking device 20 to be attached to the hydraulic actuator 10 more easily than a structure in which the first abutting surface 211 abuts on the roller 13 and the abutting operation moves the lock shaft 21 and the like toward the rear cap 38 (moves the lock shaft 21 and the like toward the rear cap 38 against the force obtained by adding the elastic force of the spring 39 to the attracting force applied to the plunger 31 by the attracting portion 331 based on the magnet-induced magnetic flux) when the magnetic locking device 20 is attached to the case 11.

When the magnetic locking device 20 is attached to the case 11, the yoke 37 is fixed to the case 11 via a supporting member 50, as shown in FIG. 2. When the roller 13 of the piston rod 12 abuts on the abutting portion 210 (the first abutting surface 211 or the second abutting surface 212) of the lock shaft 21, a force is applied from the roller 13 to the abutting portion 210, and, when the coil 35 is not energized, the force component toward the right in FIGS. 2 and 4 of the force applied to the abutting portion 210 acts on the holder supporting portion 371 of the yoke 37 via the lock shaft 21, the transmission shaft 24, the plunger 31, and the second core 33 (the first inside diameter portion 330, the second inside diameter portion 333, and the flange 334) applying the attracting force to the plunger 31, as can be understood from FIGS. 2 and 4. Thus, when the yoke 37 is not fixed to the case 11 via the supporting member 50, the yoke 37 is urged to move rightward in FIGS. 2 and 4, so that a relatively large force is applied between the holder supporting portion 371 and the outer flange 282 of the shaft holder 28. However, in the first embodiment, the yoke 37 is fixed to the case 11 via the supporting member 50, so that a large force can be restrained from acting between the holder supporting portion 371 and the outer flange 282. As a result, the yoke 37 and the shaft holder 28 can be more protected.

The following describes operations of the parking device 1 and the magnetic locking device 20 of the first embodiment structured in the above-described manner.

When the oil chamber 11f of the hydraulic actuator 10 is not supplied with the hydraulic pressure (hydraulic oil) from the hydraulic control device and the coil 35 in the magnetic unit 30 of the magnetic locking device 20 is not energized, the hydraulic actuator 10 and the magnetic locking device 20 are placed in the state shown in FIG. 2, and the rotational shaft of the transmission is locked by the parking device 1 (the parking lock is applied). At this time, in the hydraulic actuator 10, the piston rod 12 is urged toward the locking side (downward in FIG. 2) by the elastic force of the return spring 16 to be closest to or in contact with the bottom of the case 11. In the magnetic locking device 20, the lock shaft 21, the transmission shaft 24, and the plunger 31 are urged in an integrated manner toward the piston rod 12 (leftward in FIG. 2) by the elastic force of the spring 39 and the attracting force applied to the plunger 31 by the attracting portion 331 based on the magnet-induced magnetic flux, so that the end face 313 of the plunger 31 abuts on the end face 332 of the attracting portion 331 of the second core 33 and the abutting portion 210 of the lock shaft 21 is capable of abutting on the roller 13 in the hole 12h. In addition, the first predetermined gap is formed between the first abutting surface 211 of the abutting portion 210 of the lock shaft 21 and the roller 13.

To switch the parking lock state to the parking lock released state before starting to run the vehicle, the oil chamber 11f of the hydraulic actuator 10 starts to be supplied with the hydraulic pressure (hydraulic oil) from the hydraulic control device, and the coil 35 of the magnetic unit 30 starts to be energized. When the coil 35 starts to be energized, the canceling magnetic flux generated by the energization cancels the attraction of the plunger 31 applied by the attracting portion 331 of the second core 33. Accordingly, the lock shaft 21, the transmission shaft 24, and the plunger 31 are in the state of being urged toward the piston rod 12 (leftward in FIG. 2) only by the elastic force of the spring 39.

Figure 5:
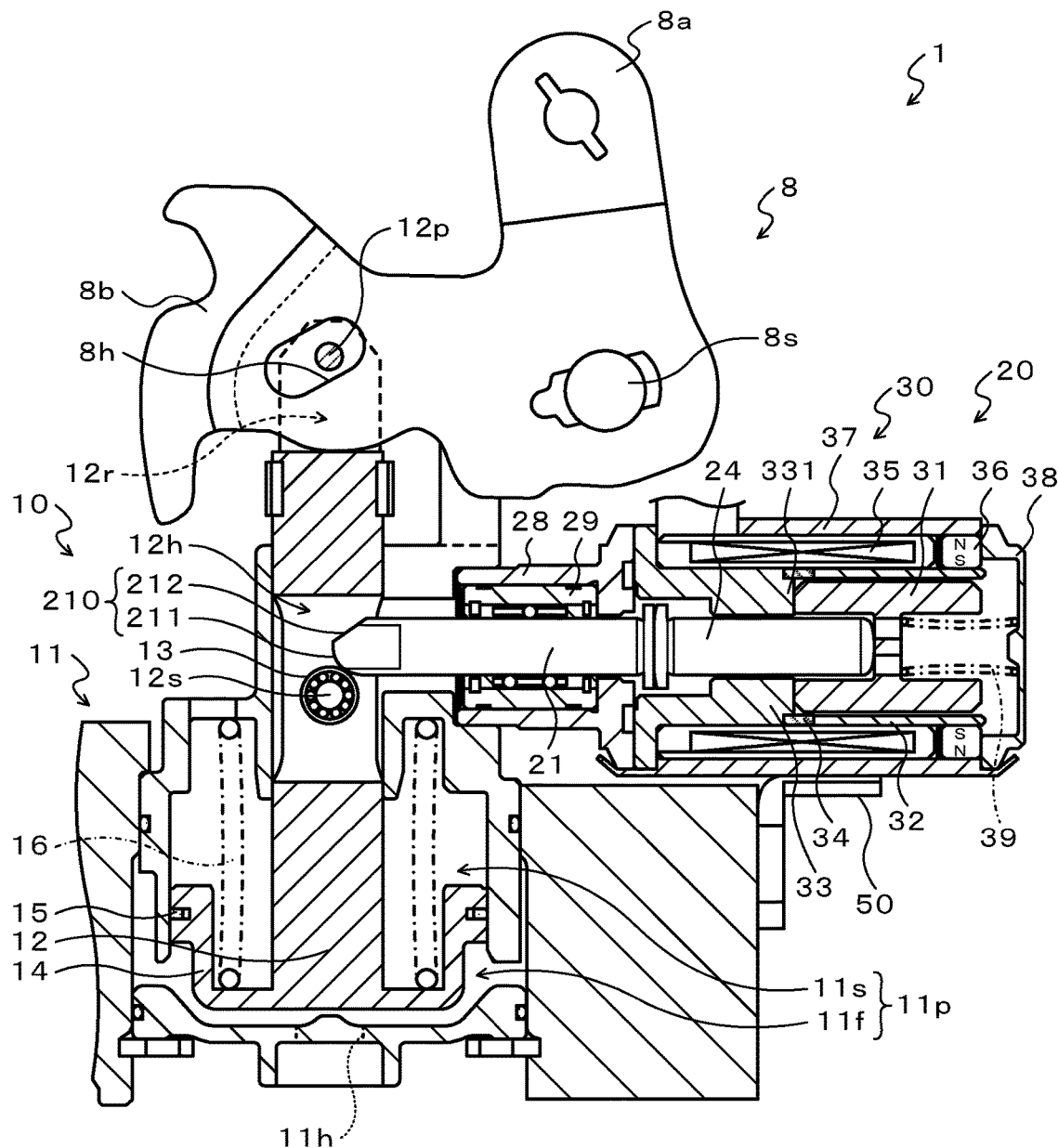
FIG. 5 is an explanatory diagram for explaining an operation of the parking device 1 and the magnetic locking device 20.

When the oil chamber 11f of the hydraulic actuator 10 is supplied with the hydraulic pressure from the hydraulic control device, the hydraulic pressure in the oil chamber 11f moves the piston rod 12 and the piston 14 toward the lock releasing side (upward in FIG. 5) against the elastic force of the return spring 16, and the roller 13 of the piston rod 12 abuts on the first abutting surface 211 of the abutting portion 210 of the lock shaft 21, as shown in FIG. 5. At this time, on the lock shaft 21, a pressure receiving portion of the first abutting surface 211 receiving a force from the roller 13 serves as a point of effort, and a supported portion of the small diameter portion 22 supported by the linear-motion bearing 29 serves as a fulcrum point and a point of load. The pressure receiving portion and the supported portion receive forces from the roller 13 and the linear-motion bearing 29, respectively. The roller 13 rolls on the first abutting surface 211, and along with it, a force in a direction orthogonal to the tangent line between the roller 13 and the first abutting surface 211 (hereinafter, referred to as a "first normal direction force" where appropriate) is applied from the roller 13 to the first abutting surface 211. A force component in the axial direction of the lock shaft 21 obtained from the first normal direction force (rightward force in FIG. 5) moves the lock shaft 21, the transmission shaft 24, and the plunger 31 that are not fixed to one another, in an integrated manner, away from the piston rod 12 (toward the rear cap 38) against the elastic force of the spring 39.

Figure 6:
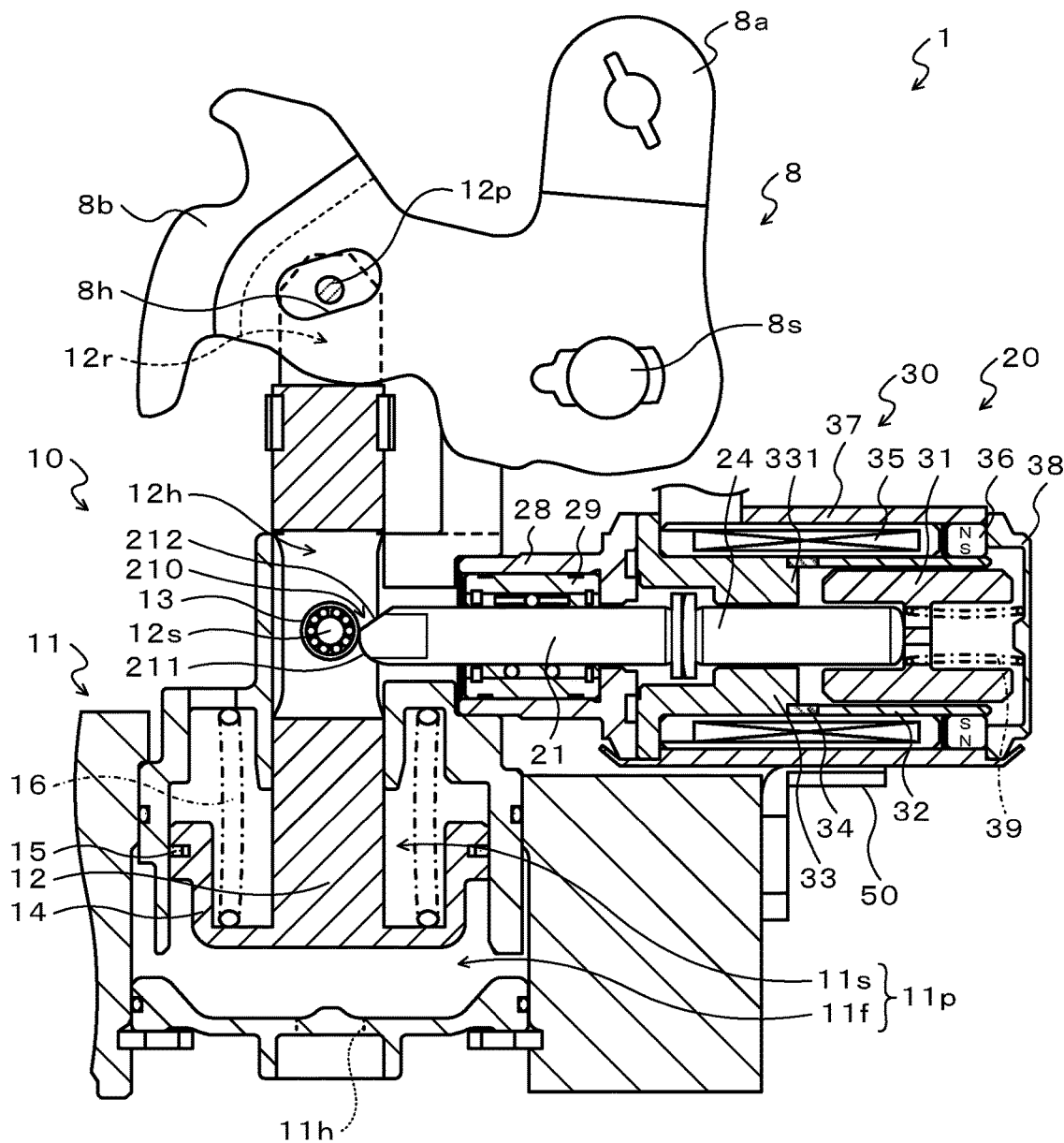
FIG. 6 is an explanatory diagram for explaining another operation of the parking device 1 and the magnetic locking device 20.
Figure 7:
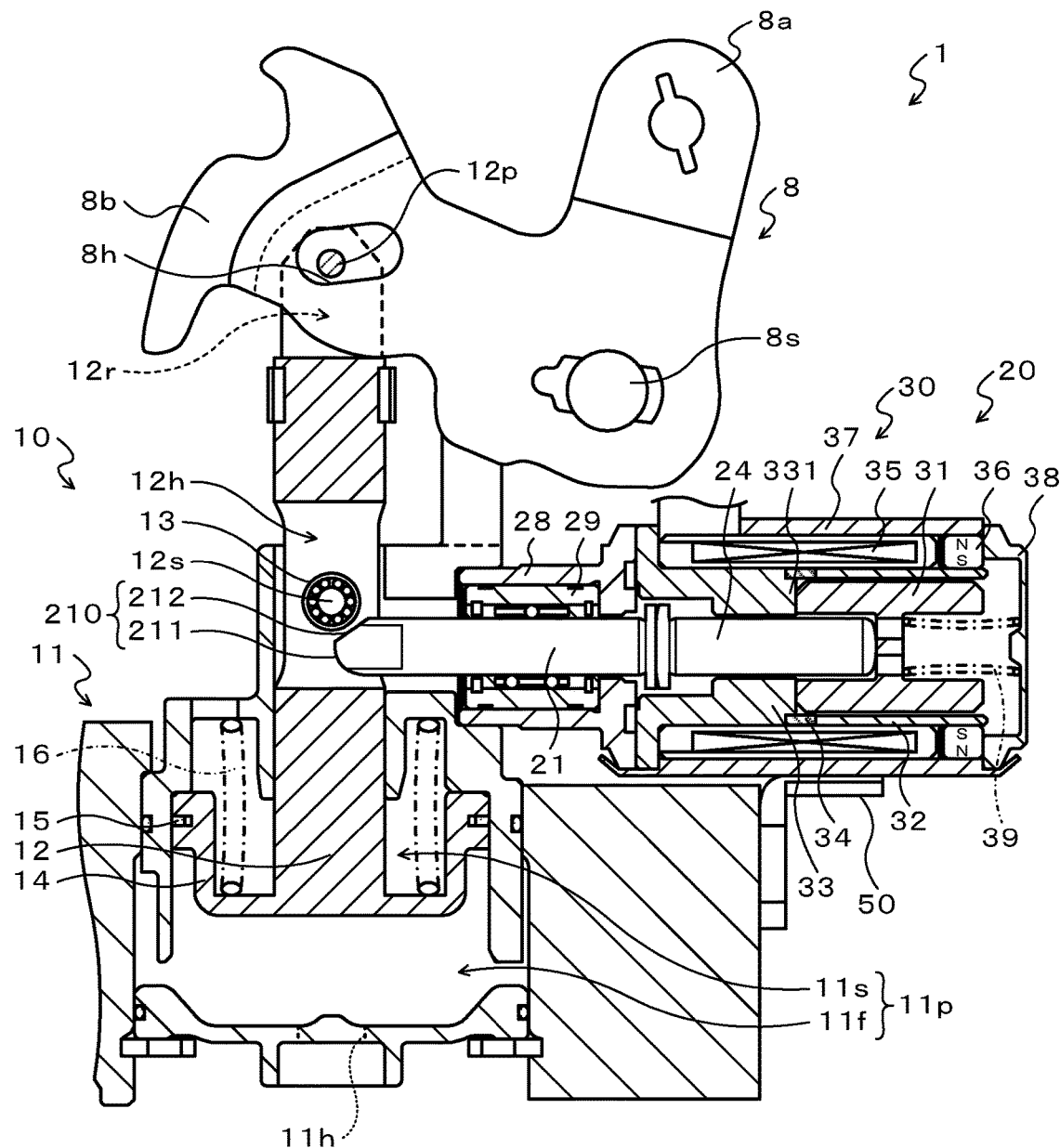
FIG. 7 is an explanatory diagram for explaining still another operation of the parking device 1 and the magnetic locking device 20.

As shown in FIG. 6, when the roller 13 finishes being in contact with the first abutting surface 211 of the abutting portion 210 of the lock shaft 21 as the piston rod 12 moves toward the lock releasing side, the elastic force of the spring 39 moves the lock shaft 21, the transmission shaft 24, and the plunger 31 toward the piston rod 12 (leftward in FIG. 6), and the roller 13 starts rolling on the second abutting surface 212. At this time, the roller 13 moves toward the lock releasing side (upward in FIG. 6) together with the piston rod 12, so that the roller 13 basically applies no force for moving the lock shaft 21 and the like toward the rear cap 38 (rightward in FIG. 6) to the second abutting surface 212. Then, the piston rod 12 is further moved toward the lock releasing side by the hydraulic pressure, and stops in a position to form a second predetermined gap between the roller 13 and the second abutting surface 212, as shown in FIG. 7.

After the hydraulic pressure starts moving the piston rod 12 toward the lock releasing side until the piston rod 12 stops as described above, the detent lever 8 rotates clockwise in FIG. 1 about the spindle 8s, and the parking rod 4 moves rightward in FIG. 1. Consequently, the movement of the parking rod 4 releases the pressure from the cam member 5 onto the parking pawl 3, and thus the parking lock is released. When the parking lock released state is established in this manner, the coil 35 finishes being energized.

In the first embodiment, when the hydraulic pressure moves the piston rod 12 toward the lock releasing side, the coil 35 of the magnetic unit 30 starts to be energized to cancel the attraction of the plunger 31 applied by the attracting portion 331 of the second core 33 in the magnetic unit 30. Accordingly, the lock shaft 21, the transmission shaft 24, and the plunger 31 can be moved away from the piston rod 12 (moved toward the rear cap 38) more easily than in the case of not energizing the coil 35, that is, not canceling the attraction of the plunger 31 applied by the attracting portion 331. This cancellation of attraction can quickly move the piston rod 12 toward the lock releasing side, and can reduce the hydraulic pressure required to move the piston rod 12 toward the lock releasing side.

In the first embodiment, the first abutting surface 211 receives a force from the roller 13 when the hydraulic pressure moves the piston rod 12 toward the lock releasing side. The first abutting surface 211 receiving the force has a radius of curvature smaller than the radius (radius of curvature) of the outer circumferential surface of the roller 13. This dimensional relation can increase the force component in the axial direction of the lock shaft 21 obtained from the first normal direction force applied from the roller 13 to the lock shaft 21 when the piston rod 12 is moving toward the lock releasing side, so that an increase in the hydraulic pressure to be supplied to the oil chamber 11$f$ of the hydraulic actuator 10 to release the parking lock can be suppressed.

Moreover, in the first embodiment, the roller 13 is rotatably supported by the piston rod 12, and rolls on the first abutting surface 211 and the second abutting surface 212 when the piston rod 12 is moving toward the lock releasing side. This reduces frictional resistance of the roller 13 to the first abutting surface 211 and the second abutting surface 212, and thus can improve wear resistance (durability) of the roller 13 and the first and second abutting surfaces 211 and 212.

As shown in FIG. 7, after the piston rod 12 is hydraulically moved to the lock releasing side and the parking lock is released, the parking lock released state can be maintained while the hydraulic pressure is supplied from the hydraulic control device to the oil chamber 11$f$ of the hydraulic actuator 10. At this time, the second abutting surface 212 of the abutting portion 210 of the lock shaft 21 and the roller 13 of the piston rod 12 are separate from each other, as described above. In addition, the coil 35 is not energized. Accordingly, in the magnetic locking device 20, the lock shaft 21, the transmission shaft 24, and the plunger 31 are urged in an integrated manner toward the piston rod 12 (leftward in FIG. 7) by the elastic force of the spring 39 and the attracting force applied to the plunger 31 by the attracting portion 331 based on the magnet-induced magnetic flux, so that the end face 313 of the plunger 31 is in contact with the end face 332 of the attracting portion 331 of the second core 33 and the abutting portion 210 of the lock shaft 21 is capable of abutting on the roller 13 in the hole 12$h$. In addition, the second predetermined gap is formed between the second abutting surface 212 of the abutting portion 210 of the lock shaft 21 and the roller 13.

Figure 8:
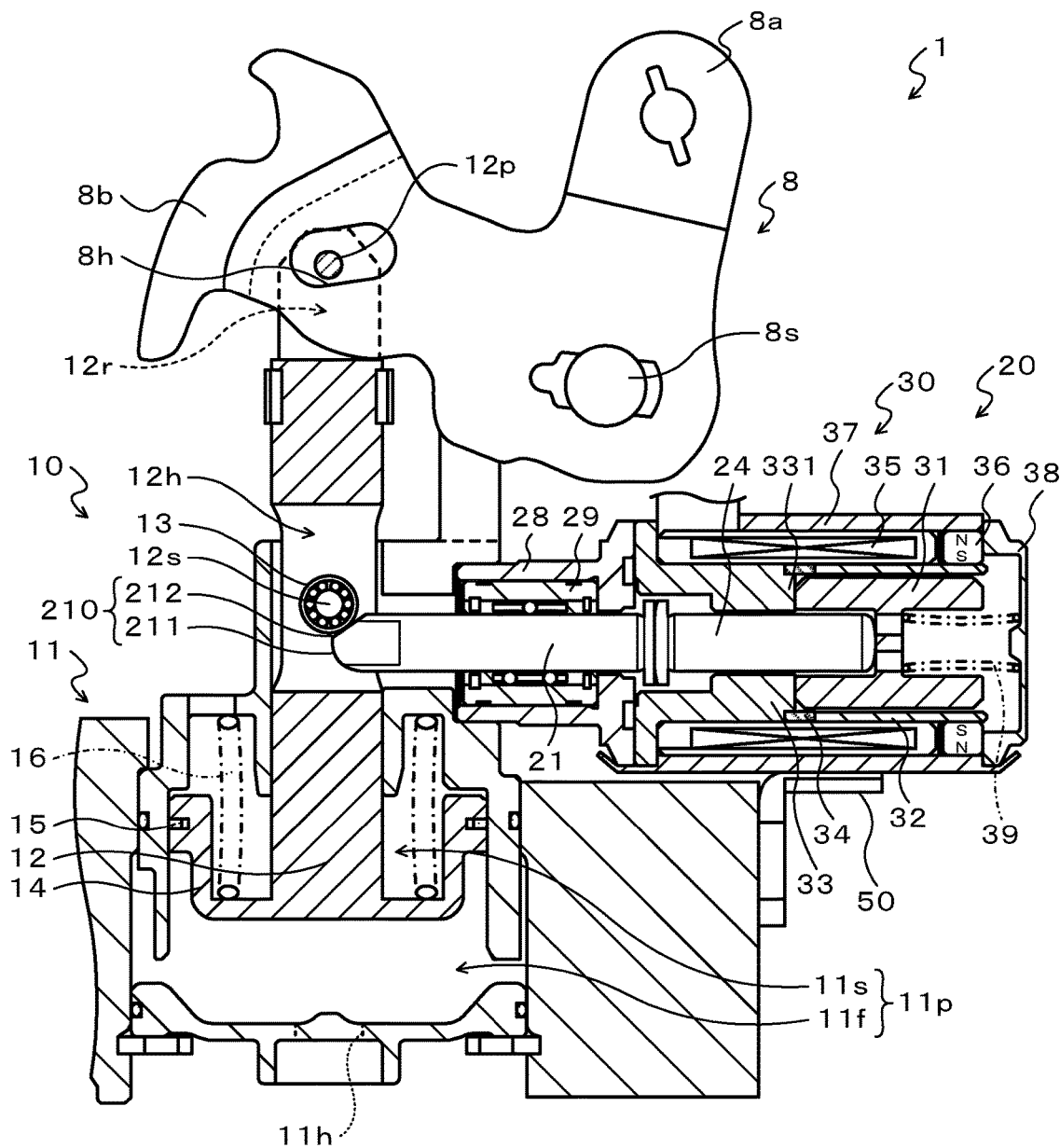
FIG. 8 is an explanatory diagram for explaining still another operation of the parking device 1 and the magnetic locking device 20.

In the parking lock released state of FIG. 7, when the engine and the oil pump driven by the engine are stopped, for example, by execution of the idling stop operation, the oil chamber 11$f$ of the hydraulic actuator 10 stops being supplied with a sufficient hydraulic pressure from the hydraulic control device, and the elastic force of the return spring 16 moves the piston rod 12 and the piston 14 toward the locking side (downward in FIG. 8), and the roller 13 of the piston rod 12 abuts on the second abutting surface 212 of the abutting portion 210 of the lock shaft 21, as shown in FIG. 8. At this time, on the lock shaft 21, a pressure receiving portion of the second abutting surface 212 receiving a force from the roller 13 serves as a point of effort, and a supported portion of the small diameter portion 22 supported by the linear-motion bearing 29 serves as a fulcrum point and a point of load. The pressure receiving portion and the supported portion receive forces from the roller 13 and the linear-motion bearing 29, respectively.

In the first embodiment, as described above, the specifications of the magnetic unit 30 are set such that the sum of the attracting force applied to the plunger 31 by the attracting portion 331 based on the magnet-induced magnetic flux and the elastic force applied by the spring 39 is larger than the return spring force component described above. Hence, the lock shaft 21 and the like can be restrained from moving away from the piston rod 12, so that the piston rod 12 can be restrained from moving toward the locking side. As a result, the parking lock released state can be maintained even when the hydraulic pressure of the oil chamber 11$f$ of the hydraulic actuator 10 is reduced by the execution of the idling stop operation or the like. Moreover, the coil 35 need not be supplied with a current at this time, so that power consumption can be suppressed, and the parking lock released state can be maintained even when the coil 35 cannot be energized for any reason.

In the first embodiment, the attracting portion 331 of the second core 33 in the magnetic unit 30 is placed radially inside the coil 35 and at the center in the axial direction of the coil 35. At the radially inside of the coil 35, the magnet-induced magnetic flux and the canceling magnetic flux can align in the axial direction (can have a higher magnetic flux density in the axial direction) more easily near the center in the axial direction of the coil 35 than near ends in the axial direction thereof. Accordingly, the end face 332 of the attracting portion 331 formed as a flat surface extending in a direction orthogonal to the axial direction of the second core 33 can be said to be provided in a position orthogonal to the magnetic flux (magnetic flux in the axial direction) that passes radially inside the coil 35. The end face 332 of the attracting portion 331 is parallel to the end face 313 on the attracting portion 331 side of the plunger 31 formed as a flat surface extending in a direction orthogonal to the axial direction of the plunger 31. In this manner, the attracting portion 331 is placed at the center in the axial direction of the coil 35; the end face 332 of the attracting portion 331 is provided in the position orthogonal to the magnetic flux passing radially inside the coil 35; and the end face 332 of the attracting portion 331 is parallel to the end face 313 of the plunger 31. Thereby, the magnetic flux density in the axial direction can be higher than that of a magnetic unit in which the attracting portion 331 is placed at a place (such as an end) other than the center in the axial direction of the coil 35, so that the direction of the magnetic flux is difficult to align, in which the end face of the attracting portion 331 is not provided in a position orthogonal to the magnetic flux that passes radially inside the coil 35, or in which the end face 332 of the attracting portion 331 is not parallel to the end face 313 of the plunger 31. This structure can increase the attracting force applied to the plunger 31 by the attracting portion 331 when the coil 35 is not energized while restraining the parking device from increasing in size, and can restrain the lock shaft 21, the transmission shaft 24, and the plunger 31 from moving in the axial direction thereof, in a more reliable manner (with a larger force). As a result, the piston rod 12 can be more reliably restrained from moving toward the locking side when the roller 13 of the piston rod 12 is in contact with the second abutting surface 212 of the abutting portion 210 of the lock shaft 21, and also the parking device can be reduced in size. In addition, when the coil 35 is not energized (refer to FIGS. 7 and 8), the lock shaft 21, the transmission shaft 24, and the plunger 31 are urged in an integrated manner toward the shaft holder 28 by the elastic force of the spring 39 and the attracting force applied to the plunger 31 by the attracting portion 331 based on the magnet-induced magnetic flux such that the end face 313 of the plunger 31 abuts on the end face 332 of the attracting portion 331. Thus, the distance between the attracting portion 331 and the plunger 31 can be smaller than that of a device in which the end face 313 of the plunger 31 does not abut on the end face 332 of the attracting portion 331, so that the attracting force applied to the plunger 31 by the attracting portion 331 can be larger than that of such a device, when the coil 35 is not energized.

Moreover, in the first embodiment, the second abutting surface 212 of the abutting portion 210 of the lock shaft 21 is formed as a (flat) sloped surface that is sloped at a constant angle toward the lock releasing side as the surface extends from the abutting portion 210 side toward the large diameter portion 23. Thus, the force applied from the roller 13 to the second abutting surface 212 is constant regardless of the position of contact between the roller 13 and the second abutting surface 212. As a result, the attracting force applied to the plunger 31 by the attracting portion 331 need not be larger than necessary when the coil 35 is not energized, so that the magnetic locking device 20, and consequently the parking device 1, can be restrained from increasing in size more than necessary.

When the coil 35 of the magnetic unit 30 starts to be energized in the parking lock released state of FIGS. 7 and 8, the canceling magnetic flux generated by the energization cancels the attraction of the plunger 31 applied by the attracting portion 331 of the second core 33. Accordingly, the lock shaft 21, the transmission shaft 24, and the plunger 31 are in the state of being urged toward the piston rod 12 (leftward in FIG. 2) only by the elastic force of the spring 39. When the hydraulic pressure supplied from the hydraulic control device to the oil chamber 11f of the hydraulic actuator 10 drops while the coil 35 is energized, the hydraulic oil flows out of the oil chamber 11f through the oil hole 11h, and, from the state of FIG. 7, the elastic force of the return spring 16 moves the piston rod 12 and the piston 14 toward the locking side (downward in FIG. 7), so that the roller 13 of the piston rod 12 abuts on the second abutting surface 212 of the abutting portion 210 of the lock shaft 21. In the state of FIG. 8, the roller 13 is already in contact with the second abutting surface 212. Then, the roller 13 rolls on the second abutting surface 212, and along with it, a force in a direction orthogonal to the tangent line between the roller 13 and the second abutting surface 212 (hereinafter, referred to as a "second normal direction force" where appropriate) is applied from the roller 13 to the second abutting surface 212. A force component in the axial direction of the lock shaft 21 obtained from the second normal direction force (the return spring force component described above, that is, a rightward force in FIGS. 7 and 8) moves the lock shaft 21, the transmission shaft 24, and the plunger 31 that are not fixed to one another, in an integrated manner, away from the piston rod 12 (toward the rear cap 38) against the elastic force of the spring 39.

When the roller 13 finishes being in contact with the second abutting surface 212 of the abutting portion 210 of the lock shaft 21 as the piston rod 12 moves toward the locking side, the elastic force of the spring 39 moves the lock shaft 21, the transmission shaft 24, and the plunger 31 toward the piston rod 12, and the roller 13 starts rolling on the first abutting surface 211. At this time, the roller 13 moves toward the locking side together with the piston rod 12, so that the roller 13 basically applies no force for moving the lock shaft 21 and the like toward the rear cap 38 to the first abutting surface 211. Then, the piston rod 12 is further moved toward the locking side by the elastic force of the return spring 16, and stops in the position to form the first predetermined gap between the roller 13 and the first abutting surface 211, as shown in FIG. 2.

After the elastic force of the return spring 16 starts moving the piston rod 12 toward the locking side until the piston rod 12 stops as described above, the detent lever 8 rotates counterclockwise in FIG. 1 about the spindle 8s, and the parking rod 4 moves leftward in FIG. 1. Consequently, the movement of the parking rod 4 causes the cam member 5 urged by the cam spring 7 to press the parking pawl 3 such that the parking pawl 3 engages with the parking gear 2, and thus the parking lock is applied. After the parking lock state is established in this manner, the coil 35 finishes being energized.

When the piston rod 12 is moving toward the locking side, the roller 13 also rolls on the second abutting surface 212 and the first abutting surface 211 in a manner similar to when the piston rod 12 is moving toward the lock releasing side. This reduces the frictional resistance of the roller 13 to the second abutting surface 212 and the first abutting surface 211, and thus can improve the wear resistance (durability) of the roller 13 and the first and second abutting surfaces 211 and 212.

In the first embodiment, the lock shaft 21 and the transmission shaft 24 of the magnetic locking device 20 are structured as separate bodies. When the separate bodies move in an integrated manner, the transmission shaft 24 moves in the axial direction thereof radially inside the attracting portion 331 of the second core 33. As the lock shaft 21 and the transmission shaft 24 are structured as separate bodies, if the lock shaft 21 rattles in the radial direction thereof when the roller 13 of the piston rod 12 abuts on the first abutting surface 211 of the abutting portion 210 of the lock shaft 21 (refer to FIG. 5) or when the roller 13 of the piston rod 12 abuts on the second abutting surface 212 of the abutting portion 210 of the lock shaft 21 (refer to FIG. 8), the rattling can be restrained from being transmitted to the transmission shaft 24, so that the transmission shaft 24 can be restrained from rattling in the radial direction thereof. Thus, a clearance between the outer circumference of the transmission shaft 24 and the inner circumference of the attracting portion 331 can be smaller, that is, the inside diameter of the inner circumferential surface of the first inside diameter portion 330 can be smaller, than in the case of structuring the lock shaft 21 and the transmission shaft 24 as one member. As a result, the magnetic locking device 20 can be improved in magnetic efficiency, and can be reduced in size. Moreover, the end face 214 on the transmission shaft 24 side of the lock shaft 21 has a flat surface extending in a direction orthogonal to the axial direction of the lock shaft 21, and the end face 240 on the lock shaft 21 side of the transmission shaft 24 is formed in a spherical shape that is convex toward the lock shaft 21 side. Consequently, the end face 214 of the lock shaft 21 abuts on the end face 240 of the transmission shaft 24 in a relatively small area. Hence, if the lock shaft 21 rattles in the radial direction thereof, the rattling can be further restrained from being transmitted to the transmission shaft 24, so that the transmission shaft 24 can be further restrained from rattling in the radial direction thereof. As a result, a clearance between the outer circumference of the transmission shaft 24 and the inner circumference of the attracting portion 331 of the second core 33 can be further reduced. In addition, the end face 241 on the plunger 31 side of the transmission shaft 24 is formed in a spherical shape that is convex toward the plunger 31 side, and the bottom face 311 of the recess 310 of the plunger 31 has a flat surface extending in a direction orthogonal to the axial direction of the plunger 31. Consequently, if a slight amount of the rattling in the radial direction is transmitted from the lock shaft 21 to the transmission shaft 24, the rattling can be absorbed by the transmission shaft 24 to be restrained from being transmitted to the plunger 31, so that the plunger 31 can be further restrained from rattling in the radial direction thereof. As a result, clearances between the plunger 31 and the first core 32 and between the plunger 31 and the gap member 34 can be reduced. The inside diameter of the recess 310 on the transmission shaft 24 side of the plunger 31 is set to a value slightly larger than the outside diameter of the small diameter portion 25 of the transmission shaft 24. Consequently, if the transmission shaft 24 slightly rattles in the radial direction thereof, the rattling can be absorbed by a clearance between the outer circumferential surface of the small diameter portion 25 of the transmission shaft 24 and the inner circumferential surface of the recess 310, so that the plunger 31 can be further restrained from rattling in the radial direction thereof.

In the first embodiment, the lock shaft 21 of the magnetic locking device 20 is subjected to surface hardening treatment to be provided with a high hardness. Consequently, when the roller 13 of the piston rod 12 is not in contact with the abutting portion 210 of the lock shaft 21, the small diameter portion 22 of the lock shaft 21 can be restrained from being deformed (for example, dented on a surface thereof) by a force received from the linear-motion bearing 29 compared with the case of without the surface hardening treatment. When the roller 13 of the piston rod 12 abuts on the first abutting surface 211 of the abutting portion 210 of the lock shaft 21 (refer to FIG. 5), the first abutting surface 211 and the small diameter portion 22 of the lock shaft 21 are restrained from being deformed (for example, dented on surfaces thereof) by forces received from the roller 13 and the linear-motion bearing 29. In addition, when the roller 13 of the piston rod 12 abuts on the second abutting surface 212 of the abutting portion 210 of the lock shaft 21 (refer to FIG. 8), the second abutting surface 212 and the small diameter portion 22 of the lock shaft 21 are restrained from being deformed (for example, dented on surfaces thereof) by forces received from the roller 13 and the linear-motion bearing 29. As a result of these restraints, the lock shaft 21 can be improved in durability. When the roller 13 abuts on the abutting portion 210 (the first abutting surface 211 or the second abutting surface 212), a force is applied from the roller 13 to the abutting portion 210 in a direction different from the right-left direction in FIGS. 5 and 8, so that the linear-motion bearing 29 applies, to the small diameter portion 22 of the lock shaft 21, a force larger than that applied when the roller 13 does not abut on the abutting portion 210. For this reason, increasing the hardness of the small diameter portion 22 has a large significance for the situation in which the roller 13 abuts on the abutting portion 210. As can be understood from FIGS. 5 and 8, when the pressure receiving portion (point of effort) of the abutting portion 210 (the first abutting surface 211 or the second abutting surface 212) receiving a force from the roller 13 is separate to some extent from the supported portion (the fulcrum point and the point of load) of the small diameter portion 22 supported by the linear-motion bearing 29, a larger force is basically applied to the supported portion of the small diameter portion 22 than to the pressure receiving portion of the abutting portion 210. For this reason, increasing the hardness of the small diameter portion 22 has a larger significance than that of increasing the hardness of the abutting portion 210.

Moreover, in the first embodiment, the air hole 319 is formed in the plunger 31 of the magnetic locking device 20 so as to communicate the recess 310 with the recess 315. This structure can restrain a change in pressure of a space on the shaft holder 28 side of the plunger 31 (space formed by the plunger 31, the second core 33, and the shaft holder 28), specifically, can restrain a reduction in pressure (from becoming negative pressure) of the space on the shaft holder 28 side of the plunger 31 associated with the movement of the plunger 31 from the position in the assembled state of the magnetic locking device 20 (refer to FIG. 4) toward the rear cap 38 (refer to FIG. 6) when the plunger 31 moves in the axial direction thereof (refer to FIG. 6). This can smooth the operation of movement of the lock shaft 21, the transmission shaft 24, and the plunger 31 toward the rear cap 38.

In the parking device 1 of the first embodiment described above, the end face 332 on the plunger 31 side of the attracting portion 331 of the second core 33 in the magnetic unit 30 of the magnetic locking device 20 is provided in the position orthogonal to the magnetic flux (magnetic flux in the axial direction) that passes radially inside the coil 35. This structure can increase the attracting force applied to the plunger 31 by the attracting portion 331 when the coil 35 is not energized while restraining the magnetic locking device 20, and consequently the parking device 1, from increasing in size, and can restrain the lock shaft 21, the transmission shaft 24, and the plunger 31 from moving in the axial direction thereof, in a more reliable manner (with a larger force). As a result, the piston rod 12 can be more reliably restrained from moving toward the locking side when the roller 13 of the piston rod 12 is in contact with the second abutting surface 212 of the abutting portion 210 of the lock shaft 21, and also the magnetic locking device 20, and consequently the parking device 1, can be reduced in size.

In addition, in the parking device 1 of the first embodiment, when the coil 35 in the magnetic unit 30 of the magnetic locking device 20 is not energized, the lock shaft 21, the transmission shaft 24, and the plunger 31 are urged in an integrated manner toward the shaft holder 28 by the elastic force of the spring 39 and the attracting force applied to the plunger 31 by the attracting portion 331 based on the magnet-induced magnetic flux such that the end face 313 of the plunger 31 abuts on the end face 332 of the attracting portion 331. Thus, the distance between the attracting portion 331 and the plunger 31 can be smaller than that of a device in which the end face 313 of the plunger 31 does not abut on the end face 332 of the attracting portion 331, so that the attracting force applied to the plunger 31 by the attracting portion 331 can be larger than that of such a device, when the coil 35 is not energized.

As is clear from the above description, in the parking device 1 of the first embodiment, the hydraulic actuator 10 and the magnetic locking device 20 are arranged such that the axial direction of the piston rod 12 of the hydraulic actuator 10 is orthogonal to the axial direction of the lock shaft 21, the transmission shaft 24, and the plunger 31 of the magnetic locking device 20. This structure allows the hydraulic actuator 10 and the magnetic locking device 20 to be arranged in a limited space more favorably than in the case of arranging them (on the same axis line) so as to move in the same direction.

In the parking device 1 of the first embodiment, the surface hardening treatment is applied to the lock shaft 21 of the magnetic locking device 20. However, the surface hardening treatment may be applied to only the supported portion of the lock shaft 21 supported by the linear-motion bearing 29, may be applied to a portion extending from the abutting portion 210 to the supported portion, or may be omitted.

In the parking device 1 of the first embodiment, the lock shaft 21 and the transmission shaft 24 of the magnetic locking device 20 are structured as separate bodies. However, both these shafts may be structured integrally with each other. In this case, at least a portion of the integrally structured member corresponding to the transmission shaft 24 preferably is formed of a nonmagnetic material so as to reduce the leakage of the magnet-induced magnetic flux and the canceling magnetic flux.

In the parking device 1 of the first embodiment, the end face 214 on the transmission shaft 24 side of the lock shaft 21 of the magnetic locking device 20 has a flat surface extending in a direction orthogonal to the axial direction of the lock shaft 21, and the end face 240 on the lock shaft 21 side of the transmission shaft 24 is formed in a spherical shape that is convex toward the lock shaft 21 side. In addition, in the parking device 1 of the first embodiment, the end face 241 on the plunger 31 side of the transmission shaft 24 of the magnetic locking device 20 is formed in a spherical shape that is convex toward the plunger 31 side, and the bottom face 311 of the recess 310 of the plunger 31 has a flat surface extending in a direction orthogonal to the axial direction of the plunger 31. However, the parking device may be structured such that the end face 241 on the plunger 31 side of the transmission shaft 24 has a flat surface extending in a direction orthogonal to the axial direction of the transmission shaft 24, and the bottom face 311 of the recess 310 of the plunger 31 has a flat surface extending in a direction orthogonal to the axial direction of the plunger 31.

In the parking device 1 of the first embodiment, the end face 214 on the transmission shaft 24 side of the lock shaft 21 of the magnetic locking device 20 has a flat surface extending in a direction orthogonal to the axial direction of the lock shaft 21, and the end face 240 on the lock shaft 21 side of the transmission shaft 24 is formed in a spherical shape that is convex toward the lock shaft 21 side. However, the parking device may be structured such that the end face 214 is formed in a spherical shape that is convex toward the transmission shaft 24 side, and the end face 240 has a flat surface extending in a direction orthogonal to the axial direction of the transmission shaft 24. In this case, it is preferable that the end face 241 on the plunger 31 side of the transmission shaft 24 has a flat surface extending in a direction orthogonal to the axial direction of the transmission shaft 24, and the bottom face 311 of the recess 310 of the plunger 31 has a flat surface extending in a direction orthogonal to the axial direction of the plunger 31, or that the end face 241 on the plunger 31 side of the transmission shaft 24 has a flat surface extending in a direction orthogonal to the axial direction of the transmission shaft 24, and the bottom face 311 of the recess 310 of the plunger 31 is formed in a spherical shape that is convex toward the transmission shaft 24 side.

In the parking device 1 of the first embodiment, the end face 214 on the transmission shaft 24 side of the lock shaft 21 of the magnetic locking device 20 has a flat surface extending in a direction orthogonal to the axial direction of the lock shaft 21, and the end face 240 on the lock shaft 21 side of the transmission shaft 24 is formed in a spherical shape that is convex toward the lock shaft 21 side. However, the parking device may be structured such that the end face 214 has a flat surface extending in a direction orthogonal to the axial direction of the lock shaft 21, and the end face 240 has a flat surface extending in a direction orthogonal to the axial direction of the transmission shaft 24.

In the parking device 1 of the first embodiment, the inside diameter of the recess 310 of the plunger 31 in the magnetic unit 30 of the magnetic locking device 20 is set to a value larger than the inside diameter of the attracting portion 331. However, the inside diameter of the recess 310 may be set to a value equal to or slightly smaller than the inside diameter of the attracting portion 331.

Figure 9:
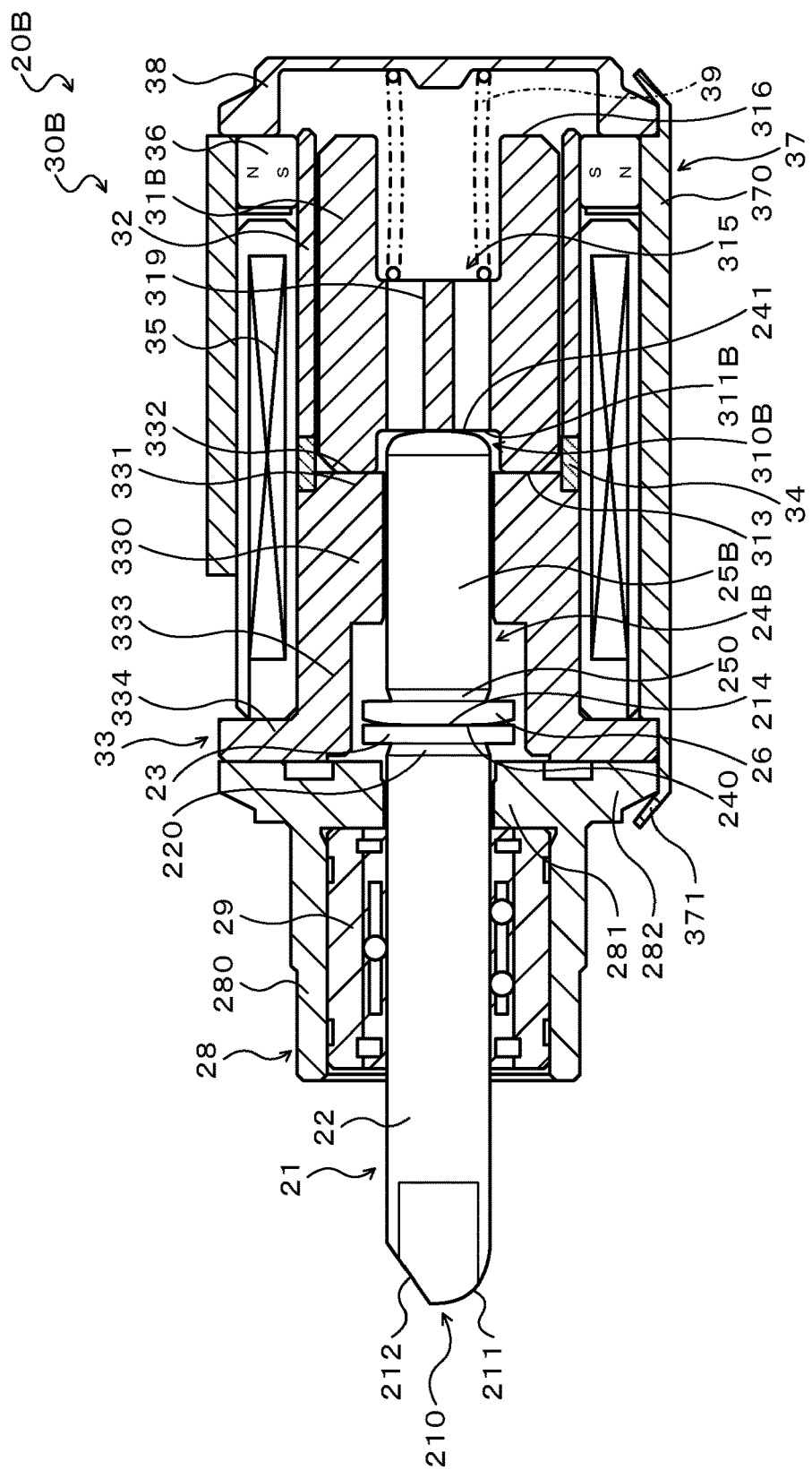
FIG. 9 is a structural diagram showing a schematic structure of a magnetic locking device 20B.
Figure 10:
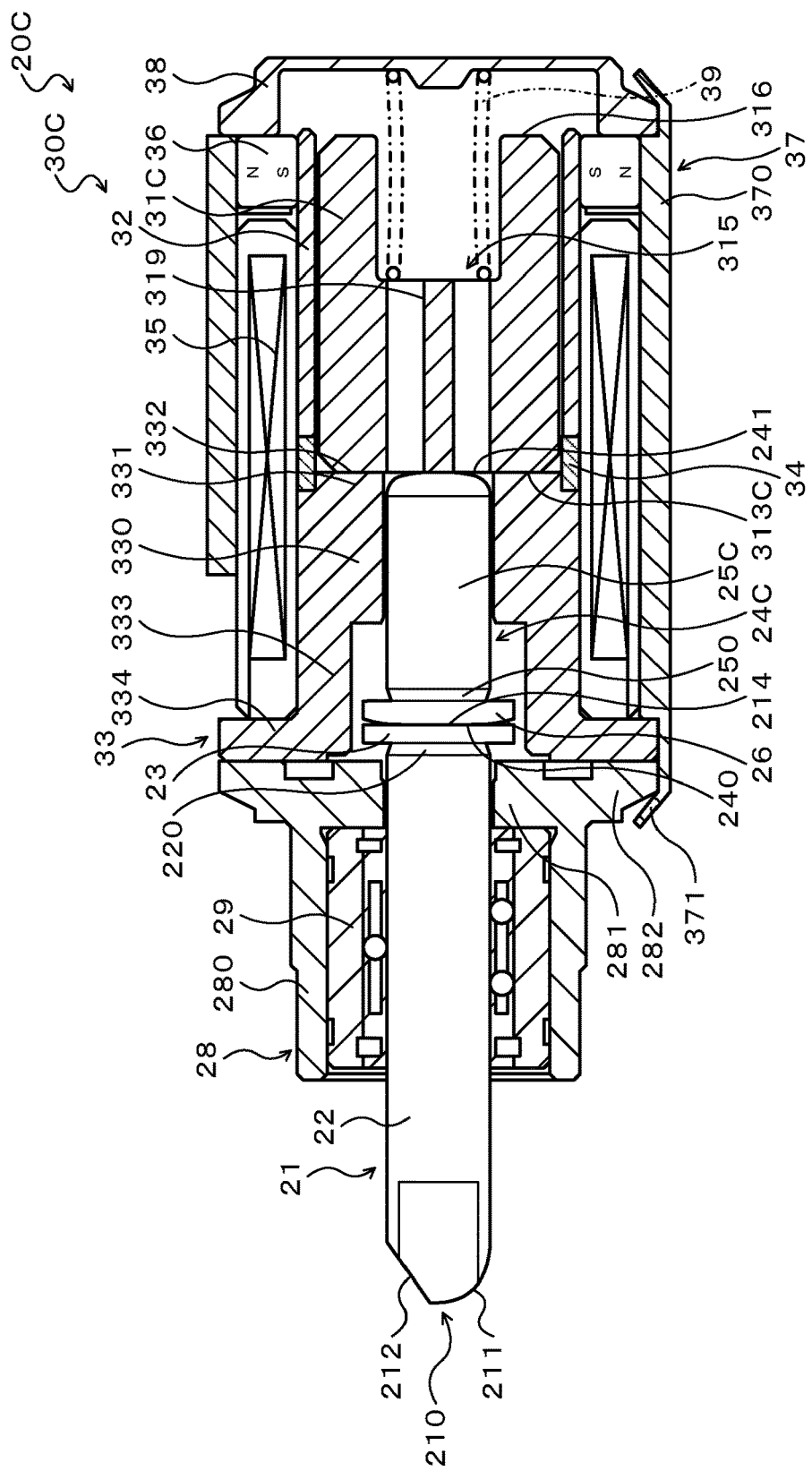
FIG. 10 is a structural diagram showing a schematic structure of a magnetic locking device 20C.

In the parking device 1 of the first embodiment, the plunger 31 in the magnetic unit 30 of the magnetic locking device 20 is formed such that the recess 310 on the transmission shaft 24 side and the recess 315 on the opposite side thereof have the same shape. However, as shown as a magnetic locking device 20B in FIG. 9, a plunger 31B of a magnetic unit 30B may have a recess 310B having a depth set to a value smaller than the depth of the recess 315. In this case, a small diameter portion 25B of a transmission shaft 24B has a length in the axial direction thereof smaller than that of the small diameter portion 25 of the transmission shaft 24 of the magnetic locking device 20 by an amount of reduction in the depth of the recess 310B of the plunger 31B from that of the recess 310 of the plunger 31. In the same manner as in the case of the magnetic unit 30 described above, the transmission shaft 24B is inserted into the recess 310B such that the end face 241 of the small diameter portion 25B abuts on a bottom face 311B of the recess 310B. As shown as a magnetic locking device 20C in FIG. 10, a plunger 31C of a magnetic unit 30C may have no recess on a side thereof facing a transmission shaft 24C. In this case, a small diameter portion 25C of the transmission shaft 24C has a length in the axial direction thereof smaller than that of the small diameter portion 25 of the transmission shaft 24 of the magnetic locking device 20 by an amount of omission of the recess on the transmission shaft 24C side. The end face 241 of the small diameter portion 25C of the transmission shaft 24C abuts on an end face 313C on the transmission shaft 24C side of the plunger 31C.

In the parking device 1 of the first embodiment, the attracting portion 331 of the second core 33 in the magnetic unit 30 of the magnetic locking device 20 is placed radially inside the coil 35 and at the center in the axial direction of the coil 35, and the end face 332 on the plunger 31 side of the attracting portion 331 is provided in the position orthogonal to the magnetic flux passing radially inside the coil 35. In addition, in the parking device 1 of the first embodiment, the end face 332 of the attracting portion 331 is parallel to the end face 313 of the plunger 31. However, provided that the end face 332 on the plunger 31 side of the attracting portion 331 is provided in the position orthogonal to the magnetic flux passing radially inside the coil 35, the attracting portion 331 may be placed in a position other than the center in the axial direction of the coil 35, and the end face 332 of the attracting portion 331 may not be parallel to the end face 313 of the plunger 31, that is, for example, the end face 313 of the plunger 31 may be formed substantially in a spherical shape.

In the parking device 1 of the first embodiment, the attracting portion 331 of the second core 33 in the magnetic unit 30 of the magnetic locking device 20 is placed so as to overlap the annular gap member 34 in the radial direction thereof that is placed so as to include the second plane that passes through the center in the axial direction of the coil 35 and is orthogonal to the axial direction thereof. However, provided that the attracting portion 331 is placed radially inside the coil 35 and at the center in the axial direction of the coil 35, the attracting portion 331 may be placed so as not to overlap the gap member 34 in the radial direction thereof, that is, for example, such that an end face on the shaft holder 28 side of the gap member 34 aligns in the radial direction with the end face 332 of the attracting portion 331.

In the parking device 1 of the first embodiment, when the coil 35 in the magnetic unit 30 of the magnetic locking device 20 is not energized, the lock shaft 21, the transmission shaft 24, and the plunger 31 are urged in an integrated manner toward the shaft holder 28 by the elastic force of the spring 39 and the attracting force applied to the plunger 31 by the attracting portion 331 based on the magnet-induced magnetic flux such that the end face 313 of the plunger 31 abuts on the end face 332 of the attracting portion 331. However, a certain gap may be formed between the end face 313 of the plunger 31 and the end face 332 of the attracting portion 331 (the abutting may occur in any other position, that is, for example, an end face on the small diameter portion 22 side of the large diameter portion 23 of the lock shaft 21 may abut on the end face on the magnetic unit 30 side of the shaft holder 28).

In the parking device 1 of the first embodiment, the permanent magnet 36 in the magnetic unit 30 of the magnetic locking device 20 is placed in the position on the side of the coil 35 opposite to the shaft holder 28 and radially outside the first core 32. However, the permanent magnet 36 may be placed in a position on the shaft holder 28 side of the coil 35 (in the position of the flange 334), or may be placed in a position facing the plunger 31 in the axial direction thereof, such as the position of the attracting portion 331.

Figure 11:
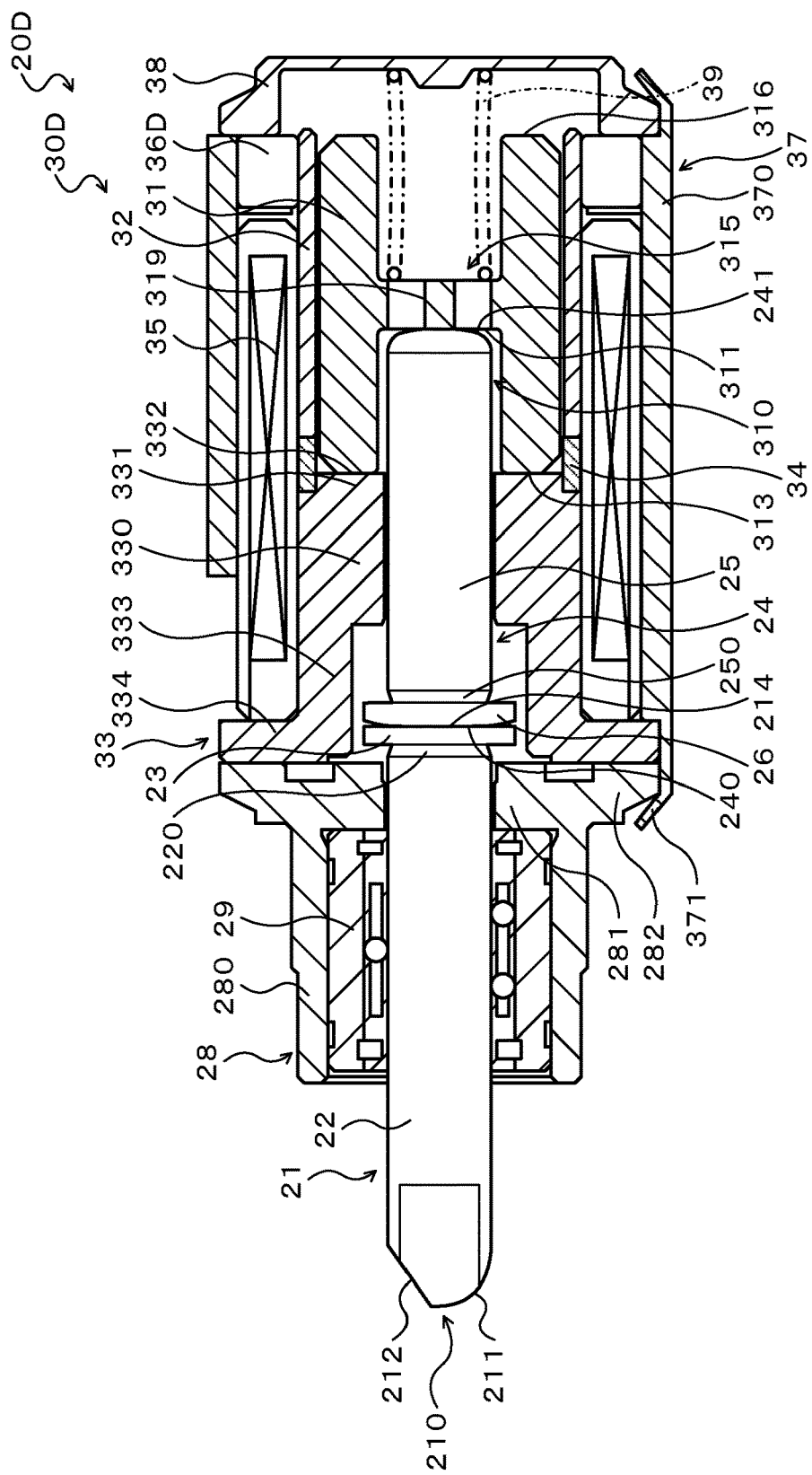
FIG. 11 is a structural diagram showing a schematic structure of a magnetic locking device 20D.

In the parking device 1 of the first embodiment, the permanent magnet 36 in the magnetic unit 30 of the magnetic locking device 20 is placed on the rear cap 38 side of the coil 35 and radially outside the first core 32. However, instead of the permanent magnet 36, an annular ring 36D that is formed of a magnetic material may be placed on the rear cap 38 side of the coil 35 and radially outside the first core 32 of a magnetic unit 30D, as shown as a magnetic locking device 20D in FIG. 11. In this case, when the coil 35 is not energized, the lock shaft 21, the transmission shaft 24, and the plunger 31 are urged in an integrated manner toward the shaft holder 28 (leftward in FIG. 11) by the elastic force of the spring 39 such that the end face 313 of the plunger 31 abuts on the end face 332 of the attracting portion 331 of the second core 33, and, when the coil 35 is energized, the plunger 31 is attracted toward the second core 33 (leftward in FIG. 4) and locked by the elastic force of the spring 39 and the attracting force applied to the plunger 31 by the attracting portion 331 of the second core 33 based on the magnetic flux passing through the yoke 37, the second core 33 (the flange 334, the second inside diameter portion 333, and the first inside diameter portion 330), the plunger 31, the first core 32, the ring 36D, and the yoke 37.

In the magnetic locking device 20D, the attracting portion 331 of the second core 33 of the magnetic unit 30D is placed radially inside the coil 35 and at the center in the axial direction of the coil 35, in the same manner as in the magnetic locking device 20. Accordingly, the attracting portion 331 can apply a larger attracting force to the plunger 31 when the coil 35 is energized. Before the coil 35 starts to be energized, the lock shaft 21, the transmission shaft 24, and the plunger 31 are urged in an integrated manner toward the shaft holder 28 by the elastic force of the spring 39 such that the end face 313 of the plunger 31 is in contact with the end face 332 of the attracting portion 331. Thus, the distance between the attracting portion 331 and the plunger 31 can be smaller than that of a device in which the end face 313 of the plunger 31 does not abut on the end face 332 of the attracting portion 331, so that the attracting force applied to the plunger 31 by the attracting portion 331 can be larger than that of such a device, when the coil 35 is energized.

In the magnetic locking device 20D, the ring 36D is placed in the position in which the permanent magnet 36 is placed in the case of the magnetic locking device 20. However, an annular flange may extend radially outward from the right end of the first core 32, or an annular flange may extend radially inward from near the right end of the yoke 37.

In the parking device 1 of the first embodiment, the first abutting surface 211 of the abutting portion 210 of the lock shaft 21 does not abut on the roller 13 when the magnetic locking device 20 is attached to the hydraulic actuator 10. However, the first abutting surface 211 may abut on the roller 13 to move the lock shaft 21, the transmission shaft 24, and the plunger 31 in an integrated manner toward the rear cap 38, and thus to form a gap between the end face 313 of the plunger 31 and the end face 332 of the attracting portion 331 of the second core 33. In this case, the first abutting surface 211 is in contact with the roller 13 in the parking lock state. This structure can reduce a moving stroke amount of the piston rod 12 when the piston rod 12 is hydraulically moved to the lock releasing side, and thus can quickly switch the parking lock state to the parking lock released state. When the piston rod 12 is being hydraulically moved to the lock releasing side, the roller 13 is prevented from colliding with the first abutting surface 211, so that the durability of the lock shaft 21 and the roller 13 can be improved, and the occurrence of noise and shock can be suppressed.

In the parking device 1 of the first embodiment, the first abutting surface 211 (abutting surface on the locking side) of the abutting portion 210 of the lock shaft 21 is formed as a curved surface with a circular arc-shaped section that is convex toward the locking side. However, the first abutting surface 211 may be formed as a curved surface with a cross-sectional shape other than the circular arc shape that is convex toward the locking side, or may be formed as a (flat) sloped surface that is sloped at a constant angle toward the locking side as the surface extends from the abutting portion 210 side toward the large diameter portion 23.

In the parking device 1 of the first embodiment, the second abutting surface 212 (abutting surface on the lock releasing side) of the abutting portion 210 of the lock shaft 21 is formed as a (flat) sloped surface that is sloped at a constant angle toward the lock releasing side. However, the second abutting surface 212 may be formed as a curved surface with a cross-sectional shape (such as a circular arc-like section) that is convex toward the lock releasing side.

Figure 12:
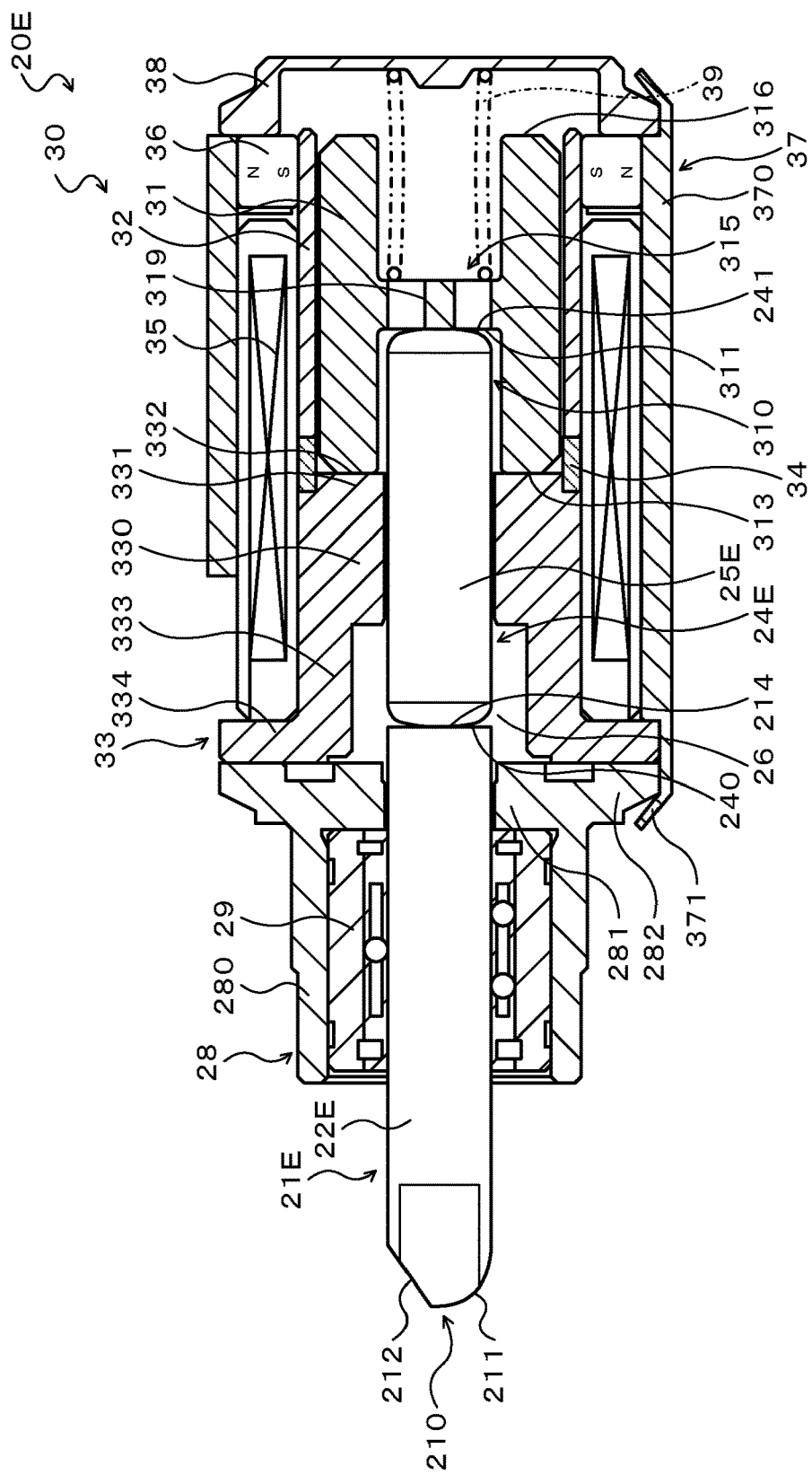
FIG. 12 is a structural diagram showing a schematic structure of a magnetic locking device 20E.

In the parking device 1 of the first embodiment, the lock shaft 21 of the magnetic locking device 20 includes the small diameter portion 22 and the large diameter portion 23, and the transmission shaft 24 includes the small diameter portion 25 and the large diameter portion 26. However, as shown as a magnetic locking device 20E in FIG. 12, a lock shaft 21E may include only a small diameter portion 22E while including no large diameter portion, and a transmission shaft 24E may include only a small diameter portion 25E while including no large diameter portion.

In the parking device 1 of the first embodiment, the shaft holder 28 is formed of a nonmagnetic material. However, the shaft holder 28 may be formed of a magnetic material.

In the parking device 1 of the first embodiment, the roller 13 rotatably supported by the supporting shaft 12s that is supported by the piston rod 12 is used as the abutment target of the piston rod 12. However, a cylindrical object rotatably supported by the piston rod 12 may be used, or an object serving as a nonrotatable component of the piston rod 12 (such as an object similar to the supporting shaft 12s) may be used.

In the parking device 1 of the first embodiment, the piston rod 12 is urged toward the locking side by the elastic force of the return spring 16, and is moved toward the lock releasing side by the hydraulic pressure against the elastic force of the return spring 16. However, in the converse manner, the piston rod 12 may be urged toward the lock releasing side by an elastic force of a return spring, and may be moved toward the locking side by a hydraulic pressure against the elastic force of the return spring.

In the parking device 1 of the first embodiment, to switch the parking lock released state to the parking lock state, the piston rod 12 is moved to the locking side by the elastic force of the return spring 16. At this time, the hydraulic pressure (hydraulic oil) may be supplied from the hydraulic control device to the spring chamber 11s of the hydraulic actuator 10. It is thus possible to use the elastic force of the return spring 16 and the hydraulic pressure of the spring chamber 11s to move the piston rod 12 more quickly to the locking side.

In the parking device 1 of the first embodiment, to switch the parking lock state to the parking lock released state, the piston rod 12 is hydraulically moved toward the lock releasing side while energizing the coil 35 of the magnetic unit 30 to cancel the attraction of the plunger 31 applied by the attracting portion 331 of the second core 33. However, the piston rod 12 may be hydraulically moved toward the lock releasing side without energizing the coil 35. In this case, as compared with the case of energizing the coil 35, the power consumption can be suppressed, but a higher hydraulic pressure is required to move the piston rod 12 to the lock releasing side.

Figure 13:
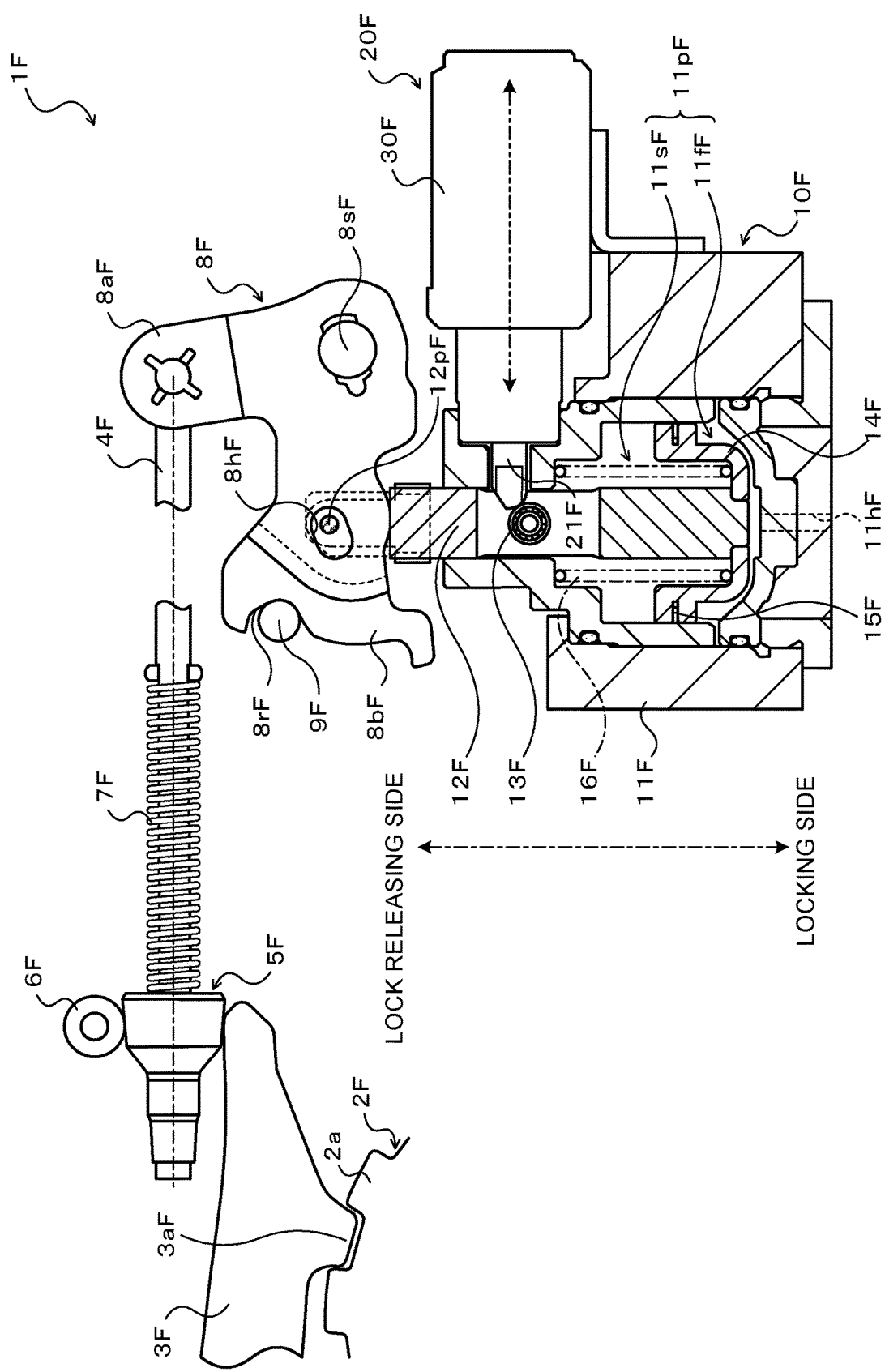
FIG. 13 is a structural diagram showing a schematic structure of a parking device 1F as a second embodiment.
Figure 14:
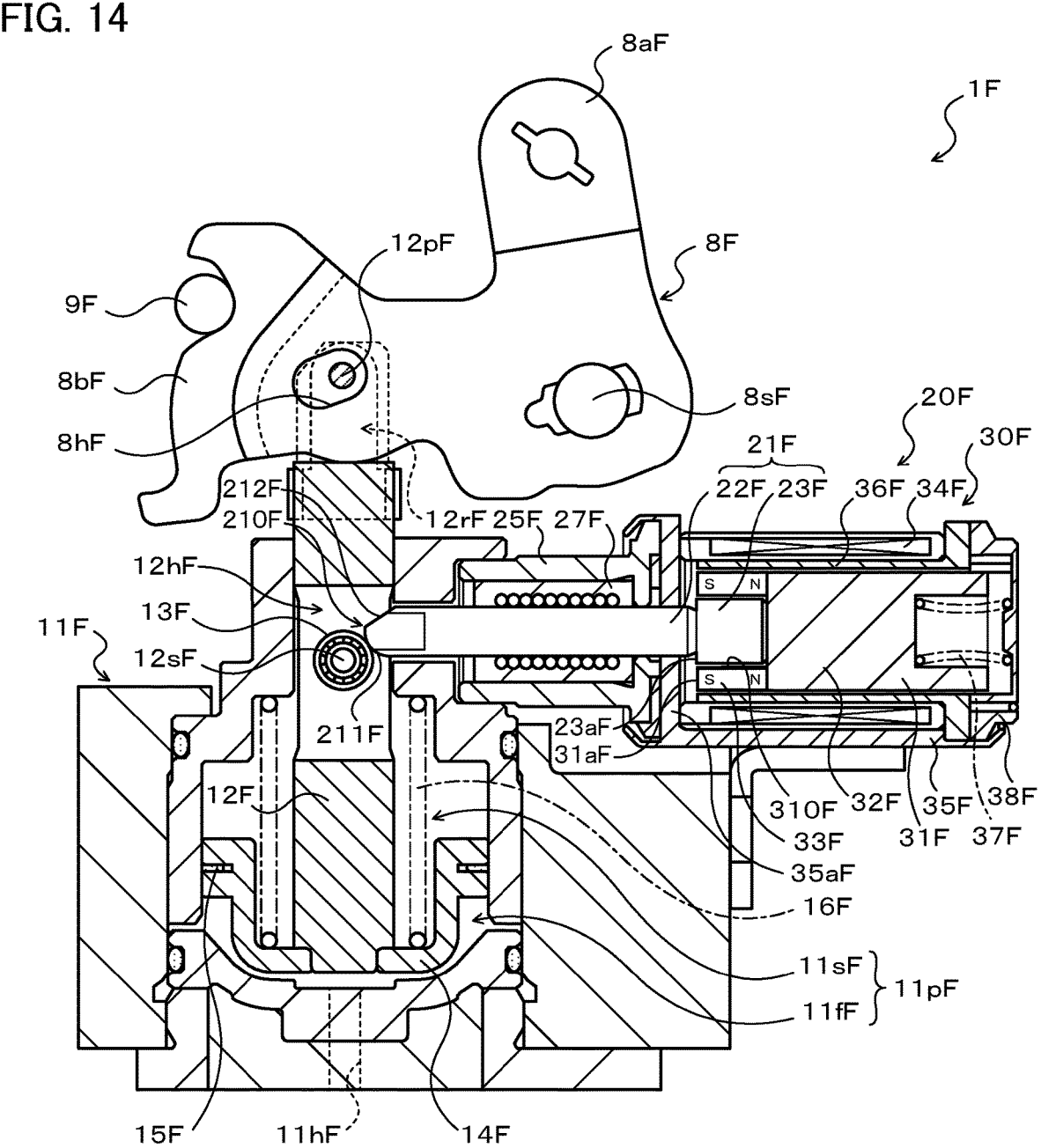
FIG. 14 is a structural diagram showing a schematic structure of a main part of the parking device 1F.
Figure 15:
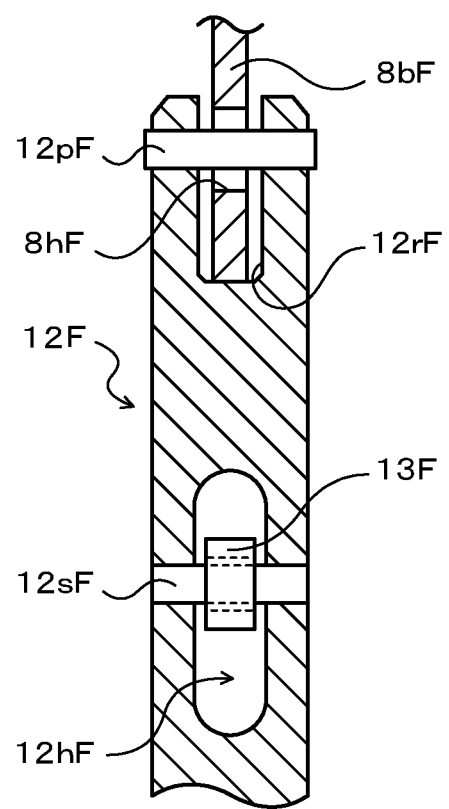
FIG. 15 is a structural diagram showing a schematic structure of a part of a hydraulic actuator 10F.
Figure 16:
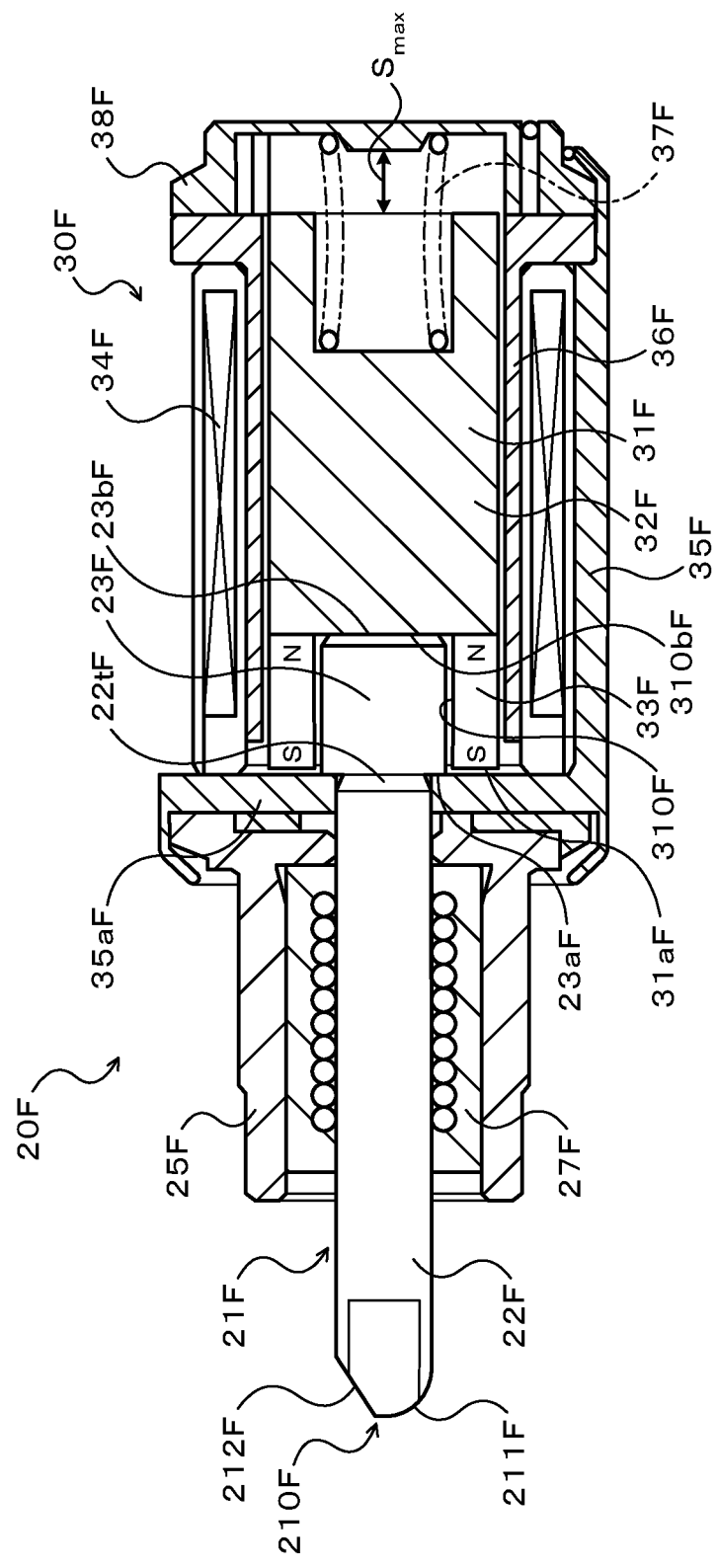
FIG. 16 is a structural diagram showing a schematic structure of a magnetic locking device 20F.
Figure 17:
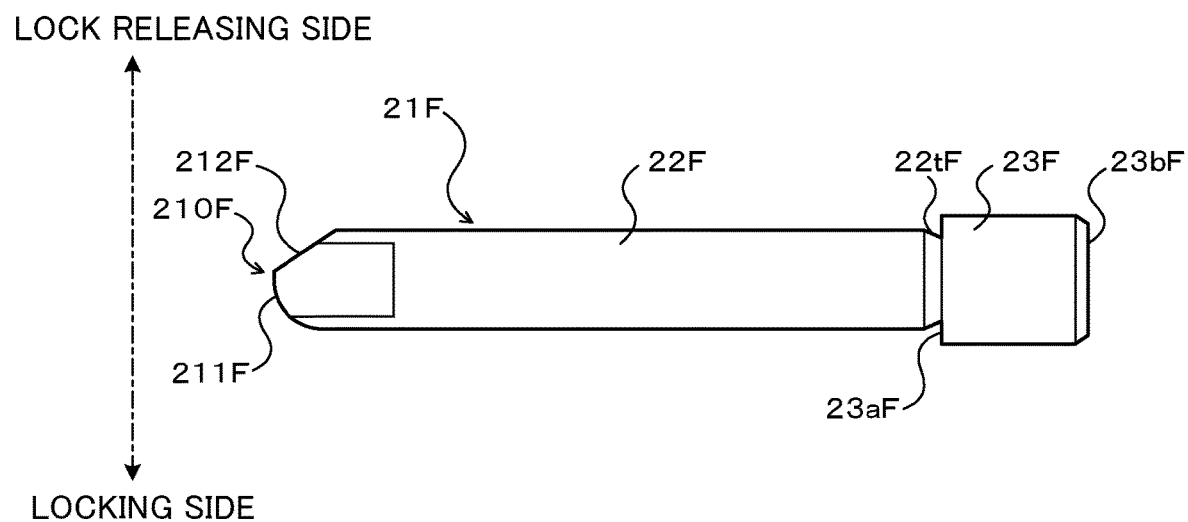
FIG. 17 is a structural diagram showing a schematic structure of a lock shaft 21F.

FIG. 13 is a structural diagram showing a schematic structure of a parking device 1F as a second embodiment. FIG. 14 is a structural diagram showing a schematic structure of a main part of the parking device 1F. FIG. 15 is a structural diagram showing a schematic structure of a part of a hydraulic actuator 10F. FIG. 16 is a structural diagram showing a schematic structure of a magnetic locking device 20F. FIG. 17 is a structural diagram showing a schematic structure of a lock shaft 21F of the magnetic locking device 20F.

The parking device 1F of the second embodiment is mounted on the vehicle, and placed inside or outside the transmission case of the transmission (not shown). The parking device 1F is structured as what is called a shift-by-wire parking device that locks any one of the rotational shafts of the transmission and releases the lock of the rotational shaft based on an electrical signal that is output according to an operational position (shift range) of the shift lever (not shown).

As shown in FIG. 13, the parking device 1F includes the following: a parking gear 2F that has a plurality of teeth 2aF and is attached to any one of the rotational shafts of the transmission; a parking pawl 3F that has a projecting portion 3aF engageable with the parking gear 2F and is urged by a spring (not shown) so as to move away from the parking gear 2F; a parking rod 4F that is movable forward and backward; a cylindrical cam member 5F that is movable in the axial direction of the parking rod 4F; a supporting roller 6F that is rotatably supported by, for example, the transmission case and pinches the cam member 5F in cooperation with the parking pawl 3F; a cam spring 7F that is supported at one end thereof by the parking rod 4F and urges the cam member 5F so as to press the parking pawl 3F to the parking gear 2F; a detent lever 8F that is connected to the parking rod 4F; the hydraulic actuator 10F that moves the parking rod 4F forward and backward via the detent lever 8F through movements of a piston rod 12F; and the magnetic locking device 20F that restrains the forward and backward movements of the parking rod 4F by restraining the movements of the piston rod 12F. In the parking device 1F, the projecting portion 3aF of the parking pawl 3F engages with a recess between adjacent two of the teeth 2aF of the parking gear 2F to lock the rotational shaft of the transmission (to apply the parking lock), as shown in FIG. 13.

Each of the parking gear 2F, the parking pawl 3F, the parking rod 4F, the cam member 5F, the supporting roller 6F, and the cam spring 7F has a known structure. The detent lever 8F is formed substantially in an L-shape, and has a first free end 8aF and a second free end 8bF. The first free end 8aF is rotatably connected to the proximal end (the right end in FIG. 13) of the parking rod 4F. An engagement recess 8rF is formed at the second free end 8bF, and is engageable with an engagement member 9F attached to a detent spring (not shown) supported by, for example, the transmission case. A corner portion (proximal ends of the first and second free ends 8aF and 8bF) of the detent lever 8F is rotatably supported by a spindle 8sF that is supported by, for example, the transmission case.

The hydraulic actuator 10F is structured to be operated by the hydraulic pressure from the hydraulic control device of the transmission that is controlled by the electronic control device based on the electrical signal that is output according to the operational position (shift range) of the shift lever. As shown in FIG. 14, the hydraulic actuator 10F includes a case 11F constituted by a plurality of members, the piston rod 12F that is connected to the second free end 8bF of the detent lever 8F and is supported by the case 11F so as to be movable in the axial direction of the piston rod 12F (in the up-down direction in FIG. 14 (first direction)), and a piston 14F that is fixed to the piston rod 12F and is placed in a piston chamber 11pF formed in the case 11F.

The piston rod 12F is supported by the case 11F such that the distal end (the upper end in FIG. 14) of the piston rod 12F projects outward from the case 11F. As shown in FIG. 15, the piston rod 12F has, at the distal end thereof, a connection recess 12rF formed so as to extend from the distal end toward the proximal end of the piston rod 12F. The second free end 8bF of the detent lever 8F is inserted in the connection recess 12rF. An elongated hole 8hF is formed in the detent lever 8F so as to be located in the connection recess 12rF. A connection pin 12pF supported by the distal end of the piston rod 12F is inserted in the elongated hole 8hF. The elongated hole 8hF is formed such that a space is defined between the inner circumference thereof and an outer circumferential surface of the connection pin 12pF. Thus, the piston rod 12F and the detent lever 8F are connected so as to allow a certain amount of relative movement between each other.

The piston rod 12F is provided with, near the central part in the axial direction thereof, a hole 12hF that passes through the piston rod 12F in a direction orthogonal to the axial direction thereof (in the right-left direction in FIG. 14) and extends in the axial direction of the piston rod 12F. A roller 13F serving as an abutment target is placed in the hole 12hF. The roller 13F is structured as a roller bearing, and has an outside diameter smaller than a length in the longitudinal direction (in the up-down direction in FIGS. 14 and 15) of the hole 12hF. The roller 13F is supported so as to be rotatable in the hole 12hF by a supporting shaft 12sF that is supported by the piston rod 12F so as to extend in parallel with the connection pin 12pF. The hole 12hF may not penetrate through the piston rod 12F in the right-left direction in FIG. 14.

The piston 14F is fixed to the proximal end (the lower end in FIG. 14) of the piston rod 12F, and is supported by an inner wall surface of the piston chamber 11pF via a seal member 15F so as to be movable in the axial direction of the piston rod 12F. The piston 14F partitions the inside of the piston chamber 11pF into an oil chamber 11fF and a spring chamber 11sF. The oil chamber 11fF is defined in the lower part in FIG. 14 of the piston chamber 11pF so as to be separate from the distal end (upper end in FIG. 14) of the piston rod 12F and the detent lever 8F, and communicates with an oil hole 11hF formed in the case 11F. The oil chamber 11fF is supplied with the hydraulic pressure (hydraulic oil) from the hydraulic control device through an oil passage (not shown) and the oil hole 11hF. The spring chamber 11sF is defined in the upper part in FIG. 14 of the piston chamber 11pF so as to be closer to the distal end of the piston rod 12F and the detent lever 8F. A return spring 16F serving as an elastic member is placed in the spring chamber 11sF so as to be located between the case 11F and the piston 14F. The return spring 16F urges the piston 14F from the spring chamber 11sF side toward the oil chamber 11fF side (downward in FIG. 14).

When the hydraulic actuator 10F thus structured is in the assembled state (in the state when the assembly is completed), the piston 14F is urged downward in FIG. 13 by the return spring 16F to be closest to the bottom of the oil chamber 11fF, so that the piston rod 12F projects from the case 11F by the minimum length. This state causes the parking rod 4F connected to the piston rod 12F via the detent lever 8F to be closest to the proximal end of the parking pawl 3F, so that the cam member 5F urged by the cam spring 7F presses the parking pawl 3F such that the parking pawl 3F engages with the parking gear 2F, and the rotational shaft of the transmission is locked (the parking lock is applied).

When the hydraulic pressure is supplied from the hydraulic control device to the oil chamber 11fF of the hydraulic actuator 10F in the state in which the rotational shaft of the transmission is locked (hereinafter, referred to as the "parking lock state" where appropriate) as shown in FIG. 13, the hydraulic pressure in the oil chamber 11fF moves the piston 14F upward in FIG. 13 (hereinafter, expressed as toward the "lock releasing side" where appropriate) in the moving direction of the piston rod 12F (first direction) against an elastic force (urging force) of the return spring 16F. Thus, the piston rod 12F fixed to the piston 14F also moves toward the lock releasing side, along with which the detent lever 8F rotates clockwise in FIG. 13 about the spindle 8sF, and the parking rod 4F moves rightward in FIG. 13. The movement of the parking rod 4F rightward in FIG. 13 releases the pressure applied from the cam member 5F onto the parking pawl 3F, and releases the engagement between the parking gear 2F and the parking pawl 3F, that is, the locking of the rotational shaft of the transmission (the parking lock is released). Accordingly, the rotational shaft of the transmission is not locked (the parking lock is not applied) when the hydraulic pressure is supplied from the hydraulic control device to the oil chamber 11fF of the hydraulic actuator 10F while the vehicle is running.

When the supply of the hydraulic pressure from the hydraulic control device to the oil hole 11hF is shut off and the hydraulic oil flows out of the oil chamber 11fF through the oil hole 11hF in the state in which the parking lock is released (hereinafter, referred to as the "parking lock released state" where appropriate), the elastic force of the return spring 16F moves the piston 14F downward in FIG. 13 (hereinafter, expressed as toward the "locking side" where appropriate) in the moving direction of the piston rod 12F. Thus, the piston rod 12F fixed to the piston 14F also moves toward the locking side, along with which the detent lever 8F rotates counterclockwise in FIG. 13 about the spindle 8sF, and the parking rod 4F moves leftward in FIG. 13. The movement of the parking rod 4F leftward in FIG. 13 causes the cam member 5F urged by the cam spring 7F to press the parking pawl 3F such that the parking pawl 3F engages with the parking gear 2F, and the rotational shaft of the transmission is locked (the parking lock is applied). The engagement recess 8rF at the second free end 8bF of the detent lever 8F engages with the engagement member 9F. Thus, the rotation of the detent lever 8F about the spindle 8sF is restrained to some extent by the detent spring (not shown), and thereby restraining the movement of the parking rod 4F to some extent.

The magnetic locking device 20F is used to restrain the piston rod 12F from moving by the elastic force (urging force) of the return spring 16F toward the locking side and thus to prevent the parking lock released state from being switched to the parking lock state when the hydraulic pressure supplied to the oil chamber 11fF of the hydraulic actuator 10F drops, for example, as the engine of the vehicle and the oil pump driven by the engine are stopped, for example, by the idling stop operation.

As shown in FIG. 16, the magnetic locking device 20F includes: the lock shaft 21F that includes an abutting portion 210F capable of abutting on the roller 13F serving as the abutment target provided in the piston rod 12F (refer to FIG.

14); a shaft holder 25F that supports the lock shaft 21F such that the lock shaft 21F is movable in the axial direction thereof (in the right-left direction in FIG. 16 (second direction)); and a magnetic unit 30F that is capable of locking the lock shaft 21F with a magnetic force.

The lock shaft 21F is formed of a nonmagnetic material, such as stainless steel, and includes a small diameter portion 22F including the abutting portion 210F at one end (distal end) thereof and a large diameter portion 23F that extends from the small diameter portion 22F toward a side opposite to the abutting portion 210F and that has a diameter larger than that of the small diameter portion 22F, as shown in FIGS. 16 and 17. The small diameter portion 22F is formed substantially in a cylindrical shape, and the abutting portion 210F provided at the distal end thereof is formed so as to have a shape with two parallel flat planes. The large diameter portion 23F is formed substantially in a cylindrical shape, and has an annular end face 23aF on the small diameter portion 22F side and a flat end face 23bF on a side opposite to the small diameter portion 22F. A tapered portion 22tF is provided on an outer circumferential surface of the small diameter portion 22F near the boundary between the small diameter portion 22F and the large diameter portion 23F. The tapered portion 22tF is formed so as to taper down (smaller in outside diameter) as the outer circumferential surface of the small diameter portion 22F in the vicinity of the boundary thereof with the large diameter portion 23F extends from the abutting portion 210F side toward the end face 23aF of the large diameter portion 23F.

The abutting portion 210F of the small diameter portion 22F includes a first abutting surface 211F located on the locking side (on the lower side in FIGS. 16 and 17) in the moving direction of the piston rod 12F (in the up-down direction in FIGS. 16 and 17) and a second abutting surface 212F located on the lock releasing side (on the upper side in FIGS. 16 and 17) in the moving direction of the piston rod 12F. The first abutting surface 211F is formed so as to slope toward the locking side as the surface extends from the abutting portion 210F side toward the large diameter portion 23F, and specifically, is formed as a curved surface with a circular arc-shaped section that has a radius of curvature smaller than the radius (radius of curvature) of the outer circumferential surface of the roller 13F and that is convex toward the locking side. The second abutting surface 212F is formed so as to slope toward the lock releasing side as the surface extends from the abutting portion 210F side toward the large diameter portion 23F, and specifically, is formed as a (flat) sloped surface sloped at a constant angle toward the lock releasing side.

The shaft holder 25F is formed substantially in a bottomed cylindrical shape of a nonmagnetic material, such as aluminum, and is held by the magnetic unit 30F, as shown in FIG. 16. The small diameter portion 22F of the lock shaft 21F is inserted in a hole formed in the bottom of the shaft holder 25F. The abutting portion 210F of the small diameter portion 22F of the lock shaft 21F projects leftward in FIG. 16 from the shaft holder 25F. A linear-motion bearing 27F is fixed to the inside of the shaft holder 25F, and slidably supports the outer circumferential surface of the small diameter portion 22F. The linear-motion bearing 27F supports the small diameter portion 22F in this manner, so that lock shaft 21F can smoothly move in the axial direction thereof while being restrained from rattling.

As shown in FIG. 16, the magnetic unit 30F includes: a shaft member 31F that is movable in the axial direction thereof (in the right-left direction in FIG. 16 (second direction)); a coil 34F that is placed so as to surround the outer circumference of the shaft member 31F; a yoke 35F that holds the shaft holder 25F and functions as a case for accommodating the shaft member 31F and the coil 34F; a core 36F that is placed between the shaft member 31F and the coil 34F; and a spring 37F serving as an elastic member for applying an elastic force to urge the shaft member 31F toward the shaft holder 25F (leftward in FIG. 16).

The shaft member 31F includes a plunger 32F that is formed of a magnetic material such as iron, and an annular permanent magnet 33F that has the same outside diameter as that of the plunger 32F and that is fixed to an end in the axial direction (the left end in FIG. 16) of the plunger 32F (integrally structured with the plunger 32F). The permanent magnet 33F is magnetized so as to have the north pole on the plunger 32F side (right side in FIG. 16) thereof and the south pole on the opposite side (left side in FIG. 16) thereof. The permanent magnet 33 may be magnetized so as to have the north pole and the south pole on the reverse sides of the above. The permanent magnet 33F can be easily and accurately fixed to the plunger 32F by adhesive bonding or integral forming. The shaft member 31F has a recess 310F formed on one end side in the axial direction thereof and a flat annular end face 31aF around the recess 310F. The end face 31aF is formed as an end face on one end side of the permanent magnet 33F. The recess 310F is a circular hole having a bottom face 310bF in a direction orthogonal to the axial direction thereof and an inner circumferential surface. The bottom face 310bF is formed as an end face on one end side of the plunger 32F, and the inner circumferential surface is formed as an inner circumferential surface of the permanent magnet 33F. The large diameter portion 23F of the lock shaft 21F is inserted in the recess 310F such that the end face 23bF of the large diameter portion 23F of the lock shaft 21F abuts on the bottom face 310bF.

The depth of the recess 310F of the shaft member 31F (the length in the axial direction of the permanent magnet 33F) is set to a value slightly smaller (for example, by about 0.1 mm) than the length in the axial direction of the large diameter portion 23F of the lock shaft 21F. Accordingly, the end face 23aF of the large diameter portion 23F of the lock shaft 21F inserted in the recess 310F projects outward (leftward in FIG. 16) from the end face 31aF of the shaft member 31F.

The inside diameter of the inner circumferential surface of the recess 310F of the shaft member 31F (the inside diameter of the permanent magnet 33F) is set to a value slightly larger (for example, by about 0.5 mm to 1.0 mm) than the outside diameter of the large diameter portion 23F of the lock shaft 21F. Accordingly, a certain clearance is formed between the inner circumferential surface of the recess 310F (permanent magnet 33F) and the outer circumferential surface of the large diameter portion 23F of the lock shaft 21F inserted in the recess 310F. Consequently, if the lock shaft 21F rattles in the radial direction thereof, the rattling can be absorbed by the clearance between the outer circumferential surface of the large diameter portion 23F and the inner circumferential surface of the recess 310F, so that the shaft member 31F can be restrained from rattling in the radial direction thereof. As a result, a magnetic gap between the shaft member 31F (plunger 32F) and the core 36F can be reduced. As described above, the lock shaft 21F is formed of a nonmagnetic material, so that the magnetic flux leakage in the magnetic locking device 20F can be reduced. As a result of these effects, the magnetic efficiency can be increased while the magnetic unit 30F is restrained from increasing in size. In the second embodiment, the difference between the length in the axial direction of the large diameter portion 23F and the depth of the recess 310F of the shaft member 31F (the length in the second direction of the permanent magnet 33F) is set to a value smaller than the clearance between the outer circumferential surface of the large diameter portion 23F and the inner circumferential surface of the recess 310F of the shaft member 31F (the inner circumferential surface of the permanent magnet 33F).

The coil 34F includes a terminal connected to a connector (not shown) attached to the yoke 35F serving as a case. The coil 34F is supplied with a current from the auxiliary battery of a vehicle (not shown) via the power supply circuit controlled by the electronic control device for controlling the hydraulic control device or by another electronic control device, and via the connector. The yoke 35F is formed substantially in a cylindrical shape of a magnetic material, such as iron, and includes, at one end (on the left side in FIG. 16) thereof, a flange 35aF that is provided so as to project radially inward and to have an annular shape. The inside diameter of the flange 35aF is set to a value that is smaller than the inside diameter of the permanent magnet 33F of the shaft member 31F and that allows the small diameter portion 22F of the lock shaft 21F to slide. That is, the flange 35aF faces the end face 23aF on the small diameter portion 22F side of the large diameter portion 23F of the lock shaft 21F and the permanent magnet 33F, in the right-left direction in FIG. 16. That is, a portion of the flange 35aF radially inside the coil 34F corresponds to a core in a first parking device of the present disclosure. When the coil 34F is not energized, the lock shaft 21F and the shaft member 31F (plunger 32F) are urged (locked) in an integrated manner toward the shaft holder 25F (leftward in FIG. 16) by an attracting force between the permanent magnet 33F of the shaft member 31F and the flange 35aF of the yoke 35F. When the coil 34F is energized, the attraction between the permanent magnet 33F and the flange 35aF is canceled by a magnetic flux passing through a magnetic path constituted by the yoke 35F, the permanent magnet 33F, the plunger 32F, and the core 36F. The lock shaft 21F is formed of a nonmagnetic material, so that the magnetic flux leakage in the magnetic locking device 20F can be reduced.

A rear cap 38F is attached at the other end (the right end in FIG. 16) of the yoke 35F so as to hold the coil 34F and the core 36F. The spring 37F is placed between an end on a side opposite to the recess 310F side (the right end in FIG. 16) of the shaft member 31F and the rear cap 38F. The spring 37F urges the lock shaft 21F and the shaft member 31F that are not fixed to each other, in an integrated manner toward the shaft holder 25F (leftward in FIG. 16). The spring 37F has a spring constant (stiffness) smaller than that of the return spring 16F of the hydraulic actuator 10F. Moreover, the sum of the elastic force of the spring 37F and the attracting force between the permanent magnet 33F and the flange 35aF of the yoke 35F (leftward force in FIG. 16 applied to the lock shaft 21F and the shaft member 31F) is set so as to be larger than a rightward force component in FIG. 16 (hereinafter, referred to as the return spring force component) of a force that is applied, when the roller 13F of the piston rod 12F abuts on the second abutting surface 212F of the lock shaft 21F, from the roller 13F to the second abutting surface 212F by the elastic force of the return spring 16F of the hydraulic actuator 10F (downward force in FIGS. 14 and 16). Accordingly, the lock shaft 21F and the shaft member 31F (plunger 32F) are not moved (are locked) toward the rear cap 38F (rightward in FIG. 16) by the return spring force component when the coil 34F is not energized, but are moved in an integrated manner toward the rear cap 38F by the return spring force component when the coil 34F is energized.

A maximum stroke amount Smax in the axial direction of the shaft member 31F (plunger 32F) in the yoke 35F (in the example of FIG. 16, the distance between the right end of the shaft member 31F (plunger 32F) and the inner bottom face of the rear cap 38F) is set to a value smaller than the length in the axial direction of the large diameter portion 23F of the lock shaft 21F. Thus, the large diameter portion 23F can be restrained from coming out of the recess 310F of the shaft member 31F when the lock shaft 21F and the shaft member 31F move in the axial direction thereof (in the right-left direction in FIG. 16).

When the magnetic locking device 20F thus structured is in the assembled state (in the state when the assembly is completed), that is, in the state before being attached to the hydraulic actuator 10F, the shaft member 31F is urged by the elastic force of the spring 37F (and the attracting force between the permanent magnet 33F and the flange 35aF of the yoke 35F) such that the bottom face 310bF of the recess 310F of the shaft member 31F (the end face on one end side of the plunger 32F) abuts on the end face 23bF of the large diameter portion 23F of the lock shaft 21F and the end face 23aF of the large diameter portion 23F abuts on the flange 35aF of the yoke 35F. At this time, a small gap is formed between the end face 31aF around the recess 310F of the shaft member 31F (the end face on one end side of the permanent magnet 33F) and the flange 35aF. This is because the depth of the recess 310F (the length in the axial direction of the permanent magnet 33F) is slightly smaller than the length in the axial direction of the large diameter portion 23F, as described above. In this manner, the lock shaft 21F and the shaft member 31F are urged in an integrated manner toward the piston rod 12F, and the end face 23aF of the large diameter portion 23F abuts on the flange 35aF. This structure can restrain a situation in which only the end face 31aF of the shaft member 31F abuts on the flange 35aF while the end face 23aF of the large diameter portion 23F does not abut on the flange 35aF, and hence, the lock shaft 21F rattles in the axial direction between the flange 35aF and the bottom face 310bF of the recess 310F. This structure can also restrain the permanent magnet 33F from abutting on the flange 35aF along with the movement of the shaft member 31F to protect the permanent magnet 33F. Moreover, in the second embodiment, the difference between the length in the axial direction of the large diameter portion 23F and the depth of the recess 310F of the shaft member 31F (the length in the second direction of the permanent magnet 33F) is set to a value smaller than the clearance between the outer circumferential surface of the large diameter portion 23F and the inner circumferential surface of the recess 310F of the shaft member 31F (the inner circumferential surface of the permanent magnet 33F). This dimension setting can reduce the gap between the flange 35aF and the permanent magnet 33F when the large diameter portion 23F is in contact with the flange 35aF to increase the attracting force therebetween while absorbing the radial rattling of the lock shaft 21F.

The tapered portion 22tF is provided on the small diameter portion 22F of the lock shaft 21F in the vicinity of the boundary thereof with the large diameter portion 23F. This allows the area of contact of the end face 23aF of the large diameter portion 23F with the flange 35aF to be located as close to the small diameter portion 22F as possible. Thus, the large diameter portion 23F can be restrained from increasing in outside diameter to reduce the size of the magnetic locking device 20F.

As shown in FIGS. 13 and 14, the magnetic locking device 20F is attached to the hydraulic actuator 10F such that the axial direction of the piston rod 12F of the hydraulic actuator 10F (the up-down direction in FIGS. 13 and 14 refer to a dashed-dotted line in FIG. 13) is orthogonal to the axial direction of the lock shaft 21F and the shaft member 31F (the right-left direction in FIGS. 13 and 14 (refer to a chain double-dashed line in FIG. 13)). This structure allows the hydraulic actuator 10F and the magnetic locking device 20F to be more easily placed in a limited space inside or outside the transmission case than a structure in which the hydraulic actuator 10F and the magnetic locking device 20F are coaxially arranged.

When the magnetic locking device 20F is attached to the case 11F of the hydraulic actuator 10F, the abutting portion 210F (the first abutting surface 211F and the second abutting surface 212F) of the lock shaft 21F overlaps (overlap) at least a part of the outer circumferential surface of the roller 13F when viewed from the axial direction of the piston rod 12F (when viewed from above or below in FIG. 14). In the second embodiment, the magnetic locking device 20F is attached to the case 11F of the hydraulic actuator 10F such that the first abutting surface 211F of the abutting portion 210F of the lock shaft 21F abuts on the outer circumferential surface of the roller 13F (such that the first abutting surface 211F receives a force from the roller 13F), as shown in FIG. 14. Consequently, a force (enforcing force) in the axial direction of the lock shaft 21F is applied from the roller 13F of the piston rod 12F to the abutting portion 210F (first abutting surface 211F) of the lock shaft 21F. This force slightly moves the lock shaft 21F and the shaft member 31F of the magnetic locking device 20F toward the rear cap 38F (rightward in FIG. 14) against the elastic force of the spring 37F. Accordingly, a slight gap is formed between the end face 23aF on the small diameter portion 22F side of the large diameter portion 23F of the lock shaft 21F and the flange 35aF of the yoke 35F.

The following describes operations of the parking device 1F and the magnetic locking device 20F of the second embodiment structured in the above-described manner.

When the oil chamber 11fF of the hydraulic actuator 10F is not supplied with the hydraulic pressure (hydraulic oil) from the hydraulic control device and the coil 34F in the magnetic unit 30F of the magnetic locking device 20F is not energized, the hydraulic actuator 10F and the magnetic locking device 20F are in the state shown in FIG. 14, and the rotational shaft of the transmission is locked by the parking device 1F (the parking lock is applied). At this time, in the magnetic locking device 20F, the lock shaft 21F and the shaft member 31F are urged (locked) leftward in FIG. 14 by the elastic force of the spring 37F and the attracting force between the permanent magnet 33F of the shaft member 31F and the flange 35aF of the yoke 35F.

To switch the parking lock state to the parking lock released state before starting to run the vehicle, the oil chamber 11fF of the hydraulic actuator 10F is supplied with the hydraulic pressure from the hydraulic control device. At this time, the coil 34F of the magnetic unit 30F starts to be energized. After the coil 34F starts to be energized, the magnetic flux generated by the energization cancels the attraction between the permanent magnet 33F and the flange 35aF of the yoke 35F. Accordingly, the lock shaft 21F and the shaft member 31F are in the state of being urged leftward in FIG. 14 only by the spring 37F.

Figure 18:
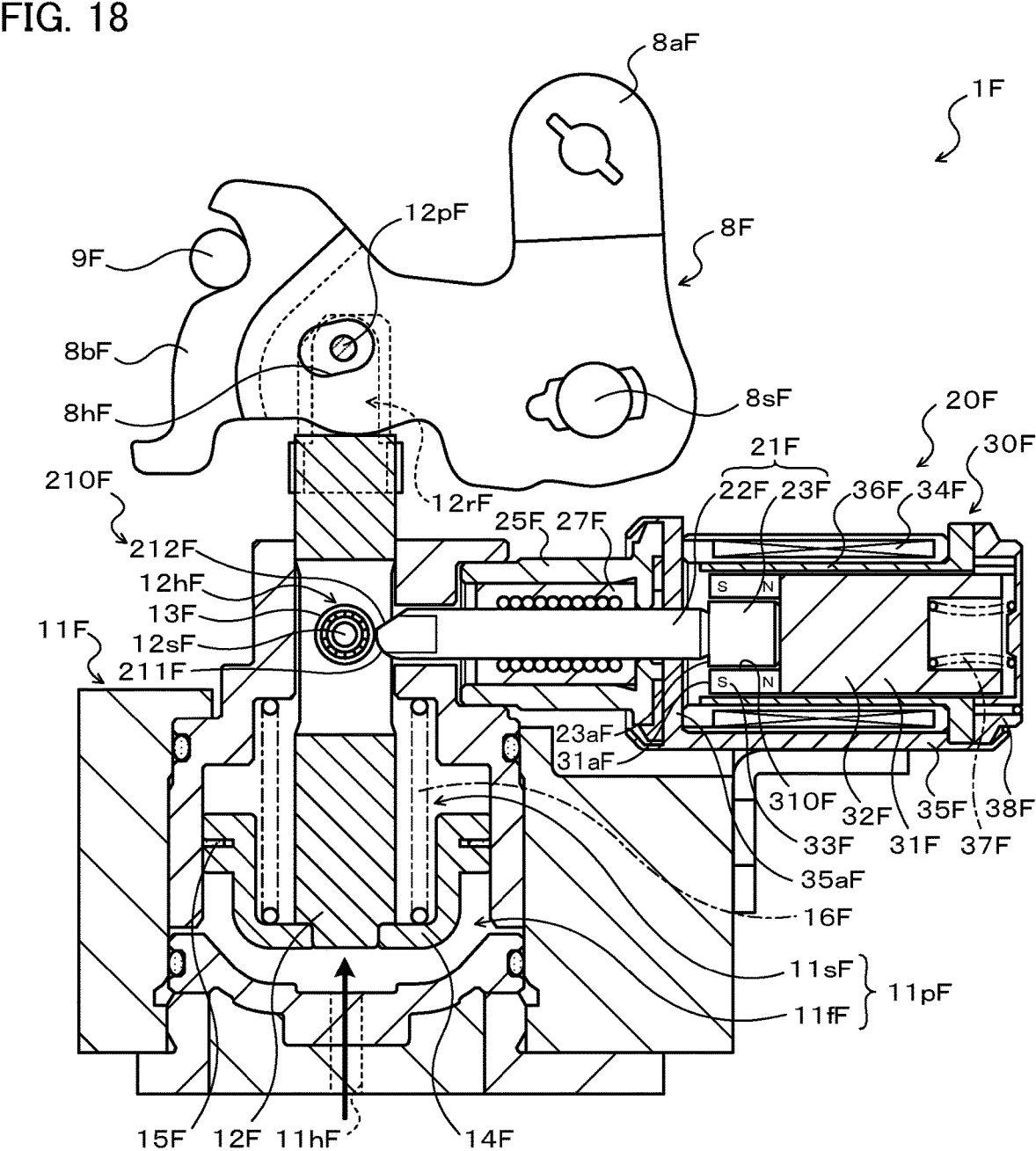
FIG. 18 is an explanatory diagram for explaining an operation of the parking device 1F.

When the oil chamber 11fF of the hydraulic actuator 10F is supplied with the hydraulic pressure from the hydraulic control device, the hydraulic pressure in the oil chamber 11fF moves the piston 14F and the piston rod 12F toward the lock releasing side (upward in FIG. 18) against the elastic force of the return spring 16F, as shown in FIG. 18. In the parking lock state, the roller 13F is in contact with the first abutting surface 211F of the abutting portion 210F of the lock shaft 21F, as described above. Hence, when the piston rod 12F starts moving toward the lock releasing side, the roller 13F rolls on the first abutting surface 211F of the lock shaft 21F, and at the same time, a force in a direction orthogonal to the tangent line direction between the roller 13F and the first abutting surface 211F (in the normal line direction) is applied from the piston rod 12F to the lock shaft 21F. The force in the normal line direction moves the lock shaft 21F and the shaft member 31F (the plunger 32F and the permanent magnet 33F) that are not fixed to each other, in an integrated manner toward the rear cap 38F (rightward in FIG. 18) against the elastic force of the spring 37F.

Figure 19:
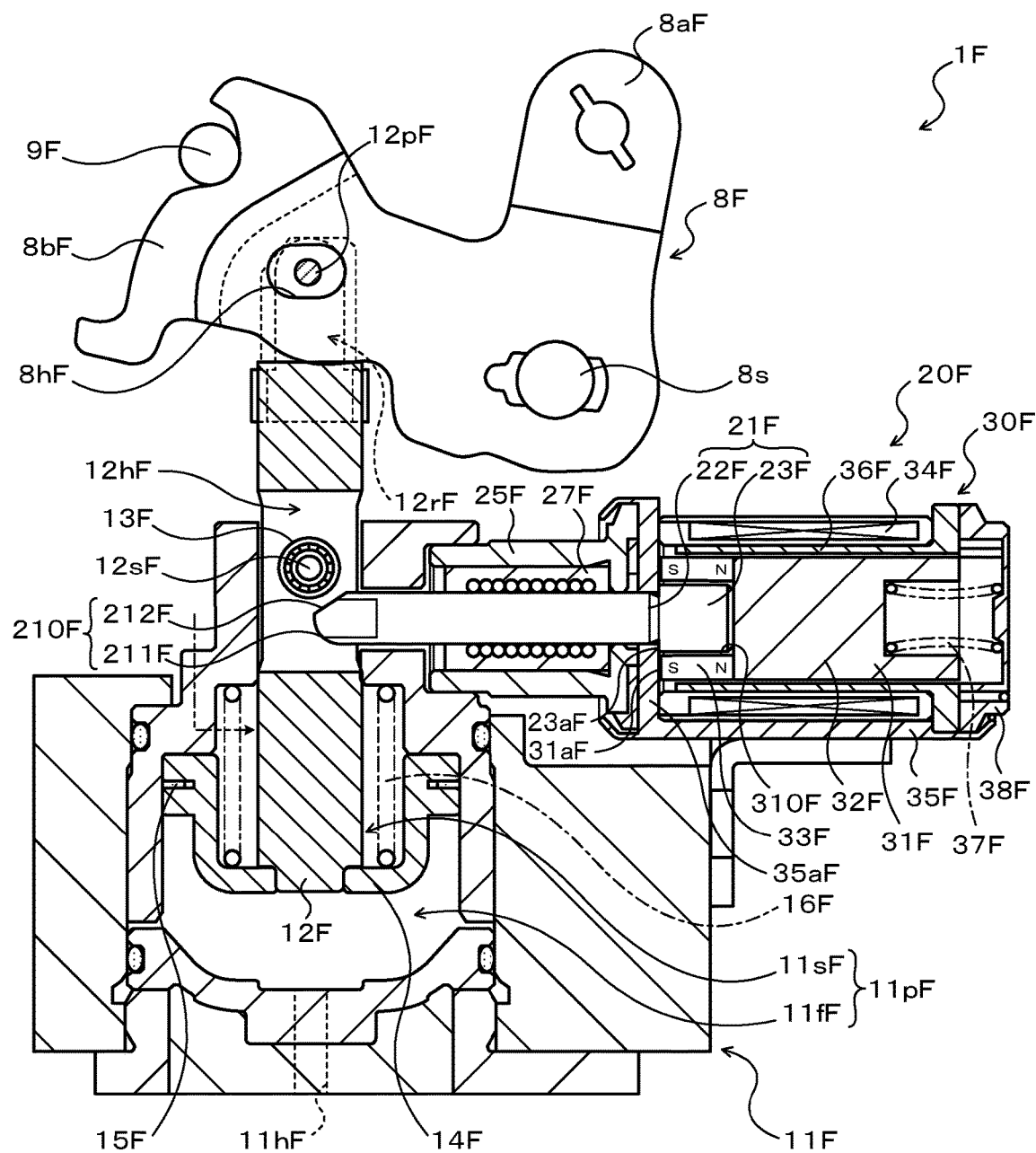
FIG. 19 is an explanatory diagram for explaining another operation of the parking device 1F.

When the roller 13F moves away from the first abutting surface 211F of the lock shaft 21F along with the movement of the piston rod 12F toward the lock releasing side as shown in FIG. 18, the spring 37F urges the lock shaft 21F and the shaft member 31F to move toward the far side (left side in FIG. 18) of the hole 12hF, and then, the roller 13F starts rolling on the second abutting surface 212F of the lock shaft 21F. At this time, the roller 13F moves together with the piston rod 12F toward the lock releasing side (upward in FIG. 18), so that the roller 13F does not apply a force for moving the lock shaft 21F and the like toward the rear cap 38F to the second abutting surface 212F. After that, the piston rod 12F is further moved toward the lock releasing side by the hydraulic pressure, and stops in a position to form a predetermined gap between the roller 13F and the second abutting surface 212F of the lock shaft 21F, as shown in FIG. 19.

After the hydraulic pressure starts moving the piston rod 12F toward the lock releasing side until the piston rod 12F stops as described above, the detent lever 8F rotates clockwise in FIG. 13 about the spindle 8sF, and the parking rod 4F moves rightward in FIG. 13. Consequently, the movement of the parking rod 4F releases the pressure from the cam member 5F onto the parking pawl 3F, and thus the parking lock is released.

In the second embodiment, when the hydraulic pressure moves the piston rod 12F toward the lock releasing side, the coil 34F of the magnetic unit 30F is energized to cancel the attracting force between the permanent magnet 33F and the flange 35aF of the yoke 35F. Consequently, a force required for the roller 13F of the piston rod 12F to move the lock shaft 21F and the shaft member 31F back from the piston rod 12F (toward the rear cap 38F) can be reduced compared with the case in which the coil 34F is not energized at this time. As a result, the piston rod 12F can be quickly moved toward the lock releasing side (upward in FIG. 18), and the hydraulic pressure required to move the piston rod 12F toward the lock releasing side can be reduced.

In the second embodiment, the roller 13F of the piston rod 12F is in contact with the first abutting surface 211F of the lock shaft 21F in the parking lock state shown in FIG. 14. This structure allows the moving stroke of the piston rod 12F to be smaller than that of a structure in which the roller 13F is not in contact with the first abutting surface 211F of the lock shaft 21F in the parking lock state, and thus the size of the parking device 1F can be reduced. This structure also allows quick switching from the parking lock state to the parking lock released state. This structure can further prevent the roller 13F from colliding with the first abutting surface 211F when the piston rod 12F is moving from the locking side toward the lock releasing side, thus improving the durability of the lock shaft 21F and the roller 13F, and reducing the occurrence of noise.

The first abutting surface 211F receives a force from the roller 13F when the hydraulic pressure moves the piston rod 12F toward the lock releasing side. The first abutting surface 211F receiving the force has a radius of curvature smaller than the radius (radius of curvature) of the outer circumferential surface of the roller 13F. This dimensional relation can increase the force in the axial direction of the lock shaft 21F (force component of the force in the normal line direction described above) applied from the roller 13F to lock shaft 21F when the piston rod 12F is moving toward the lock releasing side, and can thereby reduce an increase in the hydraulic pressure to be supplied to the oil chamber 11fF of the hydraulic actuator 10F to release the parking lock.

In addition, the roller 13F serving as the abutment target is rotatably supported by the piston rod 12F so as to be rollable on the first abutting surface 211F and the second abutting surface 212F, so that the frictional resistance between the roller 13F and the first and second abutting surfaces 211F and 212F can be reduced to improve the wear resistance (durability) of the roller 13F and the first and second abutting surfaces 211F and 212F.

As shown in FIG. 19, after the piston rod 12F is hydraulically moved to the lock releasing side and the parking lock is released, the parking lock released state can be maintained while the hydraulic pressure is supplied from the hydraulic control device to the oil chamber 11fF of the hydraulic actuator 10F. In the second embodiment, while the parking lock is released after the piston rod 12F is hydraulically moved to the lock releasing side, the roller 13F of the piston rod 12F and the second abutting surface 212F of the abutting portion 210F of the lock shaft 21F are separate from each other, as described above. Accordingly, the lock shaft 21F and the shaft member 31F are urged by the elastic force of the spring 37F and the attracting force between the permanent magnet 33F and the flange 35aF of the yoke 35F, so that the second abutting surface 212F of the abutting portion 210F of the lock shaft 21F projects into the hole 12hF so as to overlap a part of the outer circumferential surface of the roller 13F when viewed from the axial direction of the piston rod 12F, and the end face 23aF on the small diameter portion 22F side of the large diameter portion 23F of the lock shaft 21F abuts on the flange 35aF of the yoke 35F. In the second embodiment, the end face 31aF of the shaft member 31F (permanent magnet 33F) does not abut on the flange 35aF at this time because the depth of the recess 310F of the shaft member 31F (the length in the axial direction of the permanent magnet 33F) is smaller than the length in the axial direction of the large diameter portion 23F of the lock shaft 21F. Thus, the permanent magnet 33F can be protected compared with the case in which the permanent magnet 33F abuts on the flange 35aF.

In the parking lock released state shown in FIG. 19, when the hydraulic pressure supplied to the oil chamber 11fF of the hydraulic actuator 10F drops as the engine is stopped, for example, by the execution of the idling stop operation or the like, the elastic force of the return spring 16F moves the piston rod 12F toward the locking side, and the roller 13F of the piston rod 12F abuts on the second abutting surface 212F of the abutting portion 210F of the lock shaft 21F. As described above, in the second embodiment, when the coil 34F is not energized, the sum of the elastic force of the spring 37F and the attracting force between the permanent magnet 33F of the shaft member 31F and the flange 35aF of the yoke 35F is larger than the return spring force component, so that the piston rod 12F can be restrained from moving downward in FIG. 19, that is, toward the locking side. As a result, the parking lock released state can be maintained even when the hydraulic pressure supplied to the hydraulic actuator 10F is reduced by the execution of the idling stop operation or the like. Moreover, the coil 34F need not be supplied with a current at this time, so that the power consumption can be suppressed, and the parking lock released state can be maintained even when the coil 34F cannot be energized for any reason.

When the coil 34F of the magnetic unit 30F starts to be energized in the parking lock released state, the magnetic flux generated along with the energization cancels the attraction between the permanent magnet 33F and the flange 35aF of the yoke 35F. The spring constant of the spring 37F is smaller than the spring constant of the return spring 16F. Accordingly, when the hydraulic pressure supplied to the oil chamber 11fF of the hydraulic actuator 10F drops while the coil 34F is energized, the hydraulic oil flows out of the oil chamber 11fF through the oil hole 11hF, and the elastic force of the return spring 16F moves the piston 14F and the piston rod 12F downward in FIG. 19, that is, toward the locking side. The roller 13F of the piston rod 12F abuts on the second abutting surface 212F of the abutting portion 210F of the lock shaft 21F. The roller 13F applies a force in the normal line direction thereof to the second abutting surface 212F. The force component in the second direction (in the axis direction of the lock shaft 21F) of the force in the normal line direction moves the lock shaft 21F and the shaft member 31F that are not fixed to each other, in an integrated manner, rightward in FIG. 19, that is, toward the rear cap 38F, against the elastic force of the spring 37F. At this time, the roller 13F rolls on the second abutting surface 212F.

When the roller 13F moves away from the second abutting surface 212F of the lock shaft 21F along with the movement of the piston rod 12F toward the locking side, the spring 37F urges the lock shaft 21F and the shaft member 31F to move toward the far side (left side in FIG. 19) of the hole 12hF, and the roller 13F starts rolling on the first abutting surface 211F of the lock shaft 21F. At this time, the roller 13F moves together with the piston rod 12F toward the lockingside (downward in FIG. 19), so that the roller 13F does not apply a force for moving the lock shaft 21F and the like toward the rear cap 38F to the first abutting surface 211F. Then, the piston rod 12F is further hydraulically moved toward the locking side, and stops in the position shown in FIG. 14 (in the assembled state).

After the elastic force of the return spring 16F starts moving the piston rod 12F toward the locking side until the piston rod 12F stops as described above, the detent lever 8F rotates counterclockwise in FIG. 13 about the spindle 8sF, and the parking rod 4F moves leftward in FIG. 13. Consequently, the movement of the parking rod 4F causes the cam member 5F urged by the cam spring 7F to press the parking pawl 3F such that the parking pawl 3F engages with the parking gear 2F, and thus the parking lock is applied.

When the piston rod 12F is moving toward the locking side, the roller 13F also rolls on the first and second abutting surfaces 211F and 212F in a manner similar to when the piston rod 12F is moving toward the lock releasing side, so that the frictional resistance between the roller 13F and the first and second abutting surfaces 211F and 212F can be reduced to improve the wear resistance (durability) of the roller 13F and the first and second abutting surfaces 211F and 212F.

In the parking device 1F of the second embodiment described above, the magnetic locking device 20F is placed (attached on the hydraulic actuator 10F) such that the moving direction of the lock shaft 21F and the shaft member 31F (the plunger 32F and the permanent magnet 33F) of the magnetic locking device 20F is orthogonal to the moving direction of the piston rod 12F of the hydraulic actuator 10F. This structure allows the hydraulic actuator 10F and the magnetic locking device 20F to be arranged in a limited space more favorably than in the case of arranging them (on the same axis line) so as to move in the same direction.

When the coil 34F is not energized in the parking lock released state of the parking device 1F of the second embodiment, the lock shaft 21F and the shaft member 31F are locked by the attracting force between the permanent magnet 33F and the flange 35aF of the yoke 35F so as not to move back from the piston rod 12F, so that the piston rod 12F is restrained from being moved to the locking side by the elastic force of the return spring 16F (switching to the parking lock state is restrained). When the coil 34F is energized in the parking lock released state, the attracting force between the permanent magnet 33F and the flange 35aF of the yoke 35F is canceled, so that the lock shaft 21F and the shaft member 31F are allowed to move back from the piston rod 12F, and the piston rod 12F is allowed to be moved to the locking side by the elastic force of the return spring 16F. Accordingly, the coil 34F need not be energized to maintain the parking lock released state, so that the power consumption can be suppressed, and the switching to the parking lock state can be restrained when the coil 34F cannot be energized for any reason.

Moreover, in the parking device 1F of the second embodiment, the permanent magnet 33F is fixed to the plunger 32F to constitute the shaft member 31F, and the length in the axial direction of the permanent magnet 33F is formed to be smaller than the length in the axial direction of the large diameter portion 23F of the lock shaft 21F. This structure can restrain the permanent magnet 33F from abutting on the flange 35aF of the yoke 35F while the shaft member 31F is moving, and thus the permanent magnet 33F can be protected.

In addition, in the parking device 1F of the second embodiment, the elastic force of the spring 37F (and the attraction between the permanent magnet 33F and the flange 35aF of the yoke 35F) urges (urge) the lock shaft 21F and the shaft member 31F such that the bottom face 310bF of the recess 310F of the shaft member 31F (the end face on one end side of the plunger 32F) abuts on the end face 23bF of the large diameter portion 23F of the lock shaft 21F and such that the end face 23aF of the large diameter portion 23F abuts on the flange 35aF of the yoke 35F. Consequently, the lock shaft 21F and the shaft member 31F are urged in an integrated manner toward the piston rod 12F, and the end face 23aF of the large diameter portion 23F of the lock shaft 21F abuts on the flange 35aF, so that the lock shaft 21F can be restrained from rattling in the moving direction thereof.

In the parking device 1F of the second embodiment, the large diameter portion 23F of the lock shaft 21F is inserted in the recess 310F of the shaft member 31F (the permanent magnet 33F is located so as to surround the outer circumference of the large diameter portion 23F). Consequently, if the lock shaft 21F rattles in the radial direction thereof, the rattling can be absorbed by the clearance between the outer circumferential surface of the large diameter portion 23F and the inner circumferential surface of the permanent magnet 33F. As a result, the magnetic gap formed on the outer circumference of the plunger 32F can be reduced. The lock shaft 21F is formed of a nonmagnetic material, so that the magnetic flux leakage in the magnetic locking device 20F can be reduced. As a result of these effects, the magnetic efficiency can be increased when the coil 34F is supplied with the current, while the magnetic locking device 20F is restrained from increasing in size.

In the parking device 1F of the second embodiment, in the parking lock released state, when the attracting force between the permanent magnet 33F and the flange 35aF of the yoke 35F is canceled by energizing the coil 34F and also the hydraulic pressure to the oil chamber 11fF of the hydraulic actuator 10F is reduced, the elastic force of the return spring 16F causes the piston rod 12F to move toward the locking side while moving the lock shaft 21F and the shaft member 31F backward (toward the rear cap 38F). At this time, the spring chamber 11sF of the hydraulic actuator 10F may be supplied with hydraulic pressure (hydraulic oil) from the hydraulic control device, as indicated by the chain double-dashed line in FIG. 19. It is thus possible to move the piston rod 12F more quickly to the locking side.

In the parking device 1F of the second embodiment, to switch the parking lock state to the parking lock released state, the piston rod 12F is hydraulically moved toward the lock releasing side while energizing the coil 34F of the magnetic unit 30F to cancel the attracting force between the permanent magnet 33F and the flange 35aF. However, the piston rod 12F may be hydraulically moved toward the lock releasing side without energizing the coil 34F. In this case, moving the piston rod 12F requires a hydraulic pressure that resists against the elastic force of the return spring 16F and at which a rightward force component in FIG. 14 of a force applied from the roller 13F of the piston rod 12F to the second abutting surface 212F of the lock shaft 21F is larger than the sum of the elastic force of the spring 37F and the attracting force between the permanent magnet 33F and the flange 35aF of the yoke 35F (leftward force in FIG. 14 applied to the lock shaft 21F and the shaft member 31F); in other words, moving the piston rod 12F requires a hydraulic pressure higher by an amount to resist against the attracting force between the permanent magnet 33F and the flange 35aF of the yoke 35F than that of the second embodiment in which the coil 34F is energized.

In the parking device 1F of the second embodiment, the difference between the length in the axial direction of the large diameter portion 23F and the depth of the recess 310F of the shaft member 31F (the length in the second direction of the permanent magnet 33F) is smaller than the clearance between the outer circumferential surface of the large diameter portion 23F of the lock shaft 21F and the inner circumferential surface of the recess 310F of the shaft member 31F (the inner circumferential surface of the permanent magnet 33F). However, the clearance between the outer circumferential surface of the large diameter portion 23F of the lock shaft 21F and the inner circumferential surface of the recess 310F of the shaft member 31F may be set substantially equal to the difference between the length in the axial direction of the large diameter portion 23F and the depth of the recess 310F of the shaft member 31F, or the clearance between the outer circumferential surface of the large diameter portion 23F of the lock shaft 21F and the inner circumferential surface of the recess 310F of the shaft member 31F may be set smaller than the difference between the length in the axial direction of the large diameter portion 23F and the depth of the recess 310F of the shaft member 31F.

In the parking device 1F of the second embodiment, the length in the axial direction (right-left direction in FIG. 16) of the permanent magnet 33F is set smaller than the length in the axial direction of the large diameter portion 23F of the lock shaft 21F. However, the length in the axial direction of the permanent magnet 33F may be set to the same length as the length in the axial direction of the large diameter portion 23F of the lock shaft 21F.

Figure 20:
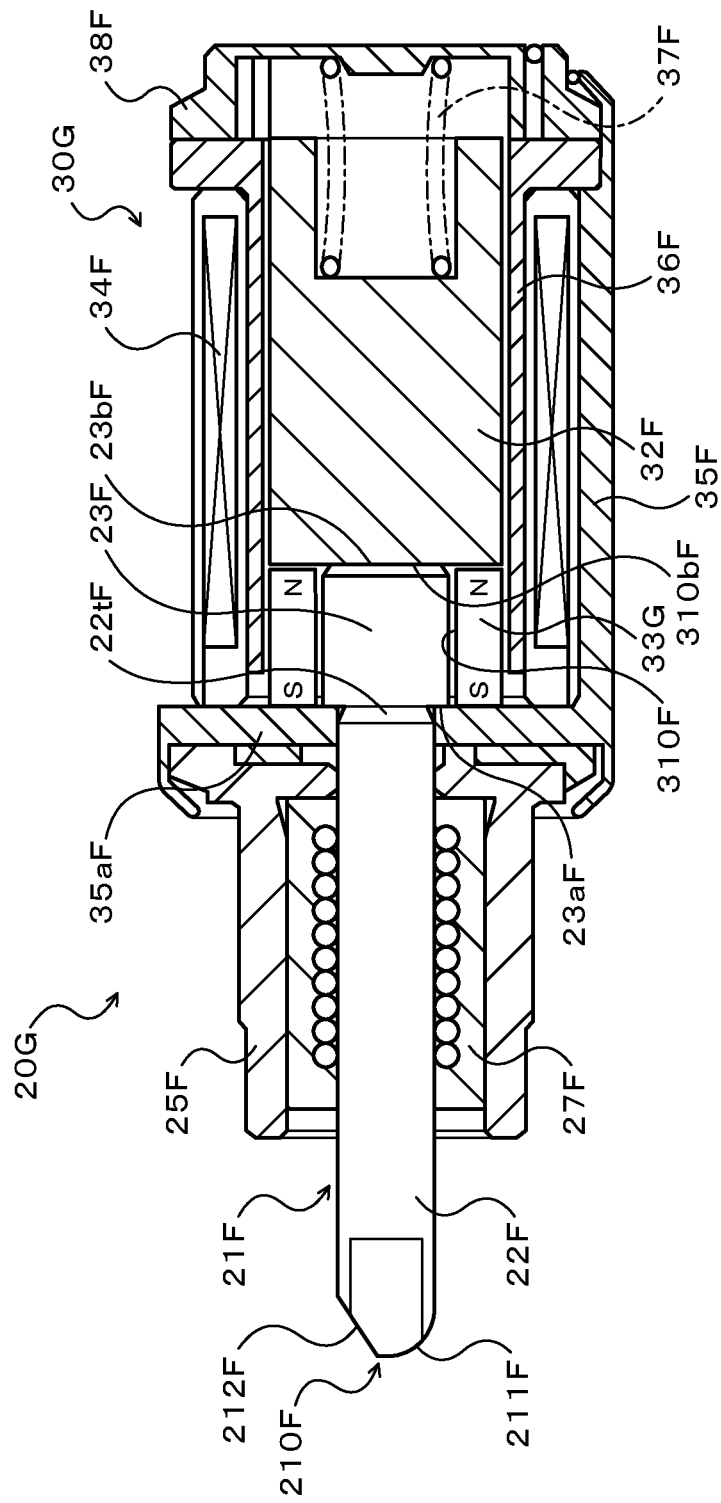
FIG. 20 is a structural diagram showing a schematic structure of a magnetic locking device 20G.

In the parking device 1F of the second embodiment, the permanent magnet 33F of the magnetic unit 30F is fixed to the plunger 32F (integrally structured with the plunger 32F), as shown in FIG. 16. However, as shown as a magnetic locking device 20G of a modification of the present disclosure in FIG. 20, a permanent magnet 33G of a magnetic unit 30G may be fixed to the flange 35aF of the yoke 35F. In this case, an attracting force between the permanent magnet 33G and the plunger 32F urges (locks) the lock shaft 21F and the plunger 32F in an integrated manner toward the shaft holder 25F. Also in this case, as shown in FIG. 20, the length in the axial direction (right-left direction in FIG. 20) of the permanent magnet 33G is set smaller than the length in the axial direction of the large diameter portion 23F of the lock shaft 21F, so that the permanent magnet 33G can be protected by restraining the permanent magnet 33G from abutting on the plunger 32F while the lock shaft 21F and the plunger 32F are moving. The length in the axial direction of the permanent magnet 33G may be set to the same length as the length in the axial direction of the large diameter portion 23F of the lock shaft 21F.

In the parking device 1F of the second embodiment, the first abutting surface 211F (abutting surface on the locking side) on the abutting portion 210F of the small diameter portion 22F of the lock shaft 21F is formed as a curved surface with a circular arc-shaped section that is convex toward the locking side. However, the first abutting surface 211F may be formed as a curved surface with a cross-sectional shape other than the circular arc shape that is convex toward the locking side, or may be formed as a (flat) sloped surface that is sloped at a constant angle toward the locking side as the surface extends from the abutting portion 210F side toward the large diameter portion 23F.

In the parking device 1F of the second embodiment, the second abutting surface 212F (abutting surface on the lock releasing side) on the abutting portion 210F of the small diameter portion 22F of the lock shaft 21F is formed as a (flat) sloped surface sloped at a constant angle toward the lock releasing side. The second abutting surface 212F may be formed as a curved surface with a cross-sectional shape that is convex toward the lock releasing side.

In the parking device 1F of the second embodiment, the small diameter portion 22F of the lock shaft 21F is formed so as to taper down (smaller in outside diameter) as the outer circumferential surface thereof in the vicinity of the boundary thereof with the large diameter portion 23F extends from the abutting portion 210F side toward the end face 23aF of the large diameter portion 23F. However, the small diameter portion 22F may be formed so as to be constant in outside diameter instead of being formed so as to taper down toward the end face 23aF.

The parking device 1F of the second embodiment includes the linear-motion bearing 27F that is fixed inside the shaft holder 25F and slidably supports the outer circumferential surface of the small diameter portion 22F of the lock shaft 21F. However, the linear-motion bearing 27F need not be included.

In the parking device 1F of the second embodiment, when the magnetic locking device 20F is attached to the hydraulic actuator 10F, the first abutting surface 211F of the abutting portion 210F of the lock shaft 21F abuts on the outer circumferential surface of the roller 13F, and the slight gap is formed between the end face 23aF of the large diameter portion 23F of the lock shaft 21F and the flange 35aF of the yoke 35F. However, the end face 23aF of the large diameter portion 23F of the lock shaft 21F may abut on the flange 35aF of the yoke 35F. In this case, the outer circumferential surface of the roller 13F of the piston rod 12F may be away to the locking side from the first abutting surface 211F of the abutting portion 210F of the lock shaft 21F.

In the parking device 1F of the second embodiment, the roller 13F rotatably supported by the supporting shaft 12sF that is supported by the piston rod 12F is used as the abutment target of the piston rod 12F. However, a cylindrical object rotatably supported by the piston rod 12F may be used, or an object serving as a nonrotatable component of the piston rod 12F (such as an object similar to the supporting shaft 12sF) may be used.

In the parking device 1F of the second embodiment, the lock shaft 21F and the plunger 32F are structured as separate bodies. However, the lock shaft 21F and the plunger 32F may be integrally formed with each other.

In the parking device 1F of the second embodiment, the piston rod 12F is urged downward in FIG. 14 (toward the locking side) by the elastic force of the return spring 16F, and is moved upward in FIG. 14 (toward the lock releasing side) by the hydraulic pressure against the elastic force of the return spring 16F. However, in the converse manner, the piston rod 12F may be urged toward the lock releasing side by an elastic force of a return spring, and may be moved toward the locking side by a hydraulic pressure against the elastic force of the return spring.

In the parking device 1F of the second embodiment, the magnetic locking device 20F uses the yoke 35F that is formed substantially in a cylindrical shape and includes the flange 35aF projecting radially inward on the shaft holder 25F side of the coil 34F, that is, the yoke 35F that is integrally structured with the portion (portion radially inside the coil 34F) corresponds to the core in the first parking device of the present disclosure. However, the portion of the flange 35aF radially inside the coil 34F may be separately structured from the yoke.

Figure 21:
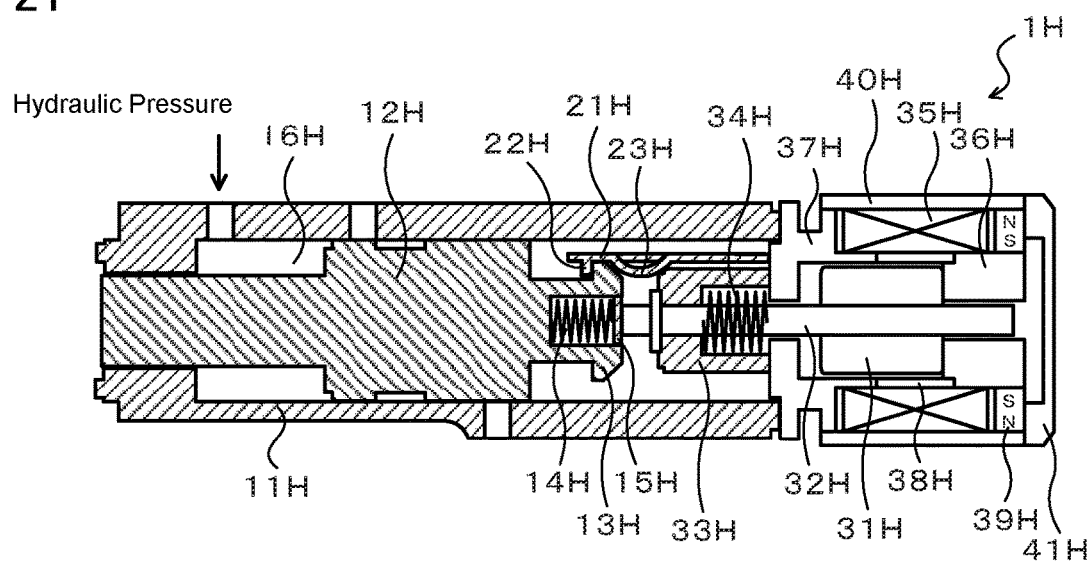
FIG. 21 is a structural diagram showing a schematic structure of a parking device 1H.

In the parking devices 1 and 1F of the first and second embodiments, the magnetic locking devices 20 and 20F are placed (attached to the hydraulic actuators 10 and 10F) such that the moving directions of the lock shafts 21 and 21F and the like of the magnetic locking devices 20 and 20F are respectively orthogonal to the moving directions of the piston rods 12 and 12F of the hydraulic actuators 10 and 10F. However, the magnetic locking devices 20 and 20F may be placed such that the moving directions of the lock shafts 21 and 21F and the like are respectively the same as those of the piston rods 12 and 12F. FIG. 21 is a structural diagram showing a schematic structure of a main part of a parking device 1H according to another modification of the present disclosure. The parking device 1H of FIG. 21 includes a hydraulic actuator 10H and a magnetic locking device 20H.

The hydraulic actuator 10H includes a case 11H and a piston unit 12H that is placed in the case 11H so as to be movable in the axial direction thereof and that is connected to a parking rod (not shown). A flange 13H projecting radially outward is provided at the right end in FIG. 21 of the piston unit 12H. The flange 13H is formed in a tapered shape on the right side thereof in FIG. 21, and is formed to have a flat surface orthogonal to the axial direction thereof on the side opposite to the tapered side. An opening is formed at the right end in FIG. 21 of the piston unit 12H, and a shock-absorbing spring 14H and a disc 15H are arranged in the opening. In addition, the piston unit 12H is urged by a spring device (not shown) toward a side of applying the parking lock (leftward in FIG. 21), and moves toward a side of releasing the parking lock (rightward in FIG. 21) when a space 16H in the case 11H is supplied with a hydraulic pressure.

The magnetic locking device 20H includes a latch mechanism 21H that includes a plurality of spring arms and is capable of restraining the piston unit 12H from moving leftward in FIG. 21. The latch mechanism 21H includes claw portions 22H provided on the inner circumferential side of distal ends of the latch mechanism 21H and guide portions 23H provided on the inner circumferential side of the proximal end side of the claw portions 22H.

The magnetic locking device 20H includes: a plunger 31H that is movable in the axial direction thereof; a plunger shaft 32H that is fixed to the plunger 31H; a cylindrical tripping member 33H that is attached on the plunger shaft 32H; and a spring 34H for urging the tripping member 33H toward the piston unit 12H (leftward in FIG. 21).

Moreover, the magnetic locking device 20H includes the following: a coil 35H that is placed so as to surround the outer circumference of the plunger 31H; a first core 36H that is placed on a side of the plunger 31H opposite to the piston unit 12H (on the right side in FIG. 21); a second core 37H that is placed between a set of the plunger 31H and the coil 35H and a set of the case 11H, the latch mechanism 21H, the tripping member 33H, and the spring 34H; a gap member 38H that is placed between the plunger 31H and the coil 35H and between the first core 36H and the second core 37H; a permanent magnet 39H that is placed on a side of the coil 35H opposite to the second core 37H; a yoke 40H that covers outer circumferences of, for example, the coil 35H, the second core 37H, and the permanent magnet 39H; and a rear cap 41H that is attached on the yoke 40H so as to hold, for example, the permanent magnet 39H. The permanent magnet 39H is formed into an annular shape, and is magnetized so as to have the north pole outside in the radial direction and the south pole inside in the radial direction. The permanent magnet 39H may be magnetized so as to have the north pole and the south pole on the reverse sides of the above.

When the coil 35H is not energized in the magnetic locking device 20H, the plunger 31H is attracted toward the first core 36H (rightward in FIG. 21) by a magnetic flux passing through the permanent magnet 39H, the first core 36H, the plunger 31H, the second core 37H, the yoke 40H, and the permanent magnet 39H, and the plunger 31H, the plunger shaft 32H, and the tripping member 33H are held on the first core 36H side (restrained from moving). When the coil 35H is energized, the magnetic flux generated along with the energization cancels the magnetic flux caused by the permanent magnet 39H, and an elastic force of the spring 34H moves the plunger 31H, the plunger shaft 32H, and the tripping member 33H toward the piston unit 12H (leftward in FIG. 21). At this time, the distal end (left end in FIG. 21) of the tripping member 33H abuts on the guide portions 23H of the latch mechanism 21H, and pushes to expand the latch mechanism 21H outward.

In the parking device 1H thus structured, in the parking lock state, when the piston unit 12H is being hydraulically moved rightward in FIG. 21 while the coil 35H is not energized, the flange 13H of the piston unit 12H abuts on the claw portions 22H of the latch mechanism 21H. The piston unit 12H further moves while pushing to expand the latch mechanism 21H outward, and stops in a position where the flange 13H is located between the claw portions 22H and the guide portions 23H of the latch mechanism 21H. This operation establishes the parking lock released state. While the coil 35H continues to be non-energized in that state, the engagement between the flange 13H of the piston unit 12H and the claw portions 22H of the latch mechanism 21H maintains the parking lock released state even when no hydraulic pressure is applied to the piston unit 12H. When the coil 35H is energized while no hydraulic pressure is applied to the piston unit 12H in the parking lock released state, the tripping member 33H moves toward the piston unit 12H and pushes to expand the latch mechanism 21H outward, as described above, to release the restraint caused by the latch mechanism 21H on the movement of the piston unit 12H, and the urging force of the spring device moves the piston unit 12H leftward in FIG. 21. Thus, the parking lock state is established.

In the same manner as the parking devices 1 and 1F of the first and second embodiments, in the parking device 1H of this modification, the coil 35H need not be energized to maintain the parking lock released state, so that the power consumption can be suppressed, and the switching to the parking lock state can be restrained when the coil 35H cannot be energized for any reason.

A parking device of the present disclosure will be described below.

A first parking device of the present disclosure is a parking device that is attached on a vehicle and includes: a parking pawl that meshes with a parking gear provided on an output shaft of a transmission; a cam that engages and disengages the parking pawl to and from the parking gear; a piston that drives the cam and is operated by hydraulic pressure; and a movement restraining member that holds the piston on a side to which the piston has been operated by the hydraulic pressure. The first parking device is characterized by including a locking member that is capable of maintaining the holding state of the piston by the movement restraining member, and is characterized in that the locking member includes: a coil that is energized to generate a magnetic flux; a plunger that is formed of a magnetic material that abuts on the movement restraining member on an inner circumferential side of the coil; a core that is formed of a magnetic material facing the plunger on the inner circumferential side of the coil; a yoke that is placed on an outer circumferential side of the coil, the plunger, and the core; and a permanent magnet that forms a magnetic path in conjunction with the plunger, the core, and the yoke, and also in that the magnetic path of the permanent magnet is at least partially in common with a magnetic path through which the magnetic flux of the coil passes.

In the first parking device of the present disclosure the locking member that is capable of maintaining the holding state of the piston by the movement restraining member includes: the coil that is energized to generate the magnetic flux; the plunger that is formed of a magnetic material abutting on the movement restraining member on the inner circumferential side of the coil; the core that is formed of a magnetic material facing the plunger on the inner circumferential side of the coil; the yoke that is placed on the outer circumferential side of the coil, the plunger, and the core; and the permanent magnet that forms the magnetic path in conjunction with the plunger, the core, and the yoke. The magnetic path of the permanent magnet is at least partially in common with the magnetic path through which the magnetic flux of the coil passes. With this structure, when the coil is not being energized, the magnetic flux in the magnetic path caused by the magnetic flux of the permanent magnet restrains the plunger from moving, and thereby restraining the movement restraining member from moving. As a result, the movement restraining member can hold the piston on the side to which the piston has been operated by the hydraulic pressure. When the coil is being energized, the magnetic flux caused by the energization cancels the magnetic flux caused by the magnetic flux of the permanent magnet to release the restraint on the movement of the plunger, and thereby releasing the restraint on the movement of the movement restraining member. As a result, the holding on the side to which the piston has been operated by the hydraulic pressure is released. As a result of the above, the coil need not be energized to cause the movement restraining member to hold the piston on the side to which the piston has been operated by the hydraulic pressure. Consequently, the power consumption can be suppressed.

In the first parking device of the present disclosure described above, the plunger may abut on the core, and may be attracted to the core by the magnetic flux of the permanent magnet.

In the first parking device of the present disclosure, in order to allow the movement restraining member to move, the coil may be energized to reduce the magnetic flux of the permanent magnet in the common magnetic path, and thereby reducing the magnetic flux passing through the plunger and the core.

In the first parking device of the present disclosure, a solenoid may include an elastic member that urges the movement restraining member toward the piston with an elastic force. In this case, the plunger may have a recess into which the elastic member is inserted, and the elastic member may have a spring constant smaller than that of an elastic member for a piston that urges the piston.

In the first parking device of the present, the permanent magnet may be attached on a side opposite to the movement restraining member side of the coil in an axial direction thereof, may be attached on the plunger side of the core in an axial direction thereof, or may be attached on the core side of the plunger in an axial direction thereof.

The first parking device of the present disclosure may also include a sleeve that is formed of a magnetic material and is placed between the coil and the plunger and between the permanent magnet and the plunger in a radial direction with respect to an axis of the solenoid, and a magnetic flux shut-off member that is formed of a nonmagnetic material between the sleeve and the core in the axial direction of the solenoid.

A second parking device of the present disclosure is a parking device that is mounted on a vehicle and includes:

a parking pawl that meshes with a parking gear provided on an output shaft of a transmission; a cam that engages and disengages the parking pawl to and from the parking gear;

a piston that drives the cam and is operated by hydraulic pressure; and a movement restraining member that holds the piston on a side to which the piston has been operated by the hydraulic pressure.

The second parking device is characterized by including a solenoid that switches a mode of movement of the movement restraining member between a restrained mode and an allowed mode, and is characterized in that the solenoid includes a permanent magnet that restrains the movement of the movement restraining member with a magnetic force, and also includes a restraint releasing unit that releases the restraint caused by the permanent magnet on the movement of the movement restraining member when the coil is being energized.

In the second parking device of the present disclosure, the solenoid that switches the mode of movement of the movement restraining member between the restrained mode and the allowed mode includes the permanent magnet that restrains the movement of the movement restraining member with a magnetic force, and also includes the restraint releasing unit that releases the restraint caused by the permanent magnet on the movement of the movement restraining member when the coil is being energized. Accordingly, when the coil is not being energized, the magnetic flux of the permanent magnet can restrain the movement restraining member from moving to hold the piston on the side to which the piston has been operated by the hydraulic pressure. When the coil is being energized, the magnetic flux caused by the energization cancels the magnetic flux caused by the magnetic flux of the permanent magnet to release the restraint on the movement of the movement restraining member, and thus releases the holding on the side to which the piston has been operated by the hydraulic pressure. As a result of the above, the coil need not be energized to cause the movement restraining member to hold the piston on the side to which the piston has been operated by the hydraulic pressure. Consequently, the power consumption can be suppressed.

In the second parking device of the present disclosure, the permanent magnet may be placed on a side of the coil opposite to the piston.

In the second parking device of the present disclosure, the permanent magnet may be fixed to the movement restraining member; the restraint releasing unit may include a facing part that is formed of a magnetic material and faces the permanent magnet in a direction of the movement of the movement restraining member, and the movement restraining member may be restrained from moving by attraction between the permanent magnet and the facing part.

In the second parking device of the present disclosure, the permanent magnet may be fixed to the restraint releasing unit; the movement restraining member may include a magnetic material part that is formed of a magnetic material; the permanent magnet and the magnetic material part may be arranged so as to face each other in a direction of the movement of the movement restraining member, and the movement restraining member may be restrained from moving by attraction between the permanent magnet and the magnetic material part.

In the second parking device according to the aspect of the present disclosure in which the permanent magnet is fixed to the movement restraining member or the restraint releasing unit, the solenoid may include an elastic member that urges the movement restraining member toward the piston with an elastic force; the movement restraining member may include a shaft that is formed of a nonmagnetic material and a plunger that is formed of a magnetic material; the shaft may include a small diameter portion having an abutting portion and a large diameter portion that extends from the small diameter portion toward a side opposite to the abutting portion and that has a diameter larger than that of the small diameter portion; the plunger may be formed to have a diameter larger than that of the large diameter portion; the shaft and the plunger may be urged by the elastic force of the elastic member toward the piston such that an end face on the piston side of the plunger abuts on an end face of the large diameter portion opposite to the small diameter portion, such that an end face on the small diameter portion side of the large diameter portion abuts on a part of the restraint releasing unit, and such that the abutting portion is capable of abutting on an abutment target, and the permanent magnet may be placed so as to surround an outer circumference of the large diameter portion. With this structure, the elastic force of the elastic member urges the shaft and the plunger in an integrated manner toward the piston, and the end face on the small diameter portion side of the large diameter portion of the shaft abuts on a part of the restraint releasing unit, so that the shaft can be restrained from rattling in the axial direction thereof. The permanent magnet is placed so as to surround the outer circumference of the large diameter portion of the shaft. Consequently, if the shaft rattles in the radial direction thereof, the rattling can be absorbed by the clearance between the outer circumferential surface of the large diameter portion and the inner circumferential surface of the permanent magnet. As a result, the magnetic gap formed on the outer circumference of the plunger can be reduced compared with the case in which the shaft, the plunger, and the permanent magnet are integrally structured. The shaft is formed of a nonmagnetic material, so that the leakage of the magnetic flux in the magnetic unit can be reduced. As a result of these effects, the magnetic efficiency can be increased while the magnetic unit is restrained from increasing in size.

In the second parking device according to this aspect of the present disclosure in which the permanent magnet is placed so as to surround the outer circumference of the large diameter portion, the length in the axial direction of the permanent magnet can be smaller than the length in the axial direction of the large diameter portion. Thus, if the permanent magnet is fixed to the plunger, the permanent magnet can be restrained from abutting on (colliding with) a part (facing part facing the permanent magnet in the axial direction) of the restraint releasing unit when the shaft and the plunger move toward the piston. Thus, the permanent magnet can be further protected. If the permanent magnet is fixed to the restraint releasing unit, the permanent magnet can be restrained from abutting on (colliding with) the plunger when the shaft and the plunger move toward the piston. Thus, the permanent magnet can be further protected.

In the second parking device of the present disclosure, the solenoid may include an elastic member that urges the movement restraining member toward the piston with an elastic force. In this case, the plunger may have a recess into which the elastic member is inserted, and the elastic member may have a spring constant smaller than that of an elastic member for a piston that urges the piston.

In the second parking device of the present disclosure, the movement restraining member may include a shaft formed of a nonmagnetic material and a plunger formed of a magnetic material.

In each of the first and second parking devices according to the aspect of the present disclosure in which the plunger is included, the solenoid may include an attracting portion that attracts the plunger toward the piston with a magnetic flux that is caused by the permanent magnet and passes radially inside the coil, and a face on the plunger side of the attracting portion may be provided in a position orthogonal to the magnetic flux passing radially inside the coil. This structure can increase the attracting force of the attracting portion to attract and lock the plunger toward the piston, and thus can restrain the movement of the plunger in a more reliable manner (with a larger force) while restraining the parking device from increasing in size.

In each of the first and second parking devices according to this aspect of the present disclosure in which the solenoid include the attracting portion, the face on the plunger side of the attracting portion may be orthogonal to a direction of movement of the plunger and parallel to a face on the attracting portion side of the plunger.

In each of the first and second parking devices according to the aspect of the present disclosure in which the solenoid include the attracting portion, the attracting portion may be placed radially inside the coil and at a center in an axial direction of the coil. At the radially inside of the coil, the magnetic flux of the attracting portion to attract the plunger can align in the axial direction (can have a higher magnetic flux density in the axial direction) more easily near the center in the axial direction of the coil than near ends in the axial direction thereof. Therefore, placing the attracting portion at the center in the axial direction of the coil allows the attracting portion to apply a larger attracting force to attract the plunger toward the piston, and thus to restrain the movement in the axial direction of the plunger in a more reliable manner (with a larger force) than in the case in which the attracting portion is placed at a place other than the center in the axial direction of the coil, while restraining the parking device from increasing in size.

Each of the first and second parking devices according to the aspect of the present disclosure in which the solenoid include the attracting portion may further include a first core placed radially outside the plunger, a second core that is placed on the piston side of the plunger and the first core and includes the attracting portion at an end thereof on the plunger side, and a gap member that is placed radially outside the plunger and between the first core and the second core so as to be in contact with the first core and the second core and is formed of a nonmagnetic material. In each of the first and second parking devices, at least a part of the gap member side of the first core and at least a part of the gap member side of the second core may overlap the coil in the radial direction thereof, and the gap member may be placed so as to include a plane that passes through a center in an axial direction of the coil and that is orthogonal to the axial direction of the coil. In this case, the attracting portion may be located radially inside the gap member and overlap the gap member in the radial direction thereof.

In each of the first and second parking devices according to the aspect of the present disclosure in which the plunger is included, the plunger may have a recess into which the movement restraining member is inserted. In this case, the recess may have a diameter larger than an inside diameter of the attracting portion. In these cases, the magnetic flux can be restrained from leaking between the attracting portion and the plunger (near the end face on the attracting portion side, in particular).

In each of the first and second parking devices of the present disclosure, the piston may move in a first direction, and the movement restraining member may move in a second direction orthogonal to the first direction. This structure allows the piston and the movement restraining member to be arranged in a limited space more favorably than in the case of arranging them (on the same axis line) so as to move in the same direction.

Each of the first and second parking devices of the present disclosure may further include an elastic member for a piston that urges the piston toward a direction opposite to the direction of operation of the piston by the hydraulic pressure. In each of the first and second parking devices, the movement restraining member may include an abutting portion that is capable of abutting on an abutment target provided on the piston, and the movement restraining member may be moved in a direction away from the piston by a force applied from the abutment target to the abutting portion caused by an elastic force of the elastic member for a piston or the hydraulic pressure, when the coil is being energized. With this structure, when the coil is being energized, the piston can move while moving the movement restraining member in the direction away from the piston with the force applied from the abutment target to the abutting portion caused by the elastic force of the elastic member for a piston or the hydraulic pressure.

In each of the first and second parking devices according to this aspect of the present disclosure in which the abutment target is provided on the piston and the movement restraining member includes the abutting portion, the abutting portion may have a lock releasing side abutting surface that is provided at a distal end of the movement restraining member and that receives a force from the abutment target when the piston is moving toward a locking side on which a parking lock state is established, and the lock releasing side abutting surface may be formed so as to slope toward a side opposite to the locking side as the surface extends from the distal end side to a proximal end side of the movement restraining member. With this structure, when the abutment target of the piston abuts on the lock releasing side abutting surface on the abutting portion of the movement restraining member as the piston moves toward the locking side, a force component of the force applied from the piston to the movement restraining member can move the movement restraining member back from the piston.

In each of the first and second parking devices according to the aspect of the present disclosure in which the abutment target is provided on the piston and the movement restraining member includes the abutting portion, the abutting portion may have a locking side abutting surface that is provided at a distal end of the movement restraining member and that receives a force from the abutment target when the piston is moving toward a lock releasing side on which a parking lock released state is established, and the locking side abutting surface may be formed so as to slope toward a side opposite to the lock releasing side as the surface extends from the distal end side to a proximal end side of the movement restraining member. With this structure, when the abutment target of the piston abuts on the locking side abutting surface on the abutting portion of the movement restraining member as the piston moves toward the lock releasing side, a force component of the force applied from the piston to the movement restraining member can move the movement restraining member back from the piston.

In each of the first and second parking devices according to the aspect of the present disclosure in which the abutment target is provided on the piston and the movement restraining member includes the abutting portion, the abutment target may be structured as a roller rotatable with respect to the piston. This structure can reduce the frictional resistance between the abutment target of the piston and the abutting portion of the movement restraining member.

In each of the first and second parking devices according to the aspect of the present disclosure in which the abutment target is provided on the piston and the movement restraining member includes the abutting portion, the piston may be provided with a hole into which the abutting portion of the movement restraining member is insertable and that penetrates through the piston, and the abutting portion of the movement restraining member may be located in the hole.

In each of the first and second parking devices of the present disclosure, the piston may be urged by an elastic force of an elastic member for a piston toward a locking side on which a parking lock state is established, and may be moved by hydraulic pressure against the elastic force of the elastic member for a piston toward a lock releasing side on which a parking lock released state is established.

While the modes for carrying out the present disclosure have been described above using the exemplary embodiment, the present disclosure is not particularly limited to the embodiment, but can naturally be carried out in various forms without departing from the scope of the present disclosure.

INDUSTRIAL APPLICABILITY

The present disclosure can be used, for example, in the manufacturing industry of parking devices.

The invention claimed is:

1. A parking device that is mounted on a vehicle, the parking device comprising:
   a parking pawl that meshes with a parking gear provided on an output shaft of a transmission;
   a cam that engages and disengages the parking pawl to and from the parking gear;
   a piston that drives the cam and is operated by hydraulic pressure;
   a movement restraining member that is configured to hold the piston on a side to which the piston is configured to be operated by the hydraulic pressure and which includes a plunger formed of a magnetic material part; and
   a solenoid that switches a mode of movement of the movement restraining member between a restrained mode and an allowed mode, wherein
   the solenoid includes a permanent magnet that restrains the movement of the movement restraining member with a magnetic force, a coil configured to induce a magnetic flux releases the restraint caused by the permanent magnet on the movement of the movement restraining member when the coil is energized in the allowed mode, an elastic member that urges the movement restraining member toward the piston with an elastic force, and an attracting portion that attracts the plunger toward the piston with a magnetic flux caused by the permanent magnet.

2. The parking device according to claim 1, wherein the permanent magnet is placed on a side of the coil opposite to the piston.

3. The parking device according to claim 2, wherein the permanent magnet is fixed to the coil;
   the permanent magnet and the magnetic material part are arranged so that a surface of the magnetic material part faces a surface of the permanent magnet in a direction of the movement of the movement restraining member; and
   the movement restraining member is restrained from moving by attraction between the permanent magnet and the magnetic material part when the coil is not energized.

4. The parking device according to claim 3, wherein the movement restraining member includes a shaft that is formed of a nonmagnetic material;
   the shaft includes a small diameter portion having an abutting portion and a large diameter portion that extends from the small diameter portion toward a side opposite to the abutting portion and that has a diameter larger than that of the small diameter portion;
   the plunger is formed to have a diameter larger than that of the large diameter portion;
   the shaft and the plunger are urged by the elastic force of the elastic member toward the piston such that an end face on the piston side of the plunger abuts on an end face of the large diameter portion opposite to the small diameter portion, such that an end face on the small diameter portion side of the large diameter portion abuts on a part of the magnetic material part, and such that the abutting portion is capable of abutting on an abutment target; and the permanent magnet is placed so as to surround an outer circumference of the large diameter portion.

5. The parking device according to claim 2, wherein
the permanent magnet is fixed to the movement restraining member;
the magnetic material part includes a facing part that faces the permanent magnet in a direction of the movement of the movement restraining member; and
the movement restraining member is restrained from moving by attraction between the permanent magnet and the facing part.

6. The parking device according to claim 1, wherein
the plunger has a recess into which the elastic member is inserted.

7. The parking device according to claim 1, wherein
the elastic member has a spring constant smaller than that of an elastic member for a piston that urges the piston.

8. The parking device according to claim 7, wherein
the attracting portion passes radially inside the coil; and
a face on the plunger side of the attracting portion is provided in a position orthogonal to the magnetic flux passing radially inside the coil.

9. The parking device according to claim 8, wherein
the face on the plunger side of the attracting portion is orthogonal to a direction of movement of the plunger and parallel to a face on the attracting portion side of the plunger.

10. The parking device according to claim 9, wherein
the attracting portion is placed radially inside the coil and at a center in an axial direction of the coil.

11. The parking device according to claim 10, further comprising:
a first core placed radially outside the plunger;
a second core that is placed on the piston side of the plunger and the first core and includes the attracting portion at an end thereof on the plunger side; and
a gap member that is placed radially outside the plunger and between the first core and the second core so as to be in contact with the first core and the second core and is formed of a nonmagnetic material, wherein
at least a part of the gap member side of the first core and at least a part of the gap member side of the second core overlap the coil in the radial direction thereof, and
the gap member is placed so as to include a plane that passes through a center in an axial direction of the coil and that is orthogonal to the axial direction of the coil.

12. The parking device according to claim 11, wherein
the attracting portion is located radially inside the gap member, and overlaps the gap member in the radial direction thereof.

13. The parking device according to claim 12, wherein
the plunger has a recess into which the movement restraining member is inserted.

14. The parking device according to claim 13, wherein
the recess has a diameter larger than an inside diameter of the attracting portion.

15. The parking device according to claim 14, wherein
the piston moves in a first direction; and
the movement restraining member moves in a second direction orthogonal to the first direction.

16. The parking device according to claim 15, wherein
the movement restraining member includes an abutting portion that is capable of abutting on an abutment target provided on the piston; and
the movement restraining member is moved in a direction away from the piston by a force applied from the abutment target to the abutting portion caused by an elastic force of the elastic member for a piston or the hydraulic pressure, when the coil is being energized.

17. The parking device according to claim 16, wherein
the abutting portion has a lock releasing side abutting surface that is provided at a distal end of the movement restraining member and that receives a force from the abutment target when the piston is moving toward a locking side on which a parking lock state is established; and
the lock releasing side abutting surface is formed so as to slope toward a side opposite to the locking side as the surface extends from the distal end side to a proximal end side of the movement restraining member.

18. The parking device according to claim 17, wherein
the abutting portion has a locking side abutting surface that is provided at a distal end of the movement restraining member and that receives a force from the abutment target when the piston is moving toward a lock releasing side on which a parking lock released state is established; and
the locking side abutting surface is formed so as to slope toward a side opposite to the lock releasing side as the surface extends from the distal end side to a proximal end side of the movement restraining member.

19. The parking device according to claim 18, wherein
the abutment target is structured as a roller rotatable with respect to the piston.

20. The parking device according to claim 19, wherein
the piston is provided with a hole into which the abutting portion of the movement restraining member is insertable and that penetrates through the piston; and
the abutting portion of the movement restraining member is located in the hole.

21. The parking device according to claim 20, wherein
the piston is urged by the elastic force of the elastic member toward the locking side on which the parking lock state is established, and is moved by hydraulic pressure against the elastic force of the elastic member toward the lock releasing side on which the parking lock released state is established.

22. The parking device according to claim 1, wherein
the movement restraining member includes a shaft that is formed of a nonmagnetic material.

23. The parking device according to claim 1, wherein
the attracting portion passes radially inside the coil; and
a face on the plunger side of the attracting portion is provided in a position orthogonal to the magnetic flux passing radially inside the coil.

24. The parking device according to claim 1, wherein
the plunger has a recess into which the movement restraining member is inserted.

25. The parking device according to claim 1, wherein
the piston moves in a first direction; and
the movement restraining member moves in a second direction orthogonal to the first direction.

26. The parking device according to claim 1, further comprising:
an elastic member for the piston that urges the piston toward a direction opposite to the direction of operation of the piston by the hydraulic pressure, wherein the movement restraining member includes an abutting portion that is capable of abutting on an abutment target provided on the piston; and the movement restraining member is moved in a direction away from the piston by a force applied from the abutment target to the abutting portion caused by an elastic force of the elastic member for a piston or the hydraulic pressure, when the coil is being energized.

27. The parking device according to claim 1, wherein the piston is urged by an elastic force of an elastic member for the piston toward a locking side on which a parking lock state is established, and is moved by hydraulic pressure against the elastic force of the elastic member for the piston toward a lock releasing side on which a parking lock released state is established.

28. A parking device that is mounted on a vehicle, the parking device comprising:

a parking pawl that meshes with a parking gear provided on an output shaft of a transmission;

a cam that engages and disengages the parking pawl to and from the parking gear;

a piston that drives the cam and is operated by hydraulic pressure;

a movement restraining shaft that is configured to hold the piston on a lock releasing side where a parking release state is set and a lock side where a parking lock side is set, each of the two sides to which the piston is configured to be operated by the hydraulic pressure; and a solenoid that switches a mode of movement of the movement restraining shaft between a restrained mode that is configured to hold the piston on both the lock releasing side and the lock side and an allowed mode that permits the piston to move, wherein the solenoid includes a permanent magnet that restrains the movement of the movement restraining shaft with a magnetic force in the restrained mode, and a coil configured to induce a magnetic flux releases the restraint caused by the permanent magnet on the movement of the movement restraining shaft when the coil is energized in the allowed mode.

* * * * *